US012397782B2

(12) United States Patent
Takagi et al.

(10) Patent No.: US 12,397,782 B2
(45) Date of Patent: Aug. 26, 2025

(54) VEHICLE CONTROL DEVICE, VEHICLE, VEHICLE CONTROL METHOD, AND NON-TRANSITORY COMPUTER-READABLE MEDIUM

(71) Applicant: PANASONIC INTELLECTUAL PROPERTY MANAGEMENT CO., LTD., Osaka (JP)

(72) Inventors: Toshimasa Takagi, Kanagawa (JP); Takeo Tomida, Kanagawa (JP); Yoshimasa Okabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 459 days.

(21) Appl. No.: 17/948,786

(22) Filed: Sep. 20, 2022

(65) Prior Publication Data

US 2023/0127044 A1    Apr. 27, 2023

(30) Foreign Application Priority Data

Oct. 25, 2021   (JP) ................. 2021-174184

(51) Int. Cl.
*B60W 30/19*   (2012.01)
*B60W 30/09*   (2012.01)
*B60W 40/12*   (2012.01)

(52) U.S. Cl.
CPC ............ *B60W 30/09* (2013.01); *B60W 40/12* (2013.01); *B60W 2420/408* (2024.01);
(Continued)

(58) Field of Classification Search
CPC ................ B60W 30/09; B60W 40/12; B60W 2420/408; B60W 2420/54;
(Continued)

(56) References Cited

U.S. PATENT DOCUMENTS 11,837,095 B2 *  12/2023  Sakamoto ............. G01S 13/931
11,952,008 B2 *   4/2024  Miyamoto ........ B60W 30/0956
(Continued)

FOREIGN PATENT DOCUMENTS

JP    2007-131169    5/2007
JP    2017-013756    1/2017
(Continued)

OTHER PUBLICATIONS

Office Action from Japan Patent Office (JPO) in Japanese Patent Appl. No. 2021-174184, dated Feb. 4, 2025, together with an English language translation.

*Primary Examiner* — Peter D Nolan
*Assistant Examiner* — Demetra R Smith-Stewart
(74) *Attorney, Agent, or Firm* — GREENBLUM & BERNSTEIN, P.L.C.

(57) ABSTRACT

A vehicle control device is mountable on a vehicle. The vehicle control device includes: a processor; and a memory storing instructions that, when executed by the processor, cause the vehicle control device to perform operations. The operations includes: acquiring detection information obtained by detecting an obstacle around the vehicle; performing collision determination of evaluating a possibility of collision with the obstacle, generating, based on the detection information, information on an approaching object that is an obstacle approaching the vehicle and information on a detection point group that is a set of detection points indicating an obstacle that does not move; and excluding the approaching object from collision determination in a case in which the detection point group has a shielding effect of shielding the vehicle from the approaching object. The shielding effect is evaluated by using a gap threshold that is set based on a vehicle width.

17 Claims, 21 Drawing Sheets

(52) U.S. Cl.
CPC ..... *B60W 2420/54* (2013.01); *B60W 2554/20* (2020.02); *B60W 2554/80* (2020.02)

(58) Field of Classification Search
CPC ......... B60W 2554/20; B60W 2554/80; B60W 2554/60; B60W 2554/806; B60W 30/0956

See application file for complete search history.

(56) References Cited

U.S. PATENT DOCUMENTS

| | | | |
|---|---|---|---|
| 12,217,479 B2 * | 2/2025 | Saklatvala | ........... G06V 20/653 |
| 2017/0008517 A1 | 1/2017 | Himi | |
| 2020/0142044 A1 | 5/2020 | Matsuura et al. | |
| 2021/0370931 A1 * | 12/2021 | Sannomiya | ....... B60W 30/0956 |
| 2022/0005352 A1 | 1/2022 | Sakamoto et al. | |
| 2023/0003874 A1 * | 1/2023 | Yu | ........................... G01S 7/027 |

FOREIGN PATENT DOCUMENTS

| | | |
|---|---|---|
| JP | 2019-015682 | 1/2019 |
| JP | 2020-154786 | 9/2020 |

* cited by examiner

< IN REVERSING >

< IN TRAVELING >

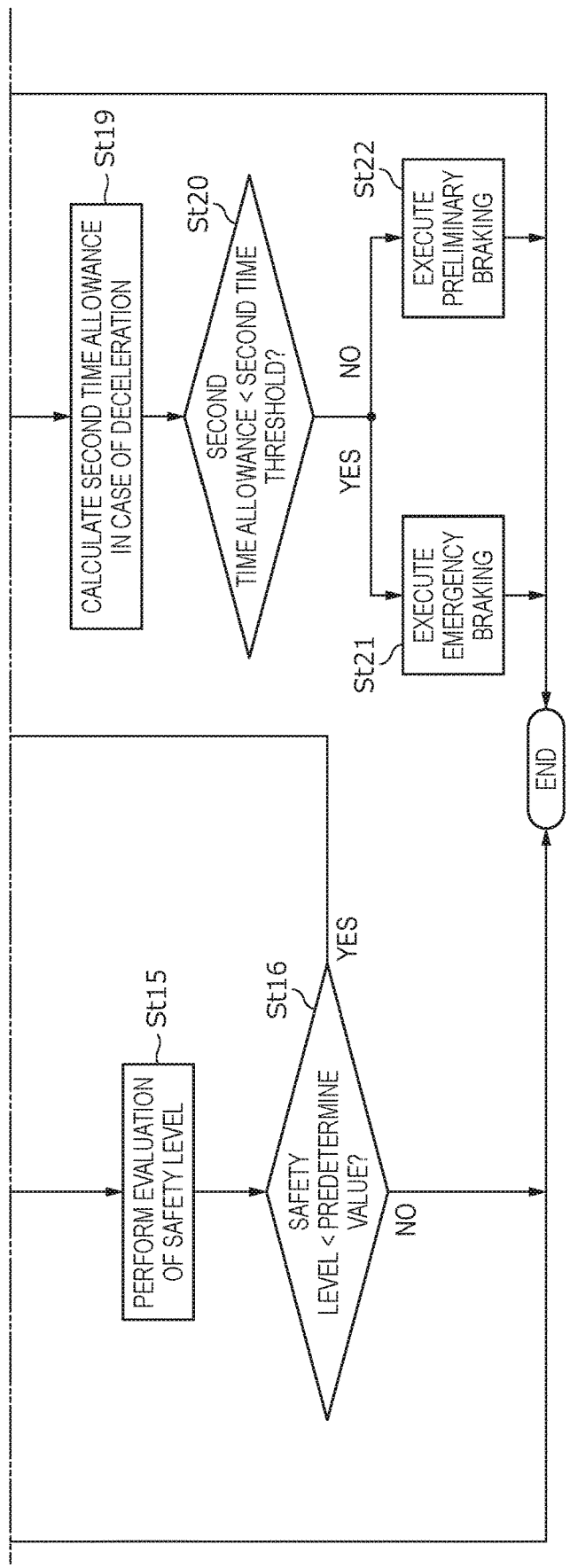

VEHICLE CONTROL DEVICE, VEHICLE, VEHICLE CONTROL METHOD, AND NON-TRANSITORY COMPUTER-READABLE MEDIUM

TECHNICAL FIELD

The present disclosure relates to a vehicle control device involved in collision prevention, a vehicle provided with a collision prevention device, and a vehicle control method and a non-transitory computer-readable medium involved in collision prevention.

BACKGROUND ART

JP2017-013756A discloses a collision avoidance device that detects an approaching object and avoids a collision with the detected approaching object. The collision avoidance device includes a radar that detects an object located behind a vehicle and detects a distance to the detected object, and a plurality of ultrasonic sensors each of which has a different detection area, detects an object located behind the vehicle and detects a distance to the detected object. The collision avoidance device detects an approaching object approaching the vehicle from objects detected by the radar, and when an object is detected at a plurality of positions by the plurality of ultrasonic sensors, estimates the presence of a shielding object extending over the plurality of positions at which the object is detected, and when a distance to the approaching object is larger than a distance to the shielding object by a predetermined value or more, restricts or prohibits execution of driving support of avoiding collision with the detected approaching object.

JP2020-154786A discloses an alarm device. The alarm device is mounted on a vehicle, and notifies a driver of an own vehicle about an alarming candidate (corresponding to an approaching object described above) when the own vehicle is reversed, or suppresses notification about an alarming candidate that is present in a shielded region that is a region on the opposite side of the own vehicle, with a shielding boundary located therebetween, as viewed from the own vehicle. The alarm device emits a search wave toward a right rear side and a left rear side of the own vehicle that are search ranges, and acquires, from a radar module that detects a reflected wave of the search wave, target information including a position of at least one target detected within the search ranges. The alarm device uses the acquired target information to determine whether each of at least one target specified based on the target information is an alarming candidate requiring notification to the driver of the own vehicle, and performs notification regarding the alarming candidate to the driver of the own vehicle when the own vehicle is reversed. In addition, the alarm device uses reflection point information acquired by reception of the reflected wave to extract a stationary reflection point, which is a static reflection point, from among at least one reflection point specified based on the reflection point information, calculates an approximate straight line by performing robust estimation on a position of the stationary reflection point specified based on the reflection point information, and sets the approximate straight line as a shielding boundary (corresponding to a shielding object described above). The alarm device suppresses notification that is to be performed by a notification unit and that relates to an alarming candidate present in a shielded region that is a region on the opposite side of the own vehicle, with the shielding boundary located therebetween, as viewed from the own vehicle.

SUMMARY OF INVENTION

The present disclosure provides a vehicle control device, a vehicle, a vehicle control method, and a non-transitory computer-readable medium capable of accurately determining whether to exclude a detected approaching object from collision determination.

The present disclosure provides a vehicle control device mountable on a vehicle, the vehicle control device including: a processor; and a memory storing instructions that, when executed by the processor, cause the vehicle control device to perform operations, the operations including: acquiring detection information obtained by detecting an obstacle around the vehicle; performing collision determination of evaluating a possibility of collision with the obstacle; generating, based on the detection information, information on an approaching object that is an obstacle approaching the vehicle and information on a detection point group that is a set of detection points indicating an obstacle that does not move; and excluding the approaching object from collision determination in a case in which the detection point group has a shielding effect of shielding the vehicle from the approaching object, and wherein the shielding effect is evaluated by using a gap threshold that is set based on a vehicle width.

The present disclosure provides a vehicle including: the vehicle control device.

The present disclosure provides a vehicle control method to be executed by one or more computers mountable on a vehicle, the vehicle control method including: acquiring detection information obtained by detecting an obstacle around the vehicle; generating, based on the detection information, information on an approaching object that is an obstacle approaching the vehicle and information on a detection point group that is a set of detection points indicating an obstacle that does not move; evaluating, based on the information on the approaching object and the information on the detection point group, a shielding effect of shielding the vehicle from the approaching object by the detection point group; and excluding, in accordance with the shielding effect, the approaching object from a target of collision determination in which a possibility of collision with the vehicle is evaluated, wherein the shielding effect is evaluated by using a gap threshold that is set based on a vehicle width.

The present disclosure provides a non-transitory computer-readable medium that stores a vehicle control program, the vehicle control program, when executed by a processor, causing one or more computers mountable on a vehicle to perform a process, the process including: acquiring detection information obtained by detecting an obstacle around the vehicle; generating, based on the detection information, information on an approaching object that is an obstacle approaching the vehicle and information on a detection point group that is a set of detection points indicating an obstacle that does not move; evaluating, based on a gap threshold that is set based on a vehicle width, the information on the approaching object, and the information on the detection point group, a shielding effect of shielding the vehicle from the approaching object by the detection point group; and excluding, in accordance with the shielding effect, the approaching object from a target of collision determination in which a possibility of collision with the vehicle is evaluated.

According to the present disclosure, it is possible to accurately determine whether to exclude a detected approaching object from collision determination.

Figure 1:
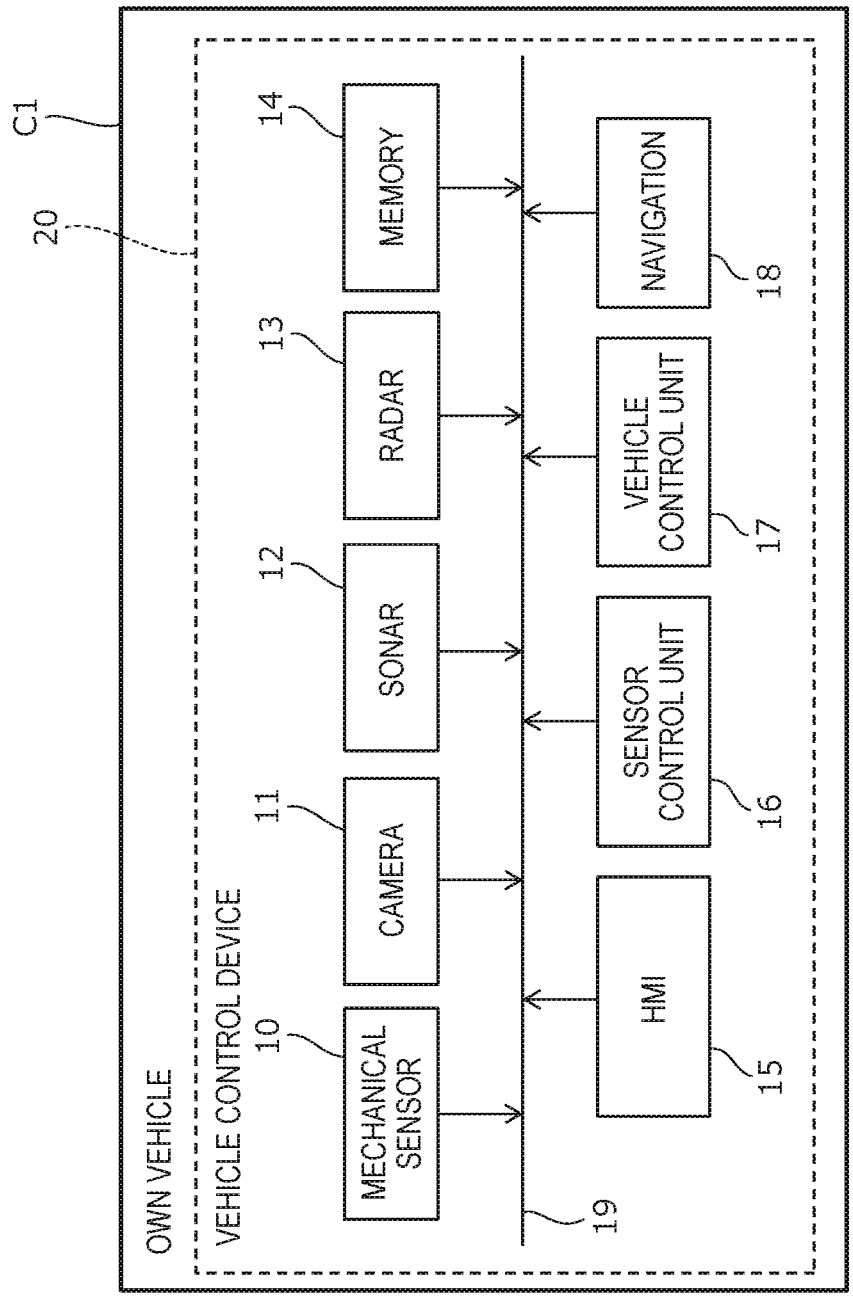
FIG. 1 is a diagram illustrating an example of an internal configuration of an own vehicle according to a first embodiment.

DESCRIPTION OF EMBODIMENTS (Introduction to Present Disclosure)

When obstacles are detected at a plurality of positions by a plurality of ultrasonic sensors, the collision avoidance device disclosed in JP2017-013756A estimates that there is a shielding object including the obstacles at the plurality of positions as a part thereof. Specifically, when there are two positions at which an object is detected, it is estimated that there is a shielding object such as a guardrail passing through the two positions. The collision avoidance device detects an approaching object approaching the vehicle from among objects detected by a radar, and restricts or prohibits execution of driving support of avoiding collision with the detected approaching object when a distance to the approaching object is larger than a distance to the shielding object by a predetermined value or more. When the approaching object detected by the radar is a mirror ghost, that is, a virtual image due to reflection of a radar wave by the shielding object such as a guardrail, a distance to the mirror ghost is twice the distance to the shielding object, and thus the control of prohibiting the collision avoidance may be appropriate. However, there is a possibility that a shielding object estimated using the above-described method does not actually exist as a continuous shielding object through which another vehicle cannot pass. For example, there is a possibility that isolated objects exist at respective positions where objects are detected, and that a space through which another vehicle can pass exists between the objects. In addition, since a mirror ghost is likely to be generated when there is a continuous shielding object such as a guardrail that reflects a radar wave, conversely, if the shielding object is not a continuous shielding object such as a guardrail, it can be said that an approaching object may not be a mirror ghost (that is, an approaching object may be a real object and may collide with the own vehicle). Therefore, it is desirable that the collision avoidance device determines whether a detected object is a mirror ghost (hereinafter, referred to as a "ghost"), and determines whether driving support is necessary according to the determination result.

In addition, the alarm device disclosed in JP2020-154786A calculates an approximate straight line indicating a position of a shielding object (that is, a shielding boundary), based on a position of a stationary reflection point indicating a stationary target that is acquired by a radar. The alarm device calculates, based on the calculated approximate straight line, a shielding reliability indicating a probability that a detected shielding object exits, determines that the shielding object is present when it is determined that the calculated shielding reliability is equal to or greater than a shielding threshold, and suppresses notification that is to be performed by a notification unit and that relates to an alarming candidate present in a shielded region that is a region on the opposite side of the own device, with the shielding boundary located therebetween, as viewed from the own vehicle. Specifically, in the calculation of the shielding reliability, the alarm device sets divided areas obtained by dividing an xy plane along a y-axis direction, and calculates the shielding reliability for each divided area. However, since each of the divided areas is set every 12 m in a vehicle width direction, even though there is a portion in the divided area where no stationary reflection point exists and another vehicle can pass through the portion, the shielding reliability of the divided area may be calculated to be high. That is, when evaluating the shielding reliability, an interval between the stationary reflection points should be evaluated with reference to a vehicle width. Even if detected stationary targets are distributed linearly and presence of a shielding object such as a guardrail is estimated, the alarm device preferably does not exclude an extracted vehicle located on the other side of the shielding object from alarming targets when there is a gap equal to or more than a width of one vehicle (a gap having a width exceeding the vehicle width) in the shielding object.

Hereinafter, embodiments specifically disclosing a vehicle control device, a vehicle, a vehicle control method, and a vehicle control program according to the present disclosure will be described in detail with reference to the drawings as appropriate. However, an unnecessary detailed description may be omitted. For example, detailed description of a well-known matter or repeated description of a substantially the same configuration may be omitted. This is to avoid unnecessary redundancy of the following description and to facilitate understanding of those skilled in the art. The accompanying drawings and the following description are provided in order for those skilled in the art to sufficiently understand the present disclosure, and are not intended to limit the subject matters described in the claims.

Figure 2:
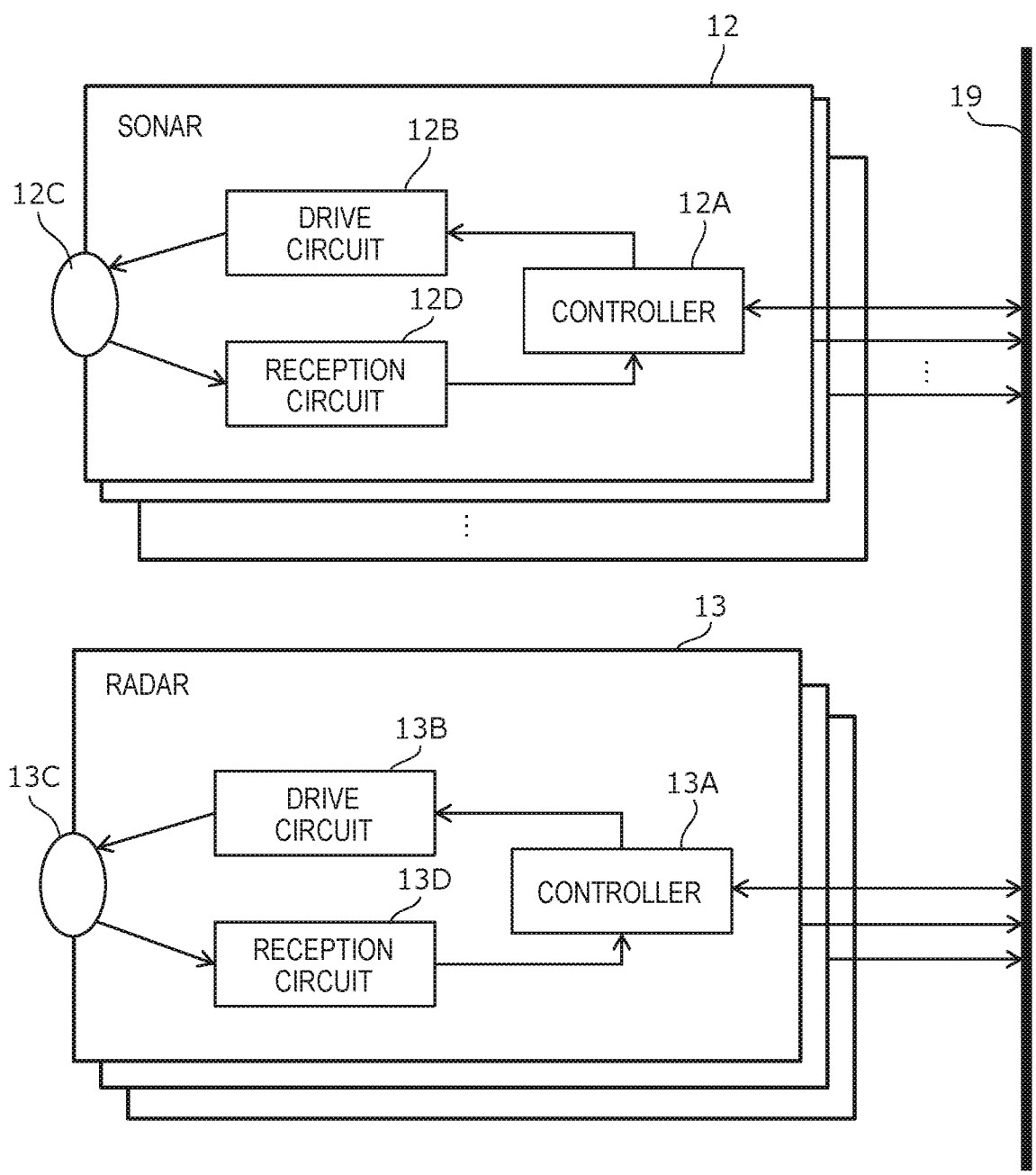
FIG. 2 is a diagram illustrating an example of internal configurations of a sonar and a radar according to the first embodiment.
Figure 3:
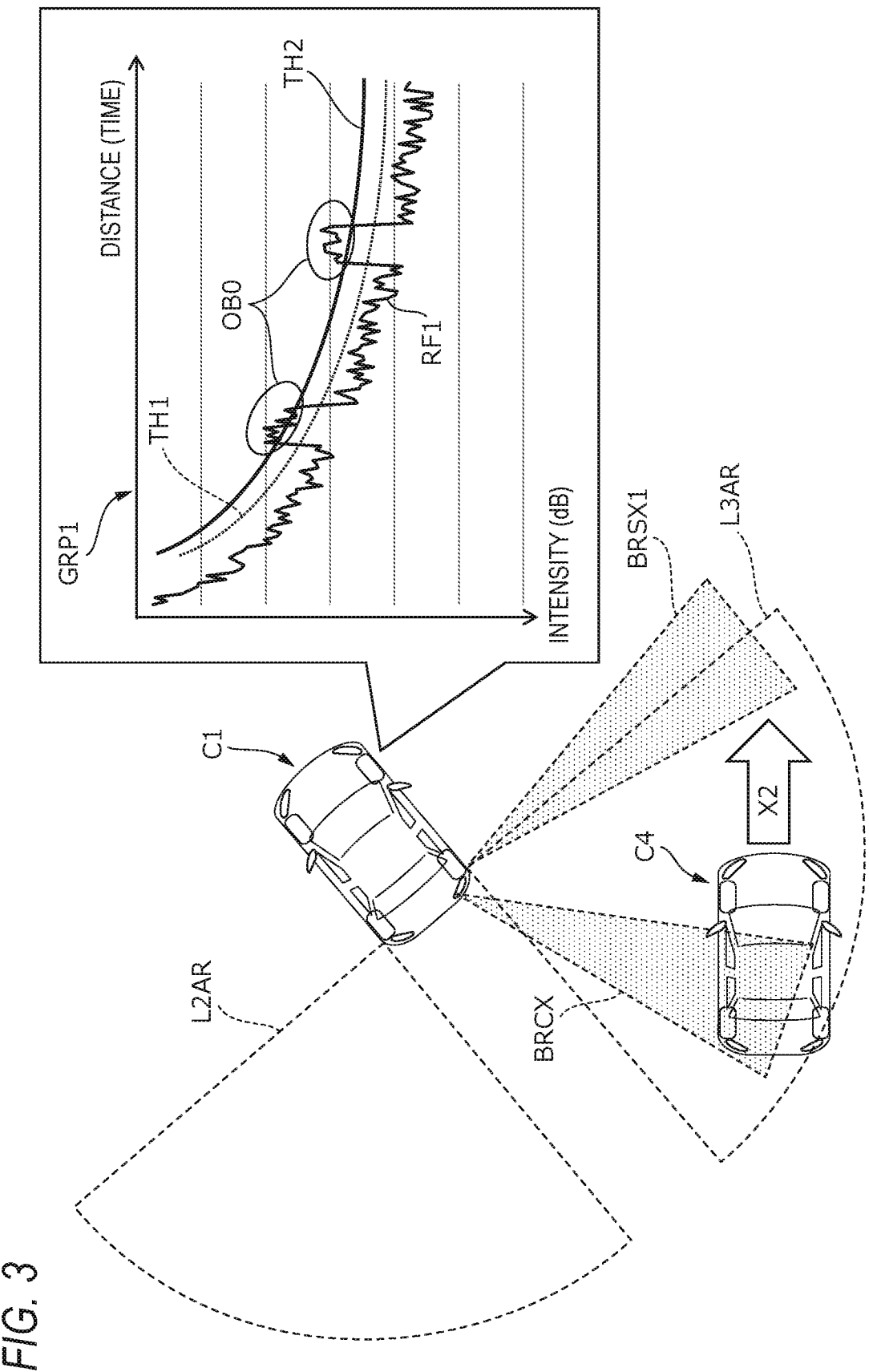
FIG. 3 is a diagram illustrating detection determination processing of a sonar.

First, an internal configuration of an own vehicle C1 according to a first embodiment will be described with reference to FIGS. 1, 2, and 3. FIG. 1 is a diagram illustrating an example of the internal configuration of the own vehicle C1 according to the first embodiment. FIG. 2 is a diagram illustrating an example of internal configurations of a sonar 12 and a radar 13 according to the first embodiment. FIG. 3 is a diagram illustrating detection determination processing of the sonar 12.

The own vehicle C1 according to the first embodiment is not limited to a vehicle manually driven by a driver, and may be an automatic driving vehicle. The own vehicle C1 reverses or advances by automatic driving, and parks at a set parking position or travels toward a set destination.

The own vehicle C1 includes a vehicle control device 20 that is an example of a computer. The vehicle control device 20 includes a mechanical sensor 10, at least one camera 11, twelve sonars 12, three radars 13, a memory 14, a human machine interface (HMI) 15, a sensor control unit 16, a vehicle control unit 17, navigation (global positioning system (GPS)) 18, and an in-vehicle local area network (LAN) 19.

The in-vehicle LAN 19 is connected so as to be able to transmit and receive data between units mounted on the own vehicle C1. The units mentioned here are the mechanical sensor 10, at least one camera 11, twelve sonars 12, three radars 13, the memory 14, the HMI 15, the sensor control unit 16, the vehicle control unit 17, and the navigation 18. Although various sensors such as the mechanical sensor 10, the camera 11, the sonar 12, and the radar 13 are included as elements of the vehicle control device 20 in FIG. 1, the grouping in a block diagram in the vehicle is arbitrary, so the vehicle control device 20 may be configured by another group. For example, the vehicle control device 20 may be configured to include the memory 14, the sensor control unit 16, and the vehicle control unit 17, sensors such as the mechanical sensor 10, the camera 11, the sonar 12, and the radar 13 may be connected to the vehicle control device 20 via the in-vehicle LAN 19, and the vehicle control device 20 may process information obtained by the sensors to perform vehicle control.

The mechanical sensor 10 includes, for example, various sensors that measure a steering angle, a gear position, speed information, or the like of the own vehicle C1. The mechanical sensor 10 outputs a measurement result to the sensor control unit 16 via the in-vehicle LAN 19.

The camera 11 includes a solid-state imaging device (image sensor) such as a charge-coupled device (CCD) or a complementary metal-oxide-semiconductor (CMOS), focusing light from a subject to form an image, converts the formed optical image into an electric signal, and outputs a video signal. The camera 11 outputs a video signal output from a captured image (captured video) to the sensor control unit 16. The own vehicle C1 includes at least two cameras 11, and images regions in the front-rear and left-right directions of the own vehicle C1.

Figure 4:
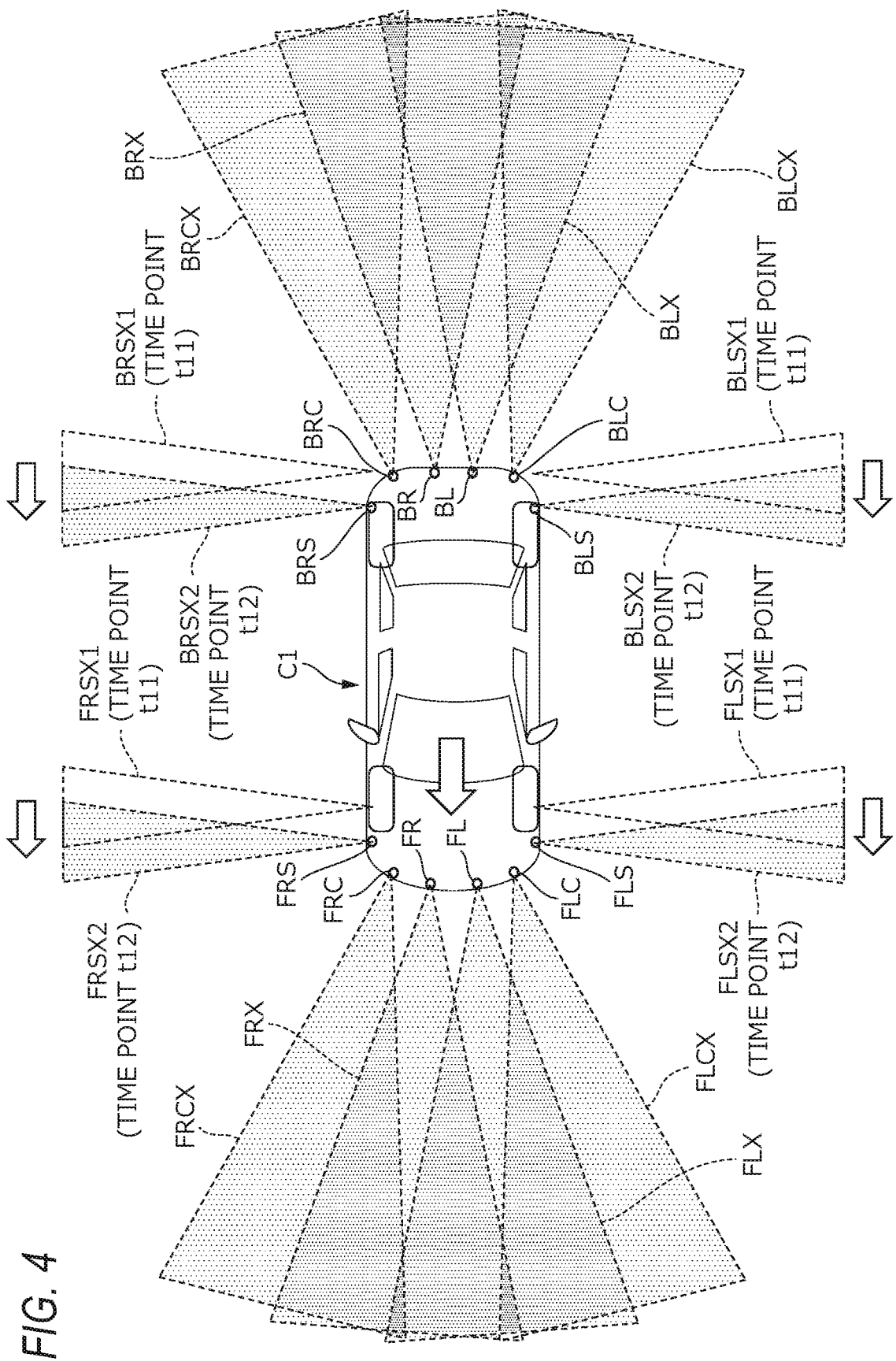
FIG. 4 is a diagram illustrating an arrangement example and a detection range example of the sonar of the own vehicle according to the first embodiment.

The twelve sonars 12, as an example of an acquisition unit and obstacle detection means, are controlled by the sensor control unit 16, and detect objects located on the front, rear, left, and right sides of the own vehicle C1. The twelve sonars 12 output detection information to the sensor control unit 16. In the detection information, data including information on a distance to a detected object and identification information enabling identification of the sonars are associated with each other. As illustrated in FIG. 4, the own vehicle C1 includes twelve sonars 12 on a bumper that are disposed so as to be able to detect objects located on the front, rear, left, and right sides of the own vehicle C1. Each sonar 12 includes a controller 12A, a drive circuit 12B, a piezoelectric element 12C, and a reception circuit 12D.

The controller 12A causes the drive circuit 12B to generate an AC voltage based on a control command output from the sensor control unit 16, applies the AC voltage to the piezoelectric element 12C, and causes the piezoelectric element 12C to transmit an ultrasonic wave. The piezoelectric element 12C receives a reflected wave of the transmitted ultrasonic wave, converts the reflected wave into an AC voltage, and outputs the AC voltage to the reception circuit 12D. The reception circuit 12D amplifies and detects the AC voltage output from the piezoelectric element 12C, and outputs a result to the controller 12A. Here, the ultrasonic wave transmitted by the piezoelectric element 12C is a pulsed ultrasonic wave, and a distance to an object such as a road surface or an obstacle is specified based on time elapsing until reception (detection) of the reflected wave (that is, an echo waveform), which hits and is reflected by the object, by the piezoelectric element 12C. The controller 12A outputs information on the specified distance to the sensor control unit 16.

The three radars 13, as an example of an acquisition unit and obstacle detection means, are controlled by respective controllers 13A based on a control command output from the sensor control unit 16. Each radar 13 has an array antenna element group 13C in which antenna elements are arranged two-dimensionally in a lattice pattern, and under the control of the controller 13A, a drive circuit 13B applies a high frequency wave to the antenna elements, whose phase is shifted according to a position on the lattice of each antenna element. The array antenna element group 13C converts the applied high frequency wave into a radar wave, and transmits a radar wave having directivity in a specific direction corresponding to a phase difference. The radar 13 periodically changes (scans or sweeps) a transmission direction of the radar wave by the drive circuit 13B changing a phase difference between the antenna elements by a time function. When a reflected wave generated by reflecting a radar wave by an object is received by an antenna, an azimuth of the object reflecting the radar wave corresponds to a direction in which the radar wave having directivity is transmitted, and a transmission direction of the radar wave changes in a time function, so that the azimuth of the object can be specified based on a reception time point of the reflected wave. The antenna for receiving the radar wave reflected by the object may be the array antenna element group 13C or another antenna (not shown). If a high frequency wave to be transmitted is appropriately modulated, a transmission antenna can also be used as a reception antenna. When the array antenna element group 13C is also used as a reception antenna, since directivity can be provided so as to selectively receive a radar wave in the transmission direction, it is possible to suppress the generation of a ghost (that is, a ghost whose radio wave path cannot be specified, unlike a ghost such as a mirror ghost whose radio wave path can be specified) due to a radio wave coming from a direction different from the transmission direction of the radar wave. If a high frequency wave to be transmitted is FM-modulated, a distance to an object reflecting a radar wave can be detected as a difference between a frequency of a received wave and a frequency of a transmitted wave at that time. When the object reflecting the radar wave is approaching, the frequency of the received wave increases due to the Doppler effect, and thus an approach speed can be detected by detecting an increment of the frequency. The detection of the distance and/or the detection of the approach speed are performed by a reception circuit 13D, and detection results are output to the controller 13A.

Figure 5:
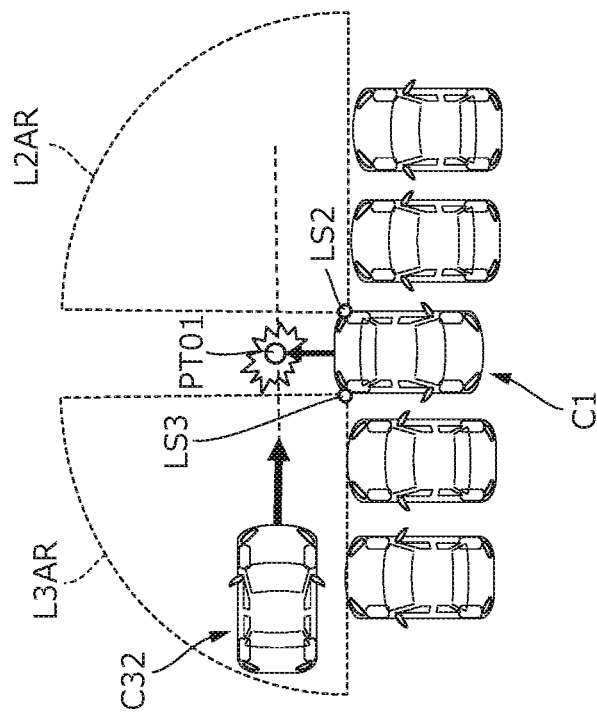
FIG. 5 is a diagram illustrating an arrangement example and a scanning range example of the radar of the own vehicle according to the first embodiment.
Figure 5:
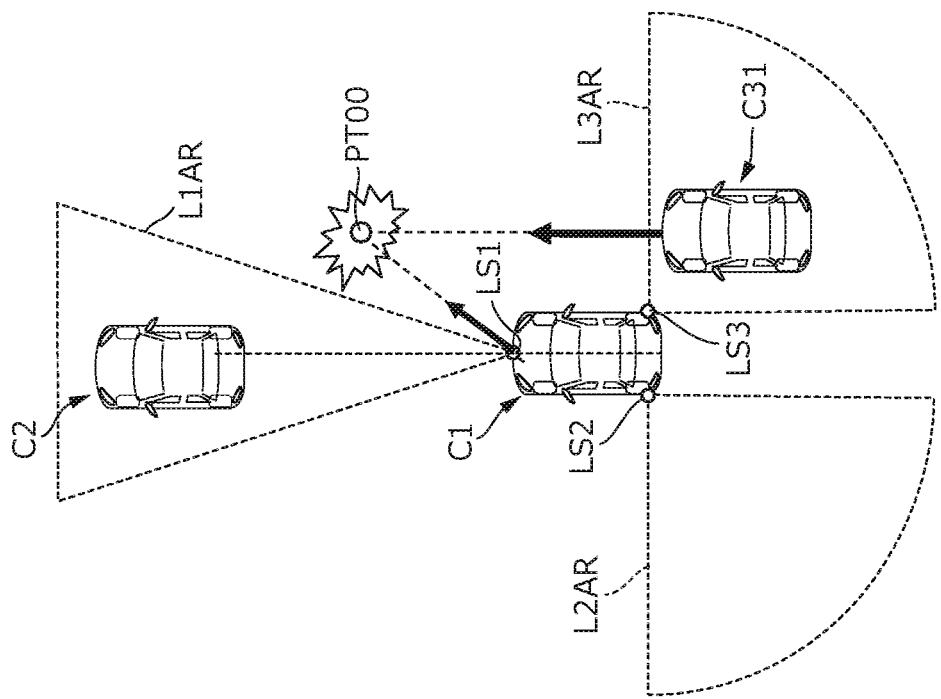

The controllers 13A of the three radars 13 output, to the sensor control unit 16, detection information obtained by adding identification information enabling identification of the radars to data of a direction, a distance, and an approach speed of the detected object. As illustrated in FIG. 5 (left), the own vehicle C1 includes three radars 13 that are disposed so as to be able to detect approaching objects approaching the own vehicle C1 from the front side, the right rear side, and the left rear side. Each radar 13 includes the controller 13A, the drive circuit 13B, the array antenna element group 13C, and the reception circuit 13D.

The memory 14 includes, for example, a random access memory (RAM) serving as a work memory used when processing of the sensor control unit 16 and the vehicle control unit 17 are executed, and a read only memory (ROM) that stores a program defining the processing of the sensor control unit 16 and the vehicle control unit 17. The RAM temporarily stores data generated or acquired by the sensor control unit 16 and the vehicle control unit 17. The program that defines the processing of the sensor control unit 16 and the vehicle control unit 17 is written in the ROM. The memory 14 may include anon-volatile rewritable magnetic recording device, an electrically rewritable ROM such as an electrically erasable and programmable read-only memory (EEPROM), or a flash memory. These non-volatile memories may store a position and a range of a fixed shielding object such as a guardrail. Since the information stored in the non-volatile memory is held even when the vehicle is parked and the power supply is completely turned off, for example, position information of a shielding object detected at the time of parking can be used when the vehicle leaves the parking lot.

The HMI 15 includes input/output devices such as a display, a touch panel, a switch (button), and a speaker. The touch panel is integrally mounted on a surface of the display. The switch (button) is not limited to a mechanical switch. A button displayed on the display may function as a switch and an operation on the button may be sensed via the touch panel. The HMI 15 is capable of accepting an operation performed by a passenger of the own vehicle C1, and converts operation contents accepted via an input device such as the touch panel or the switch (button) into an electric signal and outputs the electric signal to the vehicle control unit 17. The HMI 15 outputs, to an output device such as the display or the speaker, advance notice information for giving advance notice of execution of emergency braking, warning information for giving notice of execution of deceleration control, and the like, which are output from the vehicle control unit 17.

The sensor control unit 16 is configured using, for example, a central processing unit (CPU) or a field programmable gate array (FPGA), and performs various types of processing and controls in cooperation with the memory 14. Specifically, the sensor control unit 16 implements various functions by referring to a program held in the memory 14 and executing the program. The number of CPUs or FPGAs is not limited to one, and a plurality of CPUs or FPGAs may be implemented so that a plurality of programs can be executed at the same time. A CPU or an FPGA that executes a part of the functions of the sensor control unit 16 may be built in a housing of a sensor such as the camera 11, the sonar 12, and the radar 13. FIG. 1 is a block diagram illustrating a group of functions, and does not specify an arrangement in the vehicle.

The sensor control unit 16 controls transmission of an ultrasonic wave by the sonar 12 and transmission of a radio wave by the radar 13. The sensor control unit 16 executes control for causing the sonar 12 and the radar 13 to transmit an ultrasonic wave and a radio wave, and evaluates ghost likelihood or a safety level based on detection information obtained by detection by the sonar 12 and the radar 13. The sensor control unit 16 executes collision determination for the own vehicle C1 and an approaching object based on the evaluated ghost likelihood or safety level, and determines whether emergency braking is necessary. Note that in the evaluation of the ghost likelihood and the safety level and the collision determination, it is not that only instantaneous numerical values at that time are evaluated, but the processing is performed by referring to time series of numerical values. The memory 14 stores time series of the detection information, the ghost likelihood or the safety level, and the sensor control unit 16 refers to and processes time series of data (numerical values) stored in the memory 14 to perform the evaluation and determination.

The own vehicle C1 includes a total of twelve sonars, four sonars on each of the front and rear bumpers, and two sonars on each of the left and right sides. The sonar 12 transmits an ultrasonic wave from the piezoelectric element 12C, and receives a reflected wave reflected by an object around the vehicle by the same piezoelectric element 12C. The reception circuitry 12D generates waveform data of the reflected wave that is based on temporal change in intensity of the reflected wave. The controller 12A converts, based on the generated waveform of the reflected wave (that is, echo waveform), time elapsing until rising of the waveform of the reflected wave (echo waveform) into a distance, and calculates a distance between the sonar 12 and the object. The sensor control unit 16 specifies a relative position (relative coordinates) of the object with respect to a vehicle body by utilizing the principle of trilateration based on distances between the plurality of sonars 12 and the object that are calculated by the plurality of sonars 12 respectively. The position of the object whose position is specified is hereinafter referred to as a detection point.

The sonar 12 receives not only a reflected wave (ultrasonic wave) reflected by an object but also a reflected wave (ultrasonic wave) reflected by a road surface. The sonar 12 detects a detected object such as an obstacle based on a first threshold used for excluding a reflected wave reflected by a road surface from among received reflected waves. Since the ultrasonic wave is rapidly attenuated in the air, the first threshold is set such that the threshold decreases as time elapsing from a timing at which the reflected wave is transmitted to a timing at which the reflected wave is received increases (that is, as a distance from the sonar 12 increases). By the exclusion using the first threshold, a weak reflected wave from a relatively small object is also excluded from the detection together with a reflected wave reflected by a road surface.

Further, the sensor control unit 16 determines, based on an intensity of a detected reflected wave, whether a detected object is an object capable of shielding the own vehicle C1 from the approach of an approaching object. The sensor control unit 16 determines whether the intensity of the detected reflected wave is equal to or greater than a second threshold that is greater than the first threshold, and when the intensity of the reflected wave is determined to be equal to or greater than the second threshold, determines that a detected object is a shielding object candidate. That is, among detection points, a detection point having a large intensity of the reflected wave is a shielding object candidate. This is because an object capable of shielding the own vehicle from an approaching object should have a corresponding size, and for the corresponding size, a correspondingly large intensity of the reflected wave can be expected. Even for objects having the same size, an object located farther has a weaker reflected wave. Accordingly, the second threshold is set similarly to the first threshold such that the threshold decreases as time elapsing from a timing at which the reflected wave is transmitted to a timing at which the reflected wave is received increases (that is, as a distance from the sonar 12 increases), and the second threshold is set to a value larger than the first threshold at the same time (or at the same detection distance). When a plurality of shielding object candidates are detected by a plurality of sonars and it is estimated based on coordinates of the plurality of object candidates that the shielding object candidates are arranged in a line, the sensor control unit 16 estimates that a shielding object is present. A plurality of coordinates of a shielding object candidate may be detected at the same time, or may be acquired in a time-series manner by repeating the detection. It is not essential to select a shielding object candidate from detection points based on the intensity of the reflected wave. For example, if detection is performed using a threshold corresponding to a reflected wave from an object having an adequate size that can shield the own vehicle from an approaching object, without using a threshold at which even a relatively small obstacle can be detected, the detection points are all shielding object candidates, and thus selection is not necessary. Therefore, hereinafter, the shielding object candidate is not distinguished from the detection point, and all of the shielding object candidates are referred to as detection points. In addition, the likelihood of a shielding object may be determined based on a positional relationship between detection points. The evaluation of the positional relationship between detection points will be described later.

The radar 13 mounted on the own vehicle C1 transmits a radio wave while periodically scanning in the transmission direction, and receives a reflected wave at the same time. Objects around the vehicle, to which radio waves are emitted, are all reflecting bodies that return reflected waves. The radar 13 extracts, as an approaching object, a reflecting object approaching the own vehicle C1 from among the reflecting objects, and outputs detection information of the approaching object to the sensor control unit 16.

Specifically, since the radio wave transmitted by the radar 13 propagates at the speed of light, a transmission direction of radio wave at the time of reception of a reflected wave and a direction toward a reflecting body that reflects the radio wave are the same direction. Therefore, the direction toward the reflecting body can be specified as the transmission direction of the radio wave. Further, a distance L between the radar 13 and the reflecting body can be calculated based on a time-point difference between a transmission time point of the radio wave and a reception time point of the reflected wave of the radio wave. The radar 13 specifies coordinates of the reflecting body based on the calculated distance L and the transmission direction of the radio wave. When the reflecting body is an approaching object, a Doppler shift occurs in the radio wave reflected by the reflecting body and received by the radar 13 such that a frequency of the reflected wave is higher than a frequency of the transmitted wave. Since a difference between the frequencies of the transmitted wave and the reflected wave is proportional to an approach speed at which the reflecting body approaches the own vehicle C1, the radar 13 calculates the approach speed of the reflecting body based on the frequency difference between the frequency of the reflected wave and the frequency of the transmitted wave, and outputs detection information including the approach speed and the coordinates of the reflecting body to the sensor control unit 16.

Note that the above-described Doppler shift also occurs when the own vehicle C1 travels and approaches the reflecting body even if the reflecting body is a stationary object. Since the detection information of the approaching object received by the sensor control unit 16 includes detection information of such a stationary object, the sensor control unit 16 offsets the calculated approach speed of the reflecting body and an approach speed calculated based on a speed of the own vehicle C1, based on speed information of the own vehicle C1 output from the mechanical sensor 10 and an azimuth of the reflecting body. When a speed after the offsetting is roughly zero, the sensor control unit 16 determines that the detected reflecting body is a stationary object (that is, not an approaching object), and excludes the reflecting body from targets of collision determination processing to be described below. In this way, the sensor control unit 16 can distinguish whether the detected reflecting body is a stationary object or an approaching object.

The radio wave may be reflected by a reflecting body such as a guardrail, the reflected wave may be reflected by the own vehicle C1, and the reflected wave reflected by the own vehicle C1 may be reflected again by the guardrail and be received by the radar. This is a phenomenon in which a guardrail acts like a mirror surface for radio waves and it is detected as if a vehicle is located on the other side of the guardrail, and such a "detected vehicle" is referred to as a mirror ghost or simply a ghost. When the own vehicle C1 is approaching a guardrail, a ghost is also observed as approaching the guardrail at the same speed, and thus an approach speed of the ghost with respect to the own vehicle C1 is twice an approach speed of the own vehicle C1 with respect to the guardrail. Since the guardrail can also be detected by the sonar, a position of a reflecting body is estimated based on detection information of the sonar, and if a position, at which a ghost calculated based on the position of the reflecting body can be detected, and a position of an approaching object detected by the radar are roughly the same position, an estimation that the detected approaching object is a ghost is evaluated to be likely (the ghost likelihood is high). The sensor control unit 16 determines whether the approaching object detected by the radar 13 is a ghost based on the evaluated ghost likelihood. If the approaching object is a ghost, the approaching object does not collide with the own vehicle C1, and thus the sensor control unit 16 evaluates the safety level to be high. In a case where a continuous object such as a guardrail is detected by the sonar, if an approaching object is located on the other side of the continuous object, it is expected that the continuous object serves as a shielding object to shield the own vehicle from the approach of the approaching object. Accordingly, the situation is evaluated to be one in which the safety level is high. The sensor control unit 16 determines, based on the evaluated safety level, whether the own vehicle C1 and the approaching object are about to collide with each other (collision determination processing). When it is determined, as a result of the collision determination, that the own vehicle C1 and the approaching object are about to collide with each other within predetermined time, the sensor control unit 16 causes the vehicle control unit 17 to execute the emergency braking or the deceleration control.

The vehicle control unit 17 executes various types of control (for example, adjustment of a steering angle, advancing, reversing, emergency braking, and deceleration control) on motions of the own vehicle C1 based on control information output from the sensor control unit 16. When executing the emergency braking based on the control information output from the sensor control unit 16, the vehicle control unit 17 executes the emergency braking after causing the HMI 15 to output an advance notice or a warning that the emergency braking is to be executed.

The navigation 18 is a navigation system in which a magnetic compass, an acceleration sensor, and a GPS are built. The navigation 18 receives a satellite positioning signal transmitted from an artificial satellite (not shown), and calculates, by an arithmetic operation, position information of the own vehicle C1 based on the received satellite positioning signal. Even when the satellite positioning signal cannot be received, the navigation 18 can specify the position of the own vehicle C1 by specifying a movement amount and a movement direction of the own vehicle C1 at any time using the built-in magnetic compass, the acceleration sensor, and speed information obtained from the vehicle control unit 17. The navigation 18 stores map information, generates an image indicating the position of the own vehicle C1 on a map, and outputs the image to the HMI 15.

Here, the detection ranges of the twelve sonars 12 provided in the own vehicle C1 will be described with reference to FIG. 4. FIG. 4 is a diagram illustrating an arrangement example and a detection range example of the sonars 12 of the own vehicle C1 according to the first embodiment. The arrangement example and the detection range example of the twelve sonars illustrated in FIG. 4 are merely examples, and the present disclosure is not limited thereto.

The own vehicle C1 includes four sonars FRC, FR, FL, and FLC on a front bumper of the own vehicle C1, two side sonars (sonars FRS and BRS) on a right side surface of the own vehicle C1, two side sonars (sonars FLS and BLS) on a left side surface of the own vehicle C1, and four sonars BRC, BR, BL, and BLC on a rear bumper of the own vehicle C1.

The sonar FRC detects an object in a detection range FRCX. The sonar FR detects an object in a detection range FRX. The sonar FL detects an object in a detection range FLX. The sonar FLC detects an object in a detection range FLCX.

The four sonars FRC, FR, FL, and FLC mounted on the front bumper form a front sonar group having detection ranges in front of the own vehicle C1, and the detection ranges overlap each other as illustrated in FIG. 4. However, an actual detection range does not have a clear boundary line as illustrated in FIG. 4, and even at a position slightly away from the illustrated detection range, an object can be detected as long as the object is large. For example, an object in the vicinity of the front of the vehicle can be detected by two sonars FR and FL, and the object can also be detected by the sonars FRC and FLC at corner portions as long as the object is large. The sensor control unit 16 calculates coordinates (detection points) of a detected object detected in front of the own vehicle C1, based on two pieces of detection information output from two sonars among the four sonars FRC, FR, FL, and FLC. A long object such as a guardrail may be detected at the same time by three or more sonars. Since one coordinate is calculated for a combination of detection information of two sonars, a plurality of coordinates (detection points) may be calculated at the same time when three or more sonars detect the object at the same time. For example, when a reflected wave of a sound wave transmitted by the sonar FR was detected by three sonars FRC, FR, and FL, three coordinates (detection points) can be calculated by one detection by trilateration in which a line segment connecting the sonars FRC and FR is set as one side, trilateration in which a line segment connecting the sonars FR and FL is set as one side, and trilateration in which a line segment connecting the sonars FRC and FL is set as one side.

A detection range of the sonar FRS mounted on the right side surface (closer to the front portion) of the own vehicle C1 moves from a detection range FRSX1 to a detection range FRSX2 as the own vehicle C1 travels and a position of the sonar FRS moves. The detection range FRSX1 is a detection range of the sonar FRS at a traveling position of the own vehicle C1 at a time point t11. The detection range FRSX2 is a detection range of the sonar FRS at a position of the own vehicle C1 at a time point t12 to which time advances from the time point t11 by one detection interval. An object located on the side of the own vehicle C1 is detected a plurality of times as the own vehicle C1 travels past the side, and a plurality of pieces of distance information are obtained with a plurality of sonar positions serving as starting points. The sensor control unit 16 calculates, by trilateration, coordinates of a detected object detected on the right side (closer to the front portion) of the own vehicle C1, based on detection information that is obtained in a plurality of times and that is output from the sonar FRS in a time-series manner. For example, when a distance to an object on the right side is detected three times, at least two detection points are obtained.

The sonar BRS mounted on the right side surface (closer to the rear portion) of the own vehicle C1 has a detection range on the right side (closer to the rear portion) of the own vehicle C1. When a large object such as a guardrail is present on the side, a reflected wave of a sound wave transmitted from the sonar FRS may be detected by the sonar BRS, and the sonar FRS may detect a reflected wave of a sound wave of the sonar BRS on an inversed path. The sensor control unit 16 basically calculates coordinates of a detected object on the side based on detection information that is obtained in a plurality of times and that is output from the sonar BRS in a time-series manner. When the reflected wave is also detected by the sonar FRS, the coordinates of the detected object are additionally calculated by trilateration in which a line segment connecting the sonars FRS and BRS is set as one side. The sonar FRS and the sonar BRS can be referred to as a right sonar group having detection ranges on the right side of the own vehicle C1.

Since a detection mechanism of a left sonar group (sonars FLS and BLS) mounted on the left side surface of the own vehicle C1 and having detection ranges on the left side is the same as that of the right sonar group (sonars FRS and BRS), a description thereof will be omitted.

The sonar BRC detects an object in a detection range BRCX. The sonar BR detects an object in a detection range BRX. The sonar BL detects an object in a detection range BLX. The sonar BLC detects an object in a detection range BLCX.

The four sonars BRC, BR, BL, and BLC mounted on the rear bumper of the vehicle form a rear sonar group as a whole having detection ranges on the rear side of the vehicle. Since a detection mechanism of the rear sonar group is the same as that of the front sonar group (sonars FRC, FR, FL, and FLC), a description thereof will be omitted.

As described above, the own vehicle C1 according to the first embodiment can detect an object located around the own vehicle C1 by the twelve sonars, but not all directions can be detected, and there is a blind spot that cannot be detected by the sonars. For example, an object deviated to the right side from the detection range of the sonar FRC at the right corner when the vehicle advances is not detected by the sonars until the own vehicle C1 advances and the object enters the detection range of the sonar FRS on the right side surface. The same applies to the detection ranges of the sonar BRC and the sonar BRS when the vehicle reverses.

Next, three radars LS1, LS2, and LS3 provided in the own vehicle C1 will be described with reference to FIG. 5. FIG. 5 (left) titled <IN TRAVELING> is a diagram illustrating an arrangement example and a scanning range example of the radars LS1 to LS3 of the own vehicle C1 according to the first embodiment. The arrangement example and the scanning range example of the three radars illustrated in FIG. 5 (left) titled <IN TRAVELING> are merely examples, and the present disclosure is not limited thereto.

The radar LS1 is provided in the front portion of the own vehicle C1 and is used for a front collision prevention function of the own vehicle C1. The radar LS1 detects a reflecting object in a scanning range L1AR. The scanning range L1AR of the radar LS1 is made narrower as compared with scanning ranges L2AR and L3AR of the other radars LS2 and LS3 in order to detect a reflecting body (for example, another vehicle or the like) located at a longer distance from the own vehicle (own vehicle C1) earlier.

The radar LS2 is provided on a left rear side of the own vehicle C1, and detects a reflecting body in the scanning range L2AR. The radar LS3 is provided on a right rear side of the own vehicle C1, and detects a reflecting body in the scanning range L3AR on the right rear side. The radars LS2 and LS3 are used for a blind spot warning function. Here, the blind spot warning function is a function of detecting another vehicle (for example, another vehicle C3) traveling at a diagonal rear side of the own vehicle C1, which is likely to become a blind spot for a driver during traveling, and notifying (warning) the driver of the presence of the detected another vehicle.

Here, an example of detection of another vehicle C2 and emergency braking, and an example of detection of another vehicle C31 and blind spot warning, which are executed by the own vehicle C1 in traveling illustrated in FIG. 5 (left), will be described.

First, the example of emergency braking will be described. Here, it is assumed that the own vehicle C1 in traveling illustrated in FIG. 5 (left) is traveling straight ahead. The radar LS1 of the own vehicle C1 transmits a radio wave toward the front side of the own vehicle C1, and receives a reflected wave reflected by the other vehicle C2 (that is, a reflecting body) traveling in front of the own vehicle C1. The radar LS1 outputs detection information (for example, presence or absence, an azimuth, a distance, and an approach speed of a detected object) related to the received reflected wave to the sensor control unit 16.

The sensor control unit 16 refers to the detection information that is related to the reflected wave and output from the radar LS1. When a detected object is present, an azimuth of the detected object intersects a traveling direction of the own vehicle C1, and a distance therefrom is equal to or less than a predetermined threshold, the sensor control unit 16 performs collision determination. At this time, when the other vehicle C2 is stopped, an approach speed included in the detection information is a value corresponding to a vehicle speed of the own vehicle C1. When it is determined, as a result of the collision determination, that there is a possibility of a collision within predetermined time, the sensor control unit 16 sends a command to the HMI 15 to notify the driver of a warning. When the driver does not perform avoidance by steering or perform braking by a brake operation within predetermined time, the sensor control unit 16 commands the vehicle control unit 17 to execute emergency braking.

Next, the example of blind spot warning will be described. In FIG. 5 (left), it is assumed that the own vehicle C1 in traveling starts steering to a right direction. By this steering, a moving direction of the own vehicle C1 is changed to a diagonally forward right direction. The radar LS3 transmits a radio wave toward the right rear side of the own vehicle C1, and receives a reflected wave reflected by the other vehicle C31 (that is, a reflecting body) approaching the own vehicle C1 from a diagonally right rear side of the own vehicle C1. The radar LS3 outputs detection information (for example, presence or absence, an azimuth, a distance, and an approach speed of a detected object) related to the received reflected wave to the sensor control unit 16.

The sensor control unit 16 refers to the detection information output from the radar LS3. When a detected object is present on the right rear side, a distance therefrom is within a predetermined threshold, and an approach speed is equal to or higher than a predetermined threshold, the sensor control unit 16 determines that the other vehicle C31 is a risky approaching object, and performs collision determination. In such a case, the sensor control unit 16 estimates a movement trajectory of the other vehicle C31 based on time series of the detection information, in particular, a change over time of coordinates of the approaching object determined by azimuths and distances. The sensor control unit 16 executes collision determination for the own vehicle C1 and the other vehicle C31 based on the estimated movement trajectory of the other vehicle C31 and steering information and a traveling speed of the own vehicle C1 output from the mechanical sensor 10. When it is determined, as a result of the collision determination, that the own vehicle C1 and the other vehicle C31 are about to collide with each other at a position PT00, a warning is output by the HMI 15. When an avoidance operation by the steering of the driver is not performed within predetermined time, the vehicle control unit 17 is commanded to intervene in the steering through control on a steering angle actuator, and the course of the own vehicle C1 is returned to a straight advancing direction to avoid the collision.

In addition, an example of detection of another vehicle C32 and emergency braking executed by the own vehicle C1 in reverse illustrated in FIG. 5 (right) titled <IN REVERSING> will be described.

FIG. 5 (right) titled <IN REVERSING> illustrates a state in which the own vehicle C1 is leaving a parking lot by reversing from parallel parking. The radar LS3 transmits a radio wave toward the right rear side of the own vehicle C1, and receives a reflected wave reflected by the other vehicle C32 (that is, a reflecting body) approaching the own vehicle C1 from a diagonally right rear side of the own vehicle C1. The radar LS3 outputs detection information (for example, a transmission time point and a reception time point of the radio wave) related to the received reflected wave to the sensor control unit 16. The sensor control unit 16 specifies a position of the other vehicle C32 based on the detection information output from the radar LS3. The sensor control unit 16 determines that the other vehicle C32 is an approaching object, and sets the other vehicle C32 as a target of collision determination.

In such a case, the sensor control unit 16 estimates a movement trajectory of the approaching object based on an approach speed of the approaching object detected by the radar 13. The sensor control unit 16 executes collision determination processing for the own vehicle C1 and the approaching object based on the estimated movement trajectory of the approaching object and based on steering information and a traveling speed of the own vehicle C1 output from the mechanical sensor 10. In the example illustrated in FIG. 5 (right), when it is determined that the own vehicle C1 and the other vehicle C32 collide with each other at a position PT01 within predetermined time, the sensor control unit 16 generates a control command for requesting emergency braking and outputs the control command to the vehicle control unit 17. The vehicle control unit 17 executes emergency braking based on the control command output from the sensor control unit 16 to cause the vehicle to avoid the collision.

As described above, the own vehicle C1 according to the first embodiment can detect an approaching object around the own vehicle C1 using the three radars LS1 to LS3 and perform the collision determination processing based on the detection information to automatically avoid a collision.

In the following description, the illustration and the reference signs of the twelve sonars 12, the detection ranges of the twelve sonars 12, the three radars 13, and the scanning ranges of the three radars 13 may be omitted to facilitate understanding of the description. In addition, in the following description, each determination processing example of the time when the own vehicle C1 reverses will be described, but it is needless to say that the own vehicle C1 may advance or may perform advancing parking.

Figure 6:
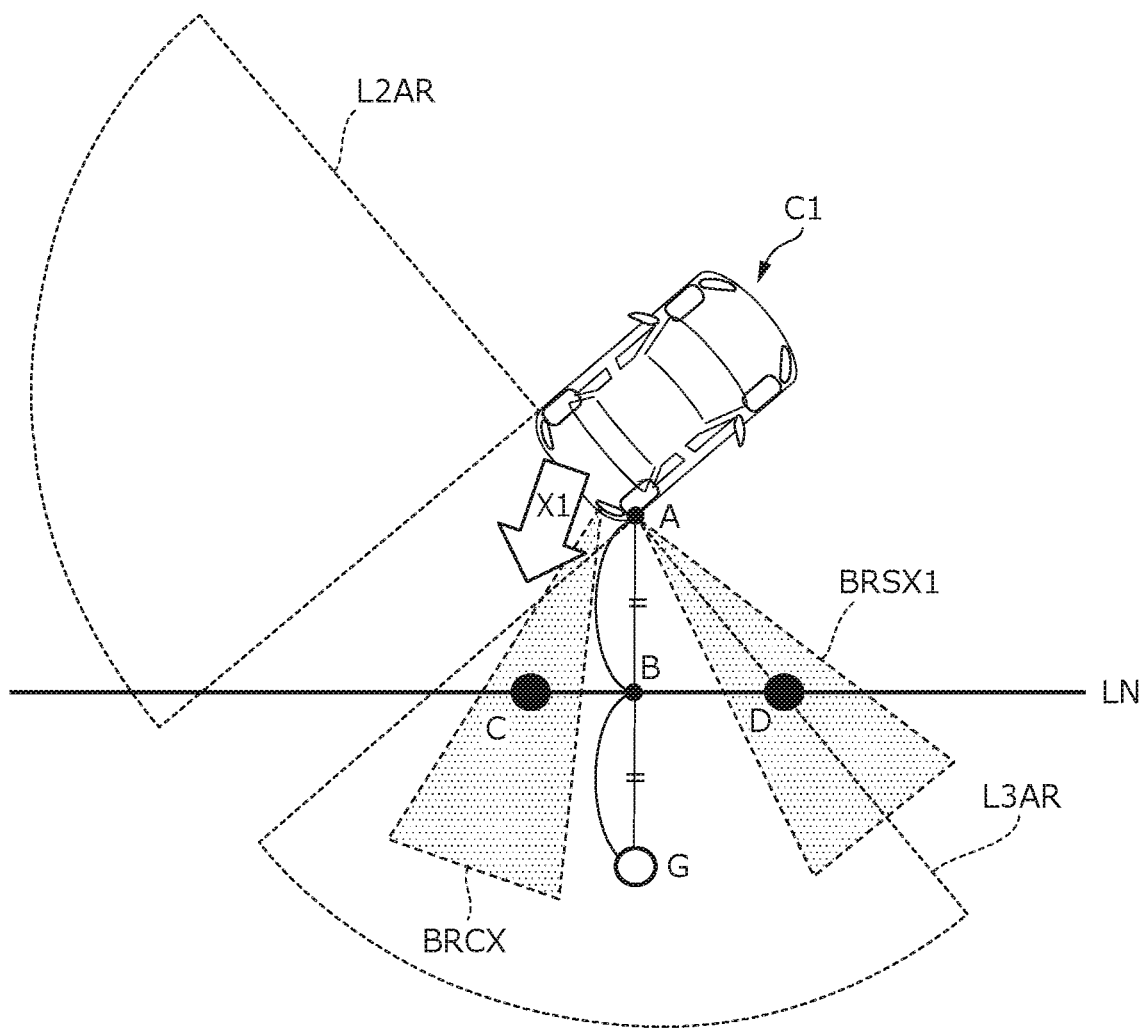
FIG. 6 is a diagram illustrating an estimated ghost position.

Next, a ghost and ghost likelihood evaluation processing will be described with reference to FIG. 6. FIG. 6 is a diagram illustrating an estimated ghost position. In FIG. 6, illustration of the two sonars BRS and BRC and the radar LS3 are omitted, and only the respective detection ranges are shown. Here, a ghost is detected as an approaching object as a result of a radio wave transmitted from the radar being received as a reflected wave after being subjected to multiple reflection, and indicates an approaching object (virtual image) that does not actually exist.

For example, in a case where the own vehicle C1 (own vehicle) performs reverse parking and a shielding object LN such as a wall exists behind a target parking position, there is a possibility that a radio wave transmitted by the radar is received after a reflected wave reflected by the shielding object LN is reflected by the own vehicle. In such a case, although there is a wall behind the own vehicle C1 and there is no other vehicle approaching from the right rear side of the own vehicle C1, the sensor control unit 16 may erroneously detect an approaching object (ghost) approaching the own vehicle C1 from the back of the wall. Hereinafter, a position where a ghost is erroneously detected will be described with reference to FIG. 6.

FIG. 6 illustrates a state in which the own vehicle C1 is reversing in a direction Xl. When two detection points C and D are detected by the two sonars BRS and BRC, the sensor control unit 16 estimates that there exists a shielding object LN passing through the detection points C and D. Here, when a radio wave transmitted from the radar LS3 (point A) is reflected by a point B on the shielding object LN, the shielding object LN acts like a mirror, and a virtual image (ghost) having no substance at a position of a point G may be detected.

Specifically, when the shielding object LN acts like a mirror, the radio wave of the radar LS3 may be received not only through a simple reflection path in which the path from transmission to reception is the point A (transmission position)→the point B→the point A (reception position), but also through a multiple reflection path in which the path is the point A (transmission position)→the point B→the point A→the point B→the point A (reception position). Here, a point obtained by dropping a perpendicular line from the point A onto the shielding object LN is set as the point B. In such multiple reflection, since a path length from transmission to reception is doubled, it looks as if the position (point B) at which a reflecting body is detected by the radar 13 is the point G. The point G is on a line connecting the point A and the point B, and is separated from the point A by twice the distance from the point A to the point B. That is, a point that is line-symmetrical to the point A with respect to the shielding object LN as a symmetry axis is the point G. Coordinates of the point G are likely coordinates as coordinates detected when a ghost is generated due to the presence of the shielding object LN. Therefore, when an approaching object is detected and coordinates of the approaching object are close to the point G, it may be determined that the likelihood of estimating the approaching object to be a ghost (ghost likelihood) is high.

An approaching object, which has a high ghost likelihood and is determined to be a ghost, needs to be excluded from targets of collision determination. An approach speed at which the ghost erroneously detected at the position of the point G approaches the own vehicle C1 is calculated to be twice the approach speed of an approaching object detected at the position of the point B by the radar 13. Therefore, when an approaching object is not excluded from the targets of the collision determination in ghost determination, it may be determined that there is an approaching object at the point G that rapidly approaches the own vehicle C1, and the vehicle control unit 17 may execute the emergency braking.

When the radar detects the point B as a stationary object, the point G may be estimated to be a ghost on the basis that the distance to the point G is twice the distance to the point B. However, when the distance between the point A and the point B is equal to or less than a lower limit distance of the detectable detection range of the radar 13, there is a possibility that the radar 13 does not detect the point B (the shielding object LN) but detects the ghost of the point G. In such a case, the sensor control unit 16 estimating the point G to be a ghost based on facts that an azimuth of the point G is the same as an azimuth of the point B and that the distance to the point G is twice the distance to the point B is not possible. In other words, determining an object to be a ghost based on a fact that a stationary object is detected at a position, where an azimuth thereof is the same as that of the object and a distance therefrom is half of a distance from the object, may be possible or not possible. In the present application, a method of evaluating ghost likelihood based on a positional relationship with a shielding object detected by a sonar is disclosed, and when a stationary object is detected at a position where an azimuth thereof is the same and a distance therefrom is half, the ghost likelihood may be estimated to be high.

The sensor control unit 16 according to the first embodiment executes ghost estimation of estimating whether an approaching object detected by the radar 13 is a ghost based on a positional relationship with a shielding object detected by the sonar, and evaluates the validity of the ghost estimation (hereinafter, referred to as "ghost likelihood").

Figure 7:
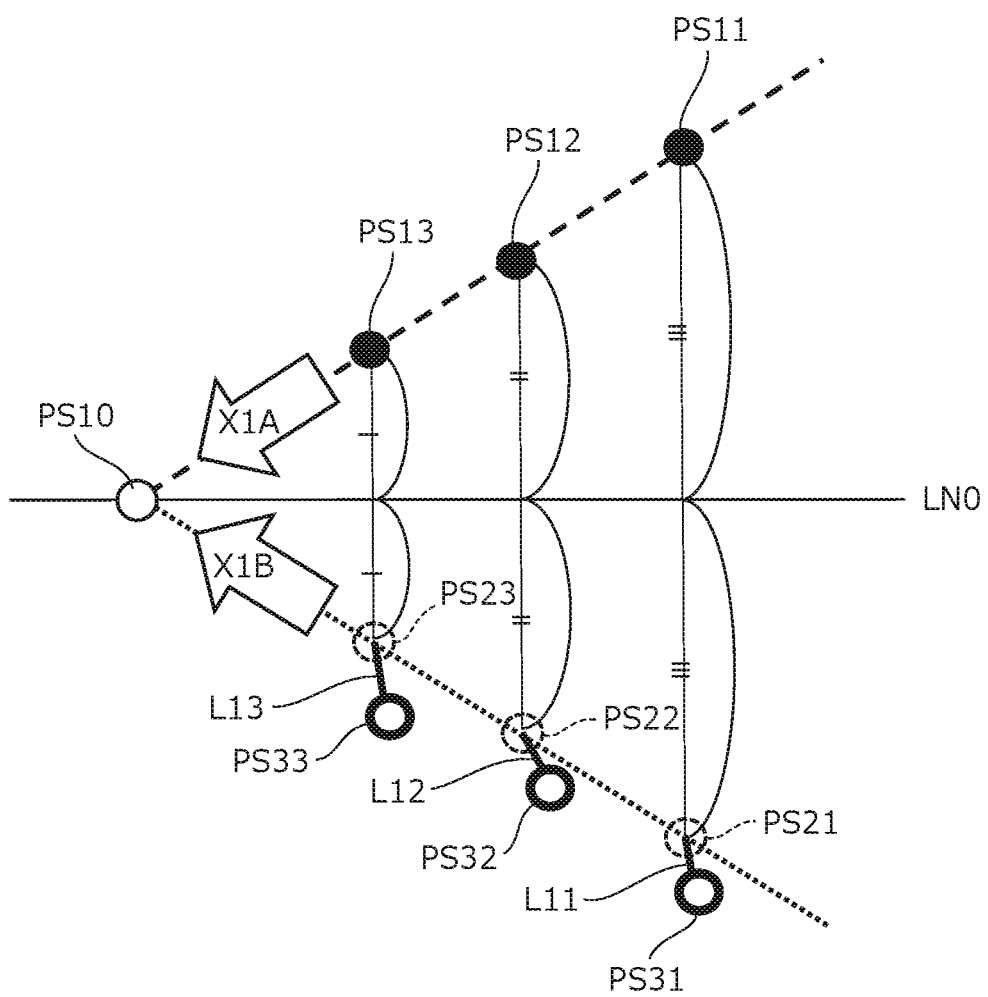
FIG. 7 is a diagram illustrating temporal ghost likelihood evaluation processing.
Figure 8:
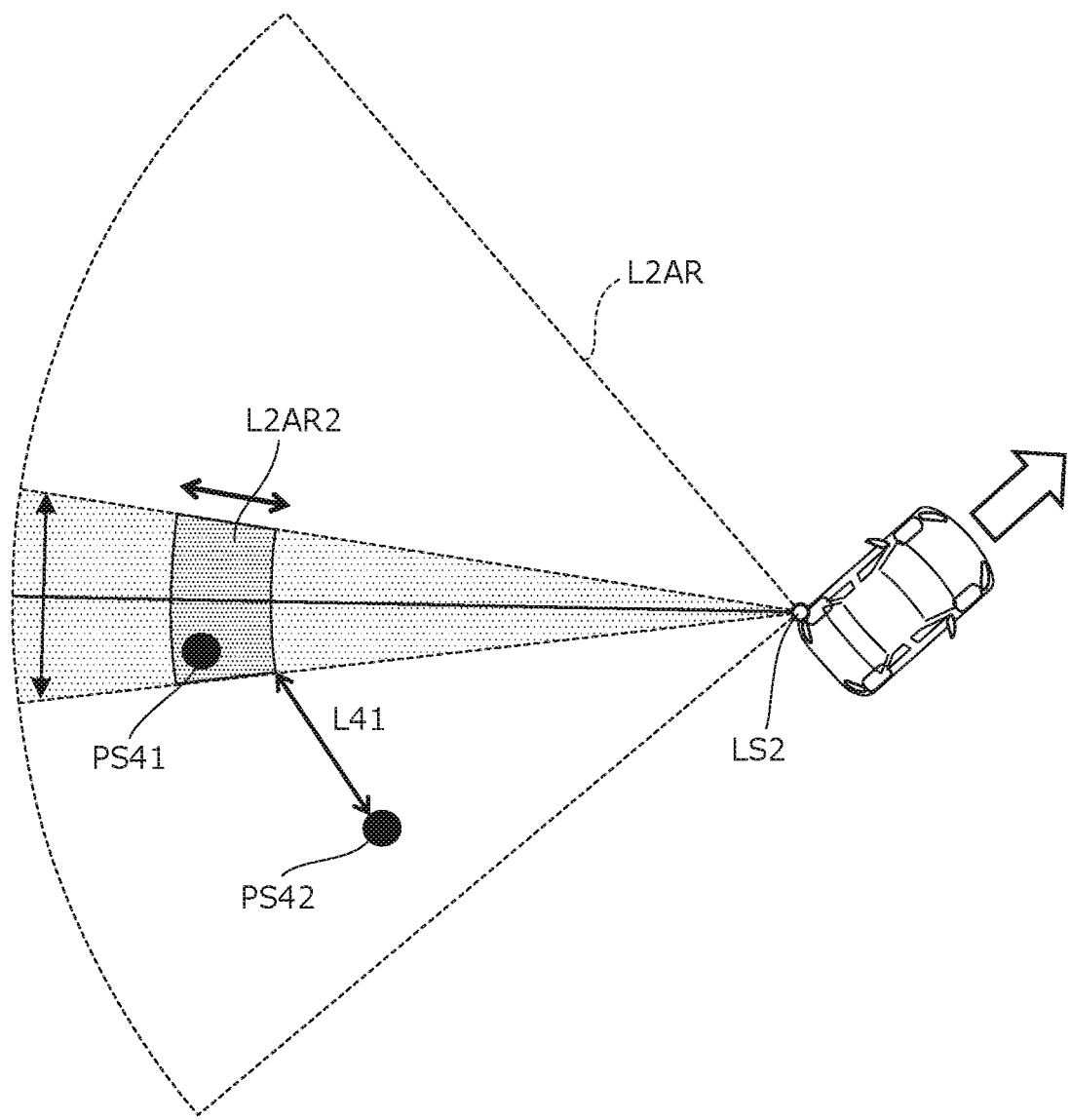
FIG. 8 is a diagram illustrating a criterion for ghost likelihood evaluation.

The ghost likelihood evaluation processing executed by the sensor control unit 16 will be described with reference to FIGS. 7 and 8. FIG. 7 is a diagram illustrating temporal ghost likelihood evaluation processing. FIG. 8 is a diagram illustrating a criterion for ghost likelihood evaluation. In FIG. 7, the own vehicle C1 is traveling in a direction X1A from a position PS11.

Based on detection information output from the sonar 12, the sensor control unit 16 estimates a position of a reflecting surface LN0 of the radio wave that may cause a ghost. The reflecting surface LN0 illustrated in FIG. 7 corresponds to the shielding object LN that is illustrated in FIG. 6 and that is estimated based on the detection points by the sonar.

The sensor control unit 16 estimates, as a position where a ghost may be generated (hereinafter, referred to as an "estimated ghost position"), a position (for example, the position of the point G illustrated in FIG. 6) that is line-symmetrical to the position of the radar 13 with respect to the reflecting surface LN0 estimated based on detection points of the sonar, and calculates coordinates of the estimated ghost position.

In addition, the sensor control unit 16 calculates a coordinate difference between coordinates of an approaching object and the coordinates of the estimated ghost position or a distance between a position of the approaching object and the estimated ghost position based on detection information output from the radar 13, and evaluates the ghost likelihood based on the calculated distance or the calculated coordinate difference, or based on distance proximity. In the detection information output by the radar, since the coordinates are specified based on distance and azimuth, the "coordinate difference (difference in coordinates)" referred here indicates a difference in distance and a difference in azimuth. The "distance" referred to here is, for example, a Euclidean distance. Further, the "distance proximity" may be an evaluation value (score) obtained by evaluating a coordinate difference based on a detection error of the radar 13 provided in the own vehicle C1, or may be an evaluation value (score) obtained by evaluating a Euclidean distance. Here, first, an example of evaluating the ghost likelihood based on a Euclidean distance will be described.

(Evaluation of Ghost Likelihood Based on Euclidean Distance)

In a case of evaluating the ghost likelihood based on a Euclidean distance, when the own vehicle C1 is located at the position PS11 illustrated in FIG. 7, the sensor control unit 16 calculates, as an estimated ghost position PS21, a position that is line-symmetrical to the position PS11 with the reflecting surface LN0 estimated based on detection information output from the sonar 12 as a reference axis, calculates a position PS31 of an approaching object based on detection information output from the radar 13, and calculates a distance L11 between the calculated estimated ghost position PS21 and the position PS31 of the approaching object as an error in ghost estimation. When the calculated distance L11 (error in ghost estimation) is small, the sensor control unit 16 evaluates the ghost likelihood to be high, and when the calculated distance L11 (error in ghost estimation) is large, the sensor control unit 16 evaluates the ghost likelihood to be low. The ghost likelihood is quantified as an evaluation value (score). A large evaluation value is given when the error in ghost estimation (distance L11) is small, and a small evaluation value is given when the error in ghost estimation (distance L11) is small.

Similarly, when the own vehicle C1 is located at a position PS12, the sensor control unit 16 calculates an estimated ghost position PS22 and a position PS32 of the approaching object, and calculates a distance L12 between the calculated estimated ghost position and the position of the approaching object. The sensor control unit 16 evaluates the ghost likelihood based on the calculated distance L12.

Similarly, when the own vehicle C1 is located at a position PS13, the sensor control unit 16 calculates a distance L13 between an estimated ghost position PS23 and a position PS33 of the approaching object. The sensor control unit 16 evaluates the ghost likelihood based on the calculated distance L13.

(Evaluation of Ghost Likelihood Based on Detection Error of Radar and Coordinate Difference)

Next, the criterion for evaluating the ghost likelihood will be described with reference to FIG. 8. When evaluating the ghost likelihood based on the detection information of the radar 13, a measure for evaluating the ghost likelihood may be a coordinate difference (difference in coordinates). Since the radar outputs a distance and an azimuth with the position of the radar as the origin, a position of an approaching object is specified on a polar coordinate system. Therefore, an estimated ghost position may be converted into a distance and an azimuth with the position of the radar as the origin, a difference between the azimuth of the estimated ghost position and an azimuth of the approaching object and a difference between the distance of the estimated ghost position and a distance of the approaching object may be obtained, and the ghost likelihood may be evaluated based on the difference between the azimuths and the difference between the distances (that is, the difference between the coordinates). Since the azimuth and the distance are different in dimension (unit), the azimuth and the distance cannot be evaluated by a common measure. The azimuth and the distance may be divided respectively by a reference of an azimuth difference (for example, a standard error of azimuth of the radar 13) and a reference of a distance difference (for example, a standard error of distance of the radar 13) to be dimensionless. An evaluation value (score) of the ghost likelihood may be calculated according to a total value (azimuth difference÷standard error of azimuth+distance difference÷standard error of distance) of dimensionless values (ratios to standard error), or the ghost likelihood may be evaluated according to a magnitude relationship between the reference of the azimuth difference (standard error of azimuth) and the reference of the distance difference (standard error of distance). For example, as illustrated in FIG. 8, the sensor control unit 16 evaluates an azimuth difference and a distance difference between a position of the own vehicle C1 and a detected object in a polar coordinate system in which the position of the radar 13 is the origin, based on the detection information output from the radar 13. The sensor control unit 16 determines whether an approaching object is located within a standard error range L2AR2 (a fan-shaped region in which a distance difference with an estimated position is within the standard error range of distance of the radar 13 and an azimuth difference with the estimated position is within the standard error range of azimuth of the radar 13) of the radar 13, which takes an estimated ghost position as a center.

When a position of the approaching object is a position PS41, the sensor control unit 16 determines that the approaching object is located within the standard error range L2AR2, and evaluates the ghost likelihood to be "100". On the other hand, when the position of the approaching object is a position PS42, the sensor control unit 16 determines that the approaching object is not located within the standard error range L2AR2, and calculates a distance L41 between the approaching object and the standard error range L2AR2. The sensor control unit 16 may multiply a value, which is obtained by expressing the calculated distance L41 in meters, by 20 and subtract the result from 100 to obtain a value as the likelihood, that is, 100−20×distance [m] may be set as the likelihood. In this case, the likelihood decreases as the distance from the standard error range L2AR2 increases, and the likelihood becomes 0 as the distance from the standard error range L2AR2 is 5 meters. When the ghost likelihood is a negative value, the sensor control unit 16 may evaluate the ghost likelihood to be 0. In addition, as another example, with the standard error of distance and the standard error of azimuth as references, an azimuth evaluation value AR and a distance evaluation value DT obtained by normalizing the azimuth difference and the distance difference respectively, may be obtained, and the ghost likelihood may be obtained based on the azimuth evaluation value AR and the distance evaluation value DT. For example, when the azimuth evaluation value AR=azimuth difference÷standard error of azimuth, the distance evaluation value AD=distance difference÷standard error of distance, and the ghost likelihood=100−25×[square root of (square of azimuth evaluation value AR+square of distance evaluation value AD)], the ghost likelihood becomes 0 when one of the azimuth difference and the distance difference is four times the corresponding standard error.

The sensor control unit 16 repeatedly executes the above-described evaluation of the ghost likelihood based on the detection information output from the sonar 12 and the radar 13. The sensor control unit 16 stores the ghost likelihood and an evaluation time point of the ghost likelihood in association with each other in the memory 14, obtains a total value, an average value, or a weighted average of the latest predetermined number of times (for example, three times) of ghost likelihoods stored in the memory 14, and calculates the obtained total value, average value, or weighted average as a temporal ghost likelihood. In the case of weighted averaging, it is preferred that the newer the stored ghost likelihood is, the larger the weight is given.

When it is determined that the temporal ghost likelihood is equal to or greater than a predetermined likelihood threshold, the sensor control unit 16 determines that the approaching object is a ghost. When it is determined that the temporal ghost likelihood is not equal to or greater than the predetermined likelihood threshold, the sensor control unit 16 determines that the approaching object is not a ghost. The sensor control unit 16 may compare the ghost likelihood with a predetermined threshold to determine whether a ghost is present, but since the ghost likelihood may take a high value by accidental coincidence, a more stable determination result can be obtained by comparing a temporal ghost likelihood, which is obtained by evaluating the ghost likelihood in a temporal manner, with the threshold. When the predetermined number of times described above is too small, the stabilization effect is little, and when the predetermined number of times described above is too large, time elapsing until the ghost determination is made is increased. Therefore, the predetermined number of times is preferably set to 3 or more and less than 6. By setting the predetermined number of times to a small number of times (for example, 3 times), the sensor control unit 16 can shorten the time required for determining whether the approaching object is a ghost. For example, in a case where the predetermined number of times is 3 times, a total value of the latest three ghost likelihoods is calculated as the temporal ghost likelihood, and the predetermined likelihood threshold is set to "300", when the approaching object is continuously detected three times in the standard error range L2AR2 of the radar 13, the sensor control unit 16 can determine that the approaching object is a ghost based on detection information obtained in the three times. As another temporal evaluation method, it may be determined that the approaching object is a ghost when the ghost likelihood is equal to or greater than a predetermined threshold continuously for a predetermined number of times or more (for example, the ghost likelihood is equal to or greater than 90 continuously for three times). The predetermined likelihood threshold may be set to any value based on the standard error range of the radar 13, a method of evaluating the ghost likelihood, a set value of the predetermined number of times, and the like.

As described above, the sensor control unit 16 can evaluate the ghost likelihood in a temporal manner. When it is determined, based on the evaluated ghost likelihood, that the approaching object is a ghost, the sensor control unit 16 excludes the approaching object from the targets of collision determination. On the other hand, when it is determined, based on the evaluated ghost likelihood, that the approaching object is not a ghost, the sensor control unit 16 performs collision determination on the approaching object, and calculates a time allowance until collision based on a distance, a course, and an approach speed of the approaching object. Since the time allowance until collision (hereinafter, simply referred to as time allowance) decreases as the distance to the approaching object decreases, a warning is issued when the time allowance falls below a first collision determination threshold, and a control command for requesting emergency braking is generated and output to the vehicle control unit 17 when the time allowance falls below a second collision determination threshold. The vehicle control unit 17 executes emergency braking based on the control command output from the sensor control unit 16. When there is a warning or emergency braking but the detected approaching object is a ghost and there is no approaching object, it is recognized by an occupant (user) that the collision prevention device is erroneously operated, and the degree of user satisfaction decreases. Therefore, when the approaching object is a ghost, it is required to perform the ghost determination precisely before the time allowance falls below the first collision determination threshold. That is, it can be said that it is not necessary to precisely determine the ghost from the beginning when an approaching object is detected, and it is effective to evaluate the ghost likelihood in a temporal manner and obtain a stable ghost determination result.

Figure 9:
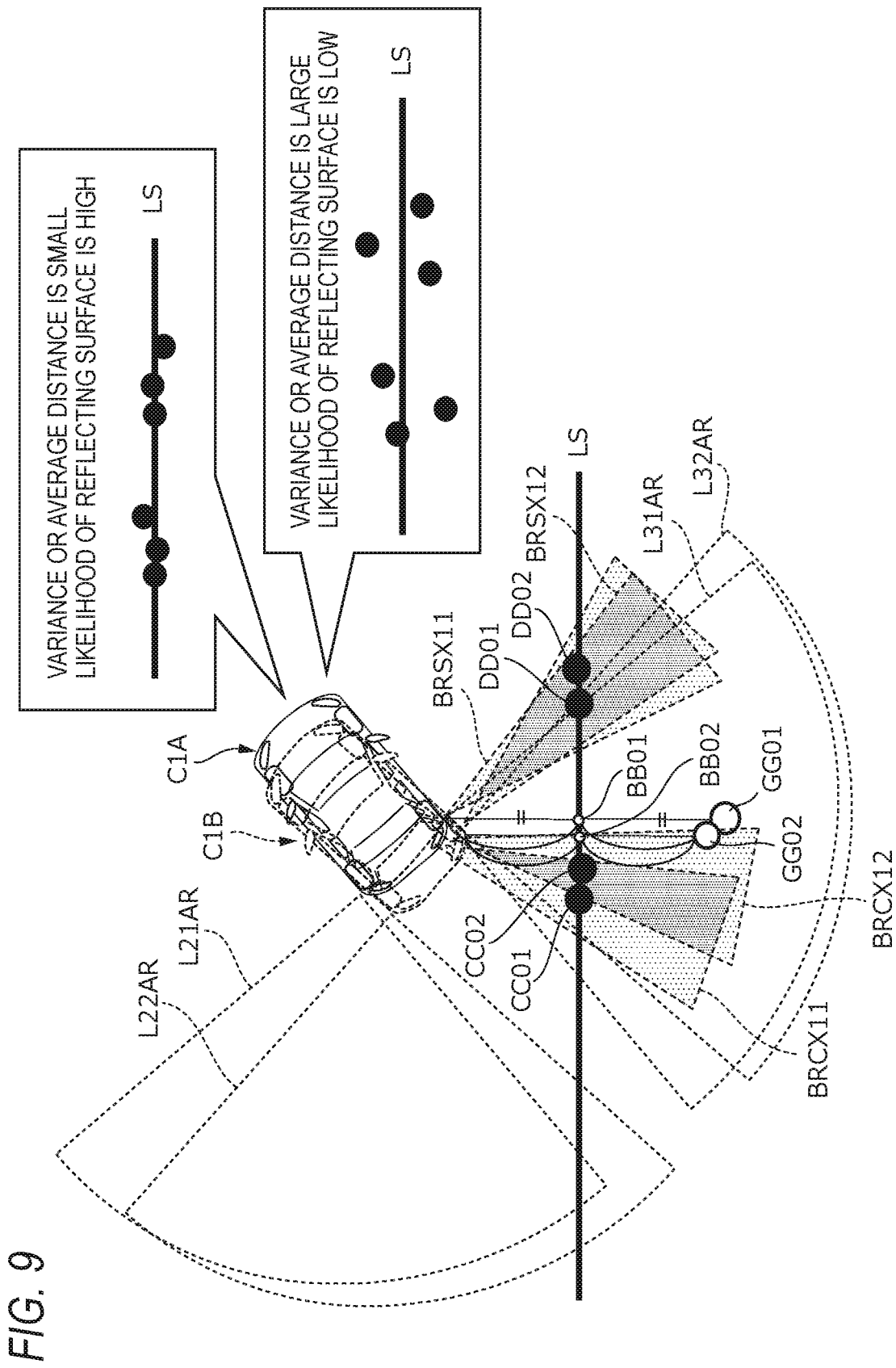
FIG. 9 is a diagram illustrating ghost likelihood weighting processing.

Next, the ghost likelihood weighting processing will be described with reference to FIG. 9. FIG. 9 is a diagram illustrating ghost likelihood weighting processing.

Detection points CC01 and DD01 illustrated in FIG. 9 indicate positions of detected objects detected within detection ranges BRCX11 and BRSX11 of the sonar 12 when the own vehicle is located at C1A (time point T1). Detection points CC02 and DD02 indicate positions of detected objects detected within detection ranges BRCX12 and BRSX12 of the sonar 12 when the own vehicle is located at C1B (time point T2).

A position of GG01 is an estimated ghost position estimated by the sensor control unit 16 when the own vehicle is located at C1A. A position of GG02 is an estimated ghost position estimated by the sensor control unit 16 when the own vehicle is located at C1B.

When the two detection points CC01 and DD01 are detected based on detection information output from the sonar 12, the sensor control unit 16 generates an approximate straight line LS based on the detection points CC01 and DD01. The number of detection points used to generate the approximate straight line LS may be two or more. In addition, the sensor control unit 16 may exclude a detection point (an isolated detection point having a large distance from another detection point), which is an outlier in the generation of the approximate straight line LS, from among the detection points used for the generation of the approximate straight line LS, and generate the approximate straight line LS.

The sensor control unit 16 may generate the approximate straight line LS using regression analysis of analyzing positions (coordinates) of the detection points detected by the sonar 12, or may generate the approximate straight line LS using another method (for example, mean square error, correlation coefficient, or variance or covariance).

(Ghost Likelihood Weighting Processing)

The sensor control unit 16 evaluates variation of the detection points with respect to the approximate straight line LS, and calculates a reflecting surface likelihood indicating a likelihood of presence of a reflecting surface on the approximate straight line LS. This variation may be a variance. The variance referred to here is a statistic corresponding to distances between the approximate straight line LS and the detection points, and instead of the variance, an average value of the distances between the approximate straight line LS and the detection points may be used as the variation. If the variation of the detection points is small, the reflecting surface likelihood is evaluated to be high because the detection points converge near the approximate straight line LS, and if the variation of the detection points is large, the reflecting surface likelihood is evaluated to be low. If the reflecting surface likelihood is high and the presence of a linear reflecting surface is likely, it is also likely that a ghost is generated due to the reflecting surface. Conversely, if the reflecting surface likelihood is low and the presence of a linear reflecting surface is doubtful, it is also doubtful that a ghost is generated due to the reflecting surface. Therefore, the sensor control unit 16 may determine whether the calculated reflecting surface likelihood is equal to or greater than a predetermined reflecting surface likelihood threshold, and when it is determined that the reflecting surface likelihood is less than the predetermined reflecting surface likelihood threshold, the sensor control unit 16 may determine that there is no planar object at the position of the approximate straight line LS, and set a ghost likelihood of an approaching object (not illustrated) on the other side of the approximate straight line LS to zero. Alternatively, when the reflecting surface likelihood is low, correction processing may be added to decrease the ghost likelihood, for example, by multiplying the ghost likelihood by the reflecting surface likelihood. Conversely, when the reflecting surface likelihood is high, correction processing may be added to increase the ghost likelihood.

The ghost likelihood and the reflecting surface likelihood may be evaluated according to a difference between an azimuth of the detection point and an azimuth of the approaching object. For example, the following is assumed: an approaching object is detected at the same position as the estimated ghost position GG01 at the time point T1 (when the own vehicle is located at C1A), and there are the detection point CC01 and the detection point DD01 detected by the sonar in that direction; and an approaching object is detected at the same position as the estimated ghost position GG02 at the time point T2 (when the own vehicle is located at C1B), and there are the detection point CC02 and the detection point DD02 detected in that direction. Then, since the position of the approaching object coincides with the estimated ghost position at any time point, the ghost likelihood may be set to the highest point. But since the ghost estimation is performed on an assumption that there is a reflecting surface in the direction toward the approaching object, specifically, on the assumption that there is a reflecting surface at an intersection point (in this case, a point BB01 and a point BB02) of a line connecting the position of the approaching object and the position of the radar and the approximate straight line LS, it is preferable to add correction processing of decreasing the ghost likelihood when it is unlikely that a reflecting surface is present in the direction toward the approaching object (the reflecting surface likelihood is low).

At the time point T1, a direction toward the approaching object is a direction toward the estimated ghost position GG01, and since the direction toward the approaching object is a direction between the detection points CC01 and DD01, an azimuth difference between directions toward the detection points CC01 and DD01 and the direction toward the approaching object is evaluated. Since the detection point DD01 is distant from a line connecting the approaching object and the radar, it can be said that contribution (evaluation value) of a likelihood (reflecting surface likelihood) that a reflecting surface is present in the vicinity of BB01 on the approximate straight line LS is low. On the other hand, since the detection point CC01 is close to a line connecting the approaching object and the radar, it can be said that contribution (evaluation value) of a likelihood (reflecting surface likelihood) that a reflecting surface is present in the vicinity of BB01 on the approximate straight line LS is high. At this time, a sum of the evaluation value for the detection point DD01 and the evaluation value for the detection point CC01 may be used as the evaluation value of the reflecting surface likelihood, or a larger one of the two evaluation values may be used as the evaluation value of the reflecting surface likelihood. At the time point T2 as well, the direction toward the approaching object (the position of GG02) is the direction between the detection point CC02 and the detection point DD02, and thus the azimuth difference between directions toward the detection points CC02 and DD02 and the direction toward the approaching object is evaluated. Since the detection point CC02 is close to the line connecting the approaching object and the radar, it can be said that the likelihood (reflecting surface likelihood) that a reflecting surface is present in the vicinity of BB02 on the approximate straight line LS is higher than that at the time point T1. As described above, since there is a detection point at a position (azimuth) close to the direction toward the approaching object, that is, the azimuth difference between the direction toward the approaching object and the direction toward the detection point is small, the reflecting surface likelihood may be evaluated to be high, or a ghost likelihood may be evaluated to be high according to the high reflecting surface likelihood. Alternatively, the measure of the reflecting surface likelihood may not be used, and the ghost likelihood may be estimated to be lower when no detection point is present in the direction toward the approaching object than when a detection point is present in the direction toward the approaching object, or the ghost likelihood may be estimated to be lower when a small number of detection points are present in the direction toward the approaching object than when a large number of detection points are present in the direction toward the approaching object. In addition, the reflecting surface likelihood or the ghost likelihood may be evaluated based on an interval between the detection points in the direction toward the approaching object. Specifically, the reflecting surface likelihood and the ghost likelihood may be evaluated to be high when a pair of detection points located at positions sandwiching a straight line connecting the vehicle (or radar) and the approaching object (a line extending in the direction toward the approaching object) are close to each other, and the reflecting surface likelihood and the ghost likelihood may be evaluated to be low when a pair of detection points located at positions sandwiching the line extending in the direction toward the approaching object are distant from each other.

When the number of detection points in the vicinity of the approximate straight line LS detected by the sonar 12 increases over time, the sensor control unit 16 may evaluate the reflecting surface likelihood to be high in accordance with the increase in the number of detection points. For example, when the evaluation value of the variation=(an average distance from the detection point to the approximate straight line LS)÷(the square root of the number of detection points in the vicinity of the approximate straight line LS), the evaluation value of the variation decreases and the reflecting surface likelihood increases as the number of detection points increases even if the average distance is the same. If the reflecting surface likelihood is reflected in the ghost likelihood, the sensor control unit 16 evaluates the ghost likelihood to be higher as the number of detection points in the vicinity of the approximate straight line LS increases over time. That is, the ghost likelihood is evaluated to be higher when the number of detection points used to generate the approximate straight line is large than when the number of detection points used to generate the approximate straight line is small.

For example, at the time point T1, a likelihood P11 is calculated based on the detection points (CC01 and DD01) detected in the direction toward the approaching object. At the next time point T2, a likelihood P12 is calculated based on a detection point group in the direction toward the approaching object, which has twice the number of detection points obtained by combining the newly detected detection points (CC02 and DD02) and the already detected detection points (CC01 and DD01). Hereinafter, at a time point T3, a likelihood P13 is calculated based on detection points that are three times the number of detection points at the time point T1. If the detection points gather in the vicinity of the approximate straight line LS, the likelihoods P11, P12, and P13 increases as the time points proceeds.

The sensor control unit 16 may equally evaluate the likelihoods P11, P12, and P13 calculated over time, and may perform weighting on the ghost likelihoods based on the number of detection points used for the calculation. For example, a temporal ghost likelihood at T3 is represented by G3=W1×P11+W2×P12+W3×P13. When it is assumed that W1+W2+W3=1, W1=W2=W3 may be set. Alternatively, the ghost likelihood having a larger number of detection points may be given more weight, and consequently, W1<W2<W3 may be set. Alternatively, if the number of detection points is sufficiently large at T3, the ghost determination may be performed only with the latest likelihood P13 while ignoring the likelihoods P11 and P12.

The sensor control unit 16 may perform weighting in accordance with the reflecting surface likelihood, the variance, or the average distance. That is, a coefficient corresponding to the calculated reflecting surface likelihood, variance, or average distance may be selected as a weighting coefficient. For example, when the variance or the average distance is small, the sensor control unit 16 may estimate reliability of the evaluation value of the likelihood to be high and set a larger weighting coefficient, and when the variance or the average distance is large, the sensor control unit 16 may estimate the reliability of the evaluation value of the likelihood to be low and set a smaller weighting coefficient. With respect to a shielding effect described below, when the reflecting surface likelihood is large and/or when the variance or the average distance is small, the shielding effect may be evaluated to be high. Since the shielding effect is obtained when detection points (obstacles) in the direction toward the approaching object do not have a gap exceeding the vehicle width, the detection points are not essentially arranged linearly. When the detection points are arranged linearly, the shielding effect can be efficiently obtained, and it can be said that a linear shielding object is likely to be present. Accordingly, when the reflecting surface likelihood is large and/or when the variance or the average distance is small, the shielding effect may increase proportionally and may be evaluated to be higher than when the reflecting surface likelihood is small and/or when the variance or the average distance is large.

In the method of evaluating the ghost likelihood described above, a reflecting surface is estimated based on detection points of the sonar, and the ghost likelihood is evaluated based on a reflecting surface likelihood or based on a position of a ghost estimated from the reflecting surface and a position of an approaching object. However, this method may be combined with another ghost likelihood evaluation method, or may be replaced with another ghost likelihood evaluation method. For example, when an approach speed of an approaching object changes in synchronization with the deceleration of the own vehicle, the ghost likelihood may be evaluated to be high. This is because a mirror ghost is detected as a mirror image of the own vehicle, and when the own vehicle decelerates, the mirror ghost also decelerates. Specifically, a deceleration rate of the own vehicle and a deceleration rate of the approaching object may be respectively calculated, and a ratio of the deceleration rate of the own vehicle and the deceleration rate of the approaching object may be further calculated. When a state in which a fluctuation range of the ratio is within a predetermined range continues for predetermined time, it may be determined that a ghost is present, and when the fluctuation range of the ratio within the predetermined time is small, the ghost likelihood may be estimated to be high.

When an approaching object is detected and it cannot be determined that the approaching object is a ghost, the own vehicle may be decelerated or stopped by emergency braking in order to avoid a collision. When the own vehicle is decelerated, the ghost likelihood can be evaluated using a ratio of a deceleration rate of the own vehicle during deceleration and a deceleration rate of the approaching object. Therefore, in the case of deceleration, the ratio of the deceleration rate may be added to the ghost likelihood determination, in the case of deceleration, the ghost likelihood determination may be performed using only the ratio of the deceleration rate, or the ratio of the deceleration rate may be added to the ghost likelihood determination regardless of whether it is the case of deceleration. When the ghost determination based on the ratio of the deceleration rate is used, there is an effect that a probability that the ghost determination can be performed at the time of deceleration increases.

Figure 10:
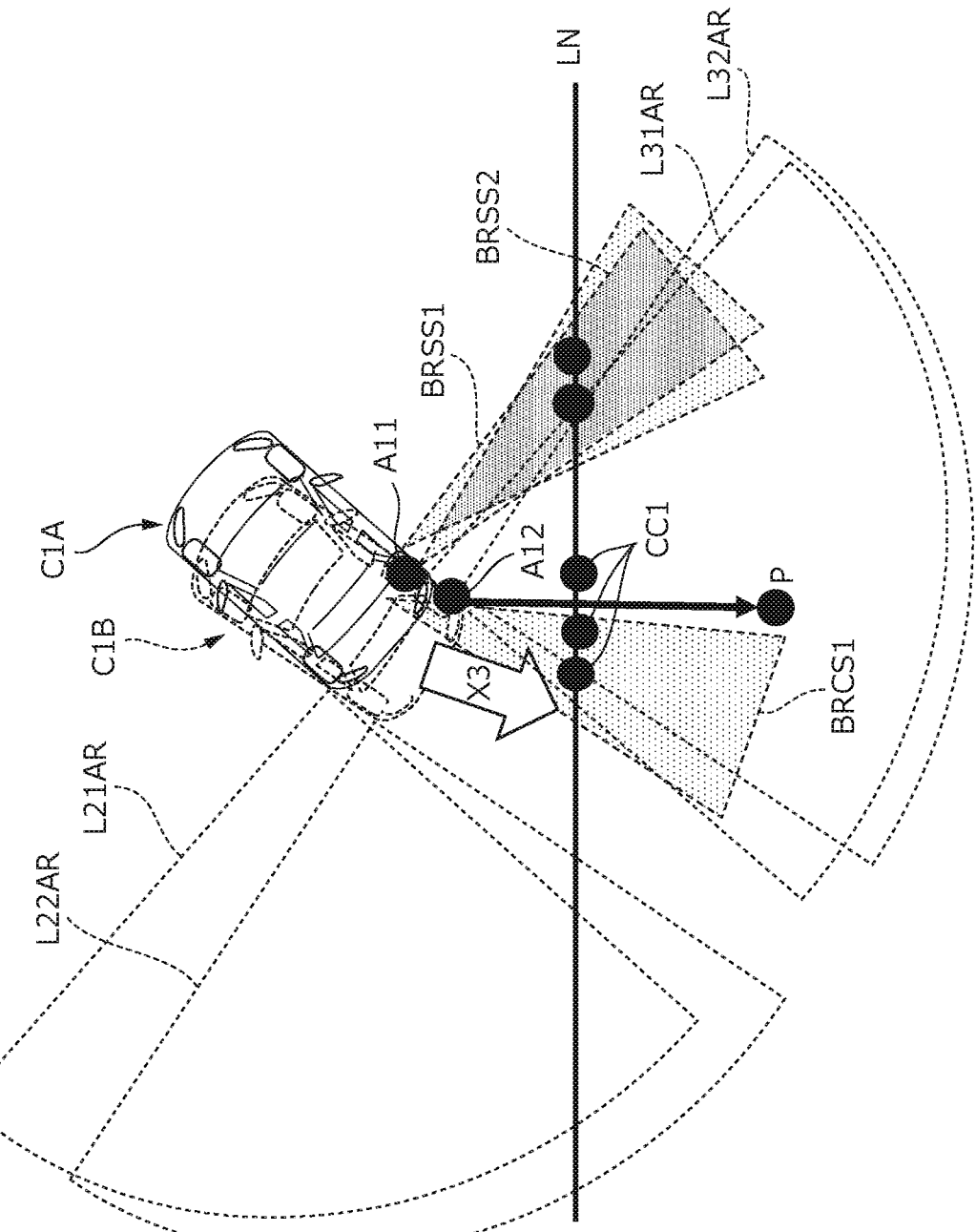
FIG. 10 is a diagram illustrating a method of evaluating a safety level based on detection directions of the radar and the sonar.

Next, evaluation processing of the shielding effect and the safety level will be described with reference to FIG. 10. FIG. 10 is a diagram illustrating a method of evaluating the safety level based on detection directions of the radar 13 and the sonar 12.

(Method of Evaluating Shielding Effect and Safety Level)

When a detection point (in the example illustrated in FIG. 10, a detection point included in a detection point group CC1) detected by the sonar 12 is present on or near a straight line connecting a position of an approaching object P detected by the radar 13 and a position of the own vehicle C1B (specifically, a position A12 of the radar 13), the sensor control unit 16 estimates that a shielding object is detected based on a detection point group, estimates that the detected shielding object may shield the own vehicle from the approaching object, evaluates the detection point group as having a shielding effect, and evaluates the safety level for the approaching object to be high due to the shielding effect by the detection point group. That is, since the own vehicle is shielded from the approach of the approaching object by the shielding object, the risk of collision with the approaching object is evaluated to be zero. On the other hand, when no detection point is present in a direction toward the approaching object P, it is estimated that there is no shielding object presenting a shielding effect of shielding the own vehicle from the approach of the approaching object, and the safety level for the approaching object is evaluated to be low. That is, the risk of collision is evaluated to be high.

Specifically, the sensor control unit 16 calculates a distance between a straight line, which connects the approaching object and the own vehicle, and the detection point, and evaluates the shielding effect based on the calculated distance. As a representative point of the own vehicle to be connected to the approaching object by a straight line, a corner portion closest to the approaching object may be used, or a position of a radar that detects the approaching object may be used as a representative point of the vehicle. In the latter case, an azimuth of the approaching object detected by the radar coincides with an azimuth of the line connecting the approaching object and the representative point, which is convenient for calculation. For example, the sensor control unit 16 estimates that the smaller the calculated distance is, the higher the possibility that the detection point (in a range in which a shielding object is located) shields the own vehicle from the approach of the approaching object is, and evaluates the shielding effect to be high, and estimates that the larger the calculated distance is, the higher the possibility that the detection point shields the own vehicle from the approach of the approaching object is, and evaluates the shielding effect to be low. Alternatively, an azimuth of the approaching object with respect to the own vehicle may be set as a reference azimuth, and an azimuth difference between the reference azimuth and an azimuth of the detection point with respect to the own vehicle may be calculated. A detection point having a small azimuth difference may be estimated to have a high possibility of shielding the own vehicle from the approach of the approaching object, and the shielding effect thereof may be estimated to be high; a detection point having a large azimuth difference may be estimated to have a low possibility of shielding the own vehicle from the approach of the approaching object, and the shielding effect thereof may be estimated to be low. As the number of detection points in the direction toward the approaching object increases, the possibility that a shielding object corresponding to the detection points shields the own vehicle from the approaching object increases. Therefore, the shielding effect may be evaluated for each of the detection points included in the detection point group CC1, and a total of evaluation values for the shielding effect of the individual detection points may be considered as the shielding effect for the approaching object.

As described above, when the approaching object P is detected and a plurality of detection points are detected in the direction toward the approaching object P, the sensor control unit 16 estimates that there is a high possibility that the own vehicle C1 can be shielded from the approach of the approaching object by the shielding object LN indicated by a plurality of detection points, and evaluates the shielding effect to be high. When the shielding effect of the detection point group in the direction toward the approaching object is high, the safety level of the approaching object may be evaluated to be high.

Here, the safety level is an index indicating a low risk or possibility that the own vehicle C1 collides with another vehicle, an obstacle, or the like. In addition, the safety level may be evaluated by taking the ghost likelihood into consideration, and when the ghost likelihood is high, the safety level may also be evaluated to be high. However, since the safety level is different from the ghost likelihood, the ghost likelihood and the safety level may not be correlated with each other. For example, even when the ghost likelihood is low and an approaching object is not a ghost, if an object detected as the detection point group CC1 is located at a position where the object shields the own vehicle from the approaching object, the shielding effect is high, and thus the safety level may be evaluated to be high. In addition, the reflecting surface likelihood described above also has an aspect similar to the shielding effect, but the reflecting surface likelihood is not the same as the shielding effect. The detection point group CC1 only needs to be detected as an object that shields the own vehicle from an approaching object, and thus the detection point group CC1 does not need to be arranged linearly. That is, if the detection point group CC1 is detected to be a sufficient object as a shielding object that shields the own vehicle from an approaching object, the shielding effect is evaluated to be high even if a reflecting surface is not formed. That is, even if the reflecting surface likelihood is low, the shielding effect may be high. However, as described above, when the detection points in the detection point group CC1 are linearly arranged, the shielding effect may be evaluated to be high. Specifically, the sensor control unit 16 may calculate the reflecting surface likelihood, the variance, or the average distance as a numerical value indicating linearity based on distribution of the detection points, and may increase or decrease the shielding effect according to the numerical value indicating linearity. When the detection points are linearly arranged, the shielding effect can be efficiently obtained, and it can be said that it is likely to estimate that a linear shielding object is present. Accordingly, when the reflecting surface likelihood is large, that is, when the variance or the average distance with respect to the approximate straight line is small, the shielding effect may increase proportionally and may be evaluated to be higher than when the reflecting surface likelihood is small, that is, when the variance or the average distance with respect to the approximate straight line is large. In this case, since the linearity of the detection point group is high, both the shielding effect and the ghost likelihood are evaluated to be high, and as a result, the safety level is evaluated to be high.

When the safety level calculated based on the shielding effect is high, the sensor control unit 16 determines a low risk that the approaching object, which is a target of safety level evaluation, collides with the own vehicle C1, and excludes the approaching object, which is the target of safety level evaluation, from the target of collision determination based on the evaluated safety level. Also in the examples of the ghost determination and the collision determination described above, the safety level may be evaluated based on the ghost likelihood, and the corresponding approaching object may be excluded from the target of collision determination based on the evaluated safety level. Of course, an approaching object may be excluded from the targets of collision determination according to the safety level that is calculated based on the shielding effect and the ghost likelihood, or exclusion of an approaching object from the objects of collision determination based on the shielding effect and exclusion of an approaching object from the targets of collision determination based on the ghost likelihood may be performed separately. When an approaching object is excluded from the targets of collision determination, the emergency braking for the approaching object is not performed. On the other hand, when the calculated safety level is low, there is a possibility that the approaching object, which is a target of safety level evaluation, collides with the own vehicle C1. Thus, the sensor control unit 16 does not exclude the target approaching object from the targets of collision determination, and when it is determined that a time allowance until the collision is small in the collision determination, the sensor control unit 16 generates a control command for requesting emergency braking and outputs the control command to the vehicle control unit 17. Since the determination to request the emergency braking is made based on the time allowance until the collision (hereinafter, may be simply referred to as "time allowance"), the emergency braking is not immediately requested even if the safety level is low. That is, the collision determination may be rephrased as an evaluation of time allowance until collision.

(Weighting Processing of Shielding Effect)

Here, since the shielding effect of the shielding object LN changes according to a position of the shielding object LN with respect to a moving direction toward an approaching object or a moving direction of the own vehicle C1, the shielding effect may be evaluated based on an angle difference (deflection angle, azimuth difference) between a moving direction and a direction in which the shielding object LN extends, or a weighting coefficient corresponding to the angle difference may be used for the evaluation of the shielding effect. In addition, the shielding effect may be evaluated with the direction toward the approaching object as a reference, as in the example described above. Since the position of the shielding object LN is specified as a set of detection points (detection point group), the shielding effect may be individually evaluated for gaps between the detection points belonging to the detection point group, and a total of the individual evaluation values may be used as the shielding effect for the approaching object. However, as a totalization method for evaluating the shielding effect of the gap between the detection points, a method of scoring by deducting points (subtraction method) is more suitable than an addition method for summing the evaluation values of the individual gaps. For example, when evaluation values of two gaps are 80 points and 70 points with respect to 100 points being full, 150 points are calculated by the addition method, whereas deducted points of 20 points and 30 points are used for evaluation by the method of scoring by deducting points, and the totalized shielding effect is evaluated as 50 (=100−20−30) 50 points. In this totalization method, a totalized result does not change regardless of the number of narrow gaps at other places whose evaluation value is 100 points. Consequently, the totalization method can be thought of as being more suitable than an addition method in which the total value is result in increasing as the gap increases. In addition, in the totalization, weighting addition may be performed based on an angle difference (deflection angle) of a direction toward a gap with respect to a reference direction (for example, a direction toward an approaching object). Specifically, the sensor control unit 16 calculates an evaluation value in accordance with a width of a gap between detection points, and calculates an angle difference (deflection angle, azimuth difference) between a direction toward the gap between the detection points (a direction toward a midpoint of the detection points) and the reference direction (any one of the direction toward the approaching object, a moving direction of the approaching object, and a moving direction of the own vehicle C1). After the calculation of evaluation value and the calculation of angle difference are performed for each pair of detection points, the sensor control unit 16 sets a weighting coefficient corresponding to the calculated angle difference, and performs weighting addition of each evaluation value using the set weighting coefficient. The weighting coefficient is set according to the angle difference (deflection angle, azimuth difference), and becomes a larger coefficient as the angle difference (deflection angle, azimuth difference) becomes smaller, and becomes a smaller coefficient as the angle difference (deflection angle, azimuth difference) becomes larger. In other words, a gap having a small deflection angle with respect to the reference direction may be given more weight than a gap having a large deflection angle with respect to the reference direction. For example, when totalized by the method of scoring by deducting points, if a weighting coefficient of a gap having a deflection angle of 0 degree is 1.0 and an evaluation value thereof is 80 points, 20 points×1=20 points are deducted, if a weighting coefficient of a gap having a deflection angle of 30 degrees is 0.5 and an evaluation value thereof is 70 points, 30 points×0.5=15 points are deducted, and the totalized shielding effect is (100−20×1−30×0.5=) 65 points.

As illustrated in FIG. 10, there is a gap between a detection range BRSS1 of the sonar BRS provided on the right side of the own vehicle C1A and a detection range BRCS1 of the sonar BRC provided on the rear side, and there is a wide gap between a detection point group detected by the sonar on the right side and the detection point group CC1 detected by the sonar BRC. However, a direction toward the gap between the detection point groups is not the direction toward the approaching object P detected by the radar 13, and is greatly different in azimuth from a traveling direction X3 of the own vehicle C1A. Therefore, in the case of FIG. 10, the gap between the detection point group CC1 and the detection point group detected by the sonar on the right side may not be given a large weighting coefficient in the evaluation of the shielding effect, and the presence of the detection point group CC1 in the direction toward the approaching object P may be given a high weight, and the shielding effect may be evaluated to be high.

When the direction toward the approaching object detected by the radar 13 is not detected by the sonar 12, the sensor control unit 16 may suspend (postpone) the evaluation of the safety level within a range allowed by a time allowance until collision described above. According to the above-described method of evaluating the shielding effect and the ghost likelihood by attaching importance to a detection point of the sonar in a direction toward an approaching object, even if the safety level is evaluated at a time point when there is no detection point of the sonar in the direction toward the approaching object, the approaching object cannot be excluded from the targets of collision determination (it can be said that the evaluation is useless). An approaching object or a ghost posing no risk of collision with the own vehicle needs to be excluded from the targets of collision determination before emergency braking or preliminary braking is performed as a result of the collision determination, and thus the evaluation of the safety level thereof may be suspended (postponed) until the time when the emergency braking or the preliminary braking is determined, that is, within a range allowed by a time allowance until collision. It is needless to say that, when there is an allowance in processing performance and power consumption and there is an intention to simplify the control flow, the safety level may be always evaluated regardless of the presence or absence of the detection point of the sonar in the direction toward the approaching object. At this time, the detection point is not limited to a detection point of the sonar, and a detection point of the radar may be added to evaluate the shielding effect and the ghost likelihood. For example, when there is a reflecting object in the direction toward the approaching object P and detected by the radar and the sensor control unit 16 determines that the detected reflecting object is a stationary object, the sensor control unit 16 may evaluate the shielding effect by adding coordinates of the detected reflecting object to a detection point group of the sonar. When limited to a blind spot between a side sonar detection range and a rear sonar detection range, since a detection range of a side rear radar covers the blind spot, a detection point of a stationary object detected by the side rear radar is added, so that it is possible to avoid a situation in which the safety level cannot be effectively evaluated because there is no detection point in the direction toward the approaching object. Since the shielding effect of a detection point detected in the direction toward the approaching object P is evaluated to be higher than the shielding effect of a detection point at a position deviated from the direction toward the approaching object P, it can be expected that the safety level can be determined at an earlier stage by adding the detection point of the radar. In addition, when the stationary object is in the direction toward the approaching object P and a distance to the stationary object is half a distance to the approaching object P, a likelihood of the approaching object P being a ghost (ghost likelihood) is high, and thus the safety level may be evaluated to be high due to the high ghost likelihood (however, as described above, the radar has a dead zone at a close distance, and even if there is a stationary object, the radar cannot not always detect the stationary object). In a case where the approaching object cannot be determined as a ghost and there is no detected object at a position where the shielding effect can be expected, the sensor control unit 16 calculates a time allowance until the own vehicle C1A and the approaching object collide with each other, and determines whether to execute the emergency braking or the preliminary braking based on the calculated time allowance.

Here, processing of calculating a time allowance will be described. The time allowance is obtained by dividing a distance to an approaching object detected by the radar 13 by an approach speed of the approaching object similarly detected by the radar 13. Although a position of the radar 13 is different from a position of (a center of) the own vehicle C1A, since the radar 13 is closer to the approaching object than the center of the vehicle body, it is reasonable to calculate the time of collision with the own vehicle C1A with the position of the radar 13 as a reference. The sensor control unit 16 calculates the time allowance by dividing the distance between the radar 13 and the approaching object by the approach speed of the approaching object. In the following description, collision determination processing using a first time allowance corresponding to a case where the own vehicle is not decelerated and a second time allowance corresponding to a case where the own vehicle is decelerated will be described. The first time allowance is (distance÷approach speed), and the second time allowance is (distance÷approach speed in the case of deceleration).

When it is determined that the first time allowance until the own vehicle C1A collides with the approaching object is equal to or greater than a first time threshold (for example, 5 seconds), the sensor control unit 16 determines that execution of the emergency braking is unnecessary, and does not output a control command for requesting the emergency braking. When it is determined that the calculated first time allowance is less than the first time threshold (for example, 5 seconds) and when the own vehicle C1A is decelerated at a predetermined deceleration rate, the sensor control unit 16 calculates a second time allowance until the own vehicle C1A collides with the approaching object. The predetermined deceleration rate in this case is a deceleration rate that does not cause discomfort to an occupant, and is a deceleration rate at which the occupant does not experience sudden braking. Since a vehicle speed during deceleration is not constant, for example, a vehicle speed obtained when the own vehicle is decelerated by a predetermined vehicle speed for two seconds may be calculated and used as a vehicle speed that is a divisor of division. If the second time allowance is equal to or greater than a second time threshold (for example, 4 seconds), the own vehicle is decelerated at the predetermined deceleration rate, and the emergency braking is not performed. When the own vehicle C1A decelerates, the time allowance (second time allowance) until the own vehicle C1A and the approaching object collide with each other becomes longer than the first time allowance in the case where the own vehicle C1A does not decelerate, and thus there is an effect of extending the time until the own vehicle C1A collides with the approaching object. When the second time allowance is less than the second time threshold, the deceleration is insufficient, and thus the emergency braking is immediately performed to avoid a collision. The evaluation of the safety level is not limited to time until the preliminary braking or the emergency braking is started, and is continuously performed even while the preliminary braking or the emergency braking is performed.

When the first time allowance is equal to or greater than the first time threshold, the collision with the approaching object is not imminent, and thus the first time allowance corresponds to a time period in which neither emergency braking nor deceleration is required. When detection of the sonar 12 and the radar 13 is repeated during this time period, the number of detection points of the sonar 12 in the direction toward the approaching object increases, and the accuracy of the evaluation value of the ghost likelihood and the shielding effect increases. As a result, when, before the first time allowance falls below the first time threshold, an evaluation value of the safety level exceeds a predetermined threshold and it is determined that the approaching object is excluded from the targets of collision determination, the emergency braking or the deceleration with respect to the approaching object is not performed. However, when a state in which the sonar 12 does not detect an obstacle in the direction toward the approaching object continues and an evaluation value of the ghost likelihood does not increase, the first time allowance falls below the first time threshold while the evaluation value of the safety level does not exceed the predetermined threshold. In this case, during time in which the second time allowance is equal to or greater than the second time threshold, the detection of the sonar 12 and the radar 13 and the evaluation of the ghost likelihood, the shielding effect, and the safety level are continued while performing the preliminary braking of decelerating the own vehicle C1A at the predetermined deceleration rate. Control of the preliminary braking is the same as control of the emergency braking. The sensor control unit 16 outputs a control command for requesting braking to the vehicle control unit 17, and the vehicle control unit 17 executes braking (preliminary braking) based on the control command output from the sensor control unit 16.

It can be said that a time period during the preliminary braking is a time period in which the time until the collision is extended by performing the deceleration and detection information for pushing up the evaluation value of the safety degree is waited. In addition, when the emergency braking is finally performed, since the preliminary braking is performed to reduce the vehicle speed, there is also an effect of preventing an impact (acceleration) felt by the occupant. When the number of detection points increases in the detection during the preliminary braking, the evaluation value of the ghost likelihood or the shielding effect increases, and the evaluation value of the safety level exceeds the predetermined threshold, the preliminary braking may be ended at that time. When the calculated second time allowance is less than the second time threshold (for example, 4 seconds) while the evaluation value of the safety level does not exceed the predetermined threshold value, the sensor control unit 16 determines that a possibility of collision between the own vehicle C1A and the approaching object is high, and outputs a control command for requesting emergency braking to the vehicle control unit 17. The vehicle control unit 17 executes emergency braking based on the control command output from the sensor control unit 16. During the emergency braking, the detection of the sonar 12 and the radar 13 and the evaluation of the ghost likelihood, the shielding effect, and the safety level may be continued. In this case, when the safety level exceeds the threshold value during the emergency braking, the emergency braking may be stopped at that time. For example, when the vehicle is executing automatic parking at that time, the braking may be stopped and the automatic parking may be executed to the end. When the emergency braking is performed, the occupant often feels uncomfortable, and when automatic parking is interrupted in the middle, the occupant feels more uncomfortable and inconvenience is caused to the occupant. That is, it can be said that there is a certain effect in stopping the emergency braking at the time when it is determined that the approaching object is not dangerous and continuing the movement that has been executed until then.

A difference between the preliminary braking and the emergency braking is a difference in the deceleration rate specified in the control command. A deceleration rate of the preliminary braking is determined with a reference of an acceleration that does not cause discomfort to the occupant, whereas a deceleration rate of the emergency braking is determined with reference of an acceleration at which the occupant is not injured by a seat belt or the like. Therefore, when the emergency braking is performed, the occupant often feels uncomfortable. In addition, since deceleration, which is not expected by the occupant, is also involved in the preliminary braking, the occupant may feel uncomfortable. That is, in a case where the approaching object is a ghost or a moving object on the opposite side of a shielding object does not pose a risk, it can be said that a time point, at which the safety level exceeds the threshold and the approaching object is excluded from the collision determination, leads to a highest expected value of a customer evaluation (no negative evaluation is made) when falling before start of the preliminary braking, leads to a second highest expected value of the customer evaluation (negative evaluation is slight) when falling in the preliminary braking, leads to a low expected value of the customer evaluation (negative evaluation is moderate) when falling in the emergency braking, and leads to a lowest expected value of the customer evaluation (negative evaluation is serious) when falling after the stop of the vehicle. As described above, when ghost determination based on a ratio of the deceleration rate of the own vehicle and a deceleration rate of the approaching object is used, a probability that the ghost determination can be performed at the time of deceleration increases, and thus, if the approaching object is a ghost, the probability that the ghost determination can be performed during the preliminary braking is high. That is, by introducing the stage of the preliminary braking, it is possible to obtain an effect of further reducing the probability that the emergency braking is executed due to a ghost and the customer evaluation becomes worst.

The first time threshold and the second time threshold are set for the purpose of preventing contact when the approaching object is not a ghost but a real object and there is no shielding object, and thus may be set according to a traveling speed of the own vehicle C1A an the approach speed of the approaching object. For example, when the traveling speed of the own vehicle C1A is 8 km/h and the approach speed of the approaching object is 6 km/h, the sensor control unit 16 sets the first time threshold to 5 seconds and sets the second time threshold to 4 seconds. In a case where the traveling speed of the own vehicle C1A is reduced more than scheduled by the preliminary braking, the start of the emergency braking may be delayed by increasing the second time threshold in accordance with an actual speed of the own vehicle C1A. On the other hand, when the traveling speed of the own vehicle C1A is not reduced more than scheduled by the preliminary braking, the deceleration rate is increased and the own vehicle C1A is further decelerated for safety. There is a possibility that an approaching object determined as a ghost and excluded from the collision determination is detected by the sonar 12 of the own vehicle C1A. That is, the ghost determination may be incorrect. In such a case, since detection information of the sonar 12 is evaluated with a higher priority than the ghost determination, the sensor control unit 16 determines whether the emergency braking is necessary based on collision determination according to the detection information of the sonar 12 regardless of a result of the ghost determination. That is, even if an approaching object detected by the radar is excluded from the collision determination, since the detection performed by the sonar is treated as another matter different from approaching object detection performed by the radar, the collision determination is performed based only on the detection information of the sonar, and the emergency braking is performed if necessary.

Figure 11:
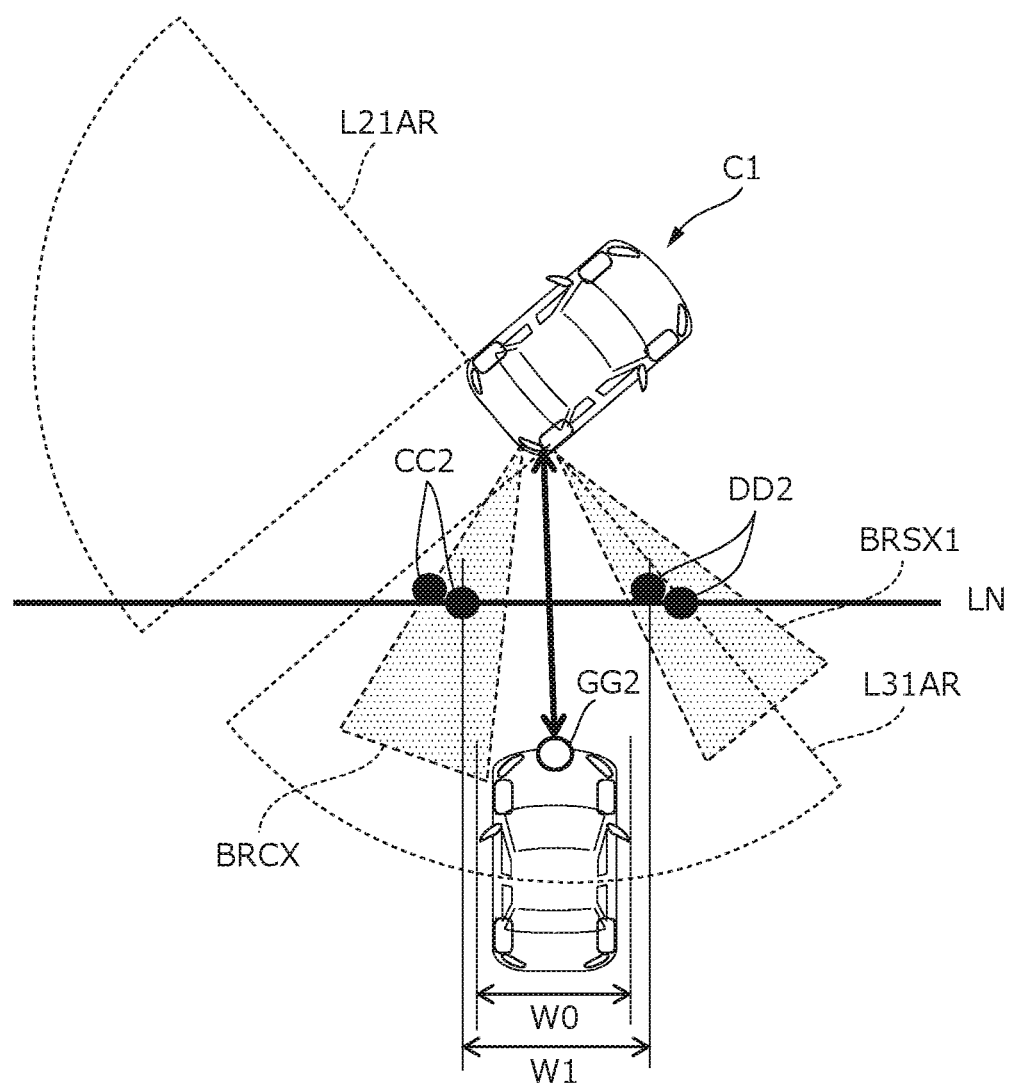
FIG. 11 is a diagram illustrating a method of evaluating a shielding effect of a gap between detection points.

Next, as a method of evaluating the safety level based on the shielding effect, a method of evaluating the shielding effect with a vehicle width W0 as a reference will be described. FIG. 11 is a diagram illustrating a method of evaluating a shielding effect of a gap between detection points. In the example illustrated in FIG. 11, the radar 13 of the own vehicle C1 detects an approaching object GG2. The sonar 12 detects two detection point groups CC2 and DD2 located between the own vehicle C1 and the approaching object GG2. Although directions toward the two detection point groups CC2 and DD2 do not coincide with a direction toward the approaching object GG2, it is assumed that a scope contained in direction is broadly interpreted and the directions toward the two detection point groups CC2 and DD2 are "roughly" in the direction toward the approaching object GG2.

(Method of Evaluating Gap)

The sensor control unit 16 estimates the shielding object LN based on the detection point group CC2 and the detection point group DD2 in the direction toward the approaching object GG2. A position of the shielding object LN is, for example, a position of an approximate straight line generated based on the detection point group CC2 and the detection point group DD2. The sensor control unit 16 extracts a combination of detection points having the shortest width W1 in a direction along the estimated shielding object LN from among combinations of detection points included in the detection point group CC2 and detection points included in the detection point group DD2. Alternatively, the sensor control unit 16 may extract a detection point closest to a line segment connecting the own vehicle C1 and the approaching object GG2 from each of the detection point group CC2 and the detection point group DD2, and calculate a distance between the two extracted detection points. That is, since a direction in which the width W1 of the gap is evaluated needs to be "roughly" along a direction in which the estimated shielding object LN extends, if the two detection points on the left and right sides, which are closest to the line segment connecting the own vehicle C1 and the approaching object GG2, are roughly close to the estimated position of the shielding object LN, a linear distance between the two detection points on the left and right sides may be obtained and set as the width W1 of the gap. In addition, in the evaluation of the shielding effect of the gap, estimation of the shielding object LN may be omitted. For example, when viewing in the direction toward the approaching object GG2 from the own vehicle C1, if two detection points on the right and left sides close to the direction are located at similar distances from the own vehicle C1, the shielding effect may be evaluated (without estimating the shielding object LN) on an assumption that there is a possibility that the pair of detection points shields the own vehicle from the approaching object. In this case, a perpendicular line may be drawn from each of the pair of detection points to the line segment connecting the own vehicle C1 and the approaching object GG2, and a sum of lengths of the two perpendicular lines may be set as the width W1 of the gap.

The sensor control unit 16 determines whether the calculated width W1 of the gap is equal to or greater than a gap threshold (for example, 1.8 m) that is based on a vehicle width of one vehicle. Although the gap threshold is set with a vehicle width of an assumed vehicle as a reference, the gap threshold may be set to a value smaller than the vehicle width instead of being set to the same value as the vehicle width, or the gap threshold may be set in consideration of a compact vehicle having a narrower vehicle width than a normal vehicle. For example, the gap threshold may be set to 1.6 m since there is a compact vehicle only having a vehicle width of 1625 mm, or the gap threshold may be set to 0.5 m in consideration of a motorcycle. When the calculated width W1 of the gap is equal to or greater than the gap threshold, the sensor control unit 16 evaluates the shielding effect of the shielding object LN to be low. On the other hand, when the calculated width W1 of the gap is less than the gap threshold, the sensor control unit 16 evaluates the shielding effect of the shielding object LN to be high. When the width W1 of the gap is less than the gap threshold, the possibility that the vehicle passes through the gap is constant at zero, and thus the evaluation value of the shielding effect is constant at an upper limit value.

For example, the sensor control unit 16 may give an upper limit value, for example, "100" as an evaluation value of the shielding effect when the calculated width W1 of the gap is less than 1.8 m, may evaluate the shielding effect as "40" when the calculated width W1 of the gap is 1.8 m or more and less than 2.4 m, and may evaluate the shielding effect as "0" when the width W1 is 2.4 m or more. If a gap is less than a vehicle width, it can be assumed that the vehicle does not pass through the gap. Even when there is a gap exceeding the vehicle width, if a width of the gap is close to the vehicle width, it can be assumed that the vehicle decelerates when passing through the gap, and therefore, the shielding effect may be evaluated to be higher than in the case where there is no shielding object. Since it is assumed that the vehicle passes through a wide gap having sufficient room for passage with respect to the vehicle width without deceleration, the shielding effect may be evaluated to be low to the same extent as in the case where there is no shielding object.

A relationship between the width W1 of the gap and the evaluation value of the shielding effect may be reflected by a function in which the evaluation value of the shielding effect gradually decreases when the width W1 of the gap exceeds the vehicle width W0 (for example, 1.8 m), instead of the step function as described above. The reference of the vehicle width is not limited to 1.8 m corresponding to a four-wheeled vehicle, and 0.5 m corresponding to a transverse width of a two-wheeled vehicle may be used as the reference of the vehicle width. Further, when a first reference of the vehicle width is set to 1.8 m, a second reference of the vehicle width is set to 0.5 m, and the width W1 of the gap is equal to or greater than 0.5 m and less than 1.8 m, a function may be used in which the evaluation value of the shielding effect increases as the width W1 of the gap decreases. Note that this evaluation method is an example, and it is needless to say that the present disclosure is not limited thereto.

As described above, when it is determined that the width of the gap is less than the gap threshold based on the vehicle width, the sensor control unit 16 determines that the shielding object LN shields the own vehicle from the approaching object, and evaluates the shielding effect to be high. On the other hand, when the sensor control unit 16 determines that the gap is equal to or greater than the vehicle width W0, the sensor control unit 16 determines that the shielding is insufficient since the approaching object can pass through the gap, and evaluates the shielding effect to be low. When there are a plurality of gaps between the detection points in the direction toward the approaching object, the shielding effect may be evaluated for the plurality of gaps, weighting may be performed according to an angle with respect to the traveling direction of the own vehicle or the direction toward the approaching object as described above, and the overall shielding effect may be obtained by weighting addition. As a simple method, a wider gap may be selected and an evaluation value of the gap may be set as the shielding effect, or a gap close to the traveling direction of the own vehicle may be selected and an evaluation value of the gap may be set as the shielding effect. In general, it may be determined to be safe if a gap between detection points in the direction toward the approaching object or in the traveling direction of the own vehicle is narrower than the vehicle width. This is because, even when the approaching object is not a ghost but a real object, the own vehicle is safe if there is a shielding object that the approaching object cannot pass through. On the other hand, if the ghost likelihood exceeds the predetermined threshold and it is ensured that the approaching object is a ghost, the own vehicle is safe because the own vehicle does not collide with the ghost even when there is no shielding effect. In addition, when the shielding effect is high to a medium degree and the ghost likelihood is high to a medium degree, the safety level may be evaluated to be comprehensively high. Alternatively, a threshold of the shielding effect (a shielding effect threshold) and a threshold of the ghost likelihood (a ghost likelihood threshold) may be provided, and it may be determined to be safe when any one of the shielding effect and the ghost likelihood exceeds a corresponding predetermined threshold, or a threshold of the safety level (a safety level threshold) may be provided without providing the shielding effect threshold or the ghost likelihood threshold, and it may be determined to be safe when a safety level calculated based on the shielding effect and the ghost likelihood exceeds the safety threshold. When it is determined to be safe by any one of the methods (that is, a possibility that an approaching object as a determination target collides with the own vehicle is sufficiently low), the approaching object as a determination target is excluded from the collision determination so that unnecessary emergency braking or preliminary braking does not occur.

Figure 12:
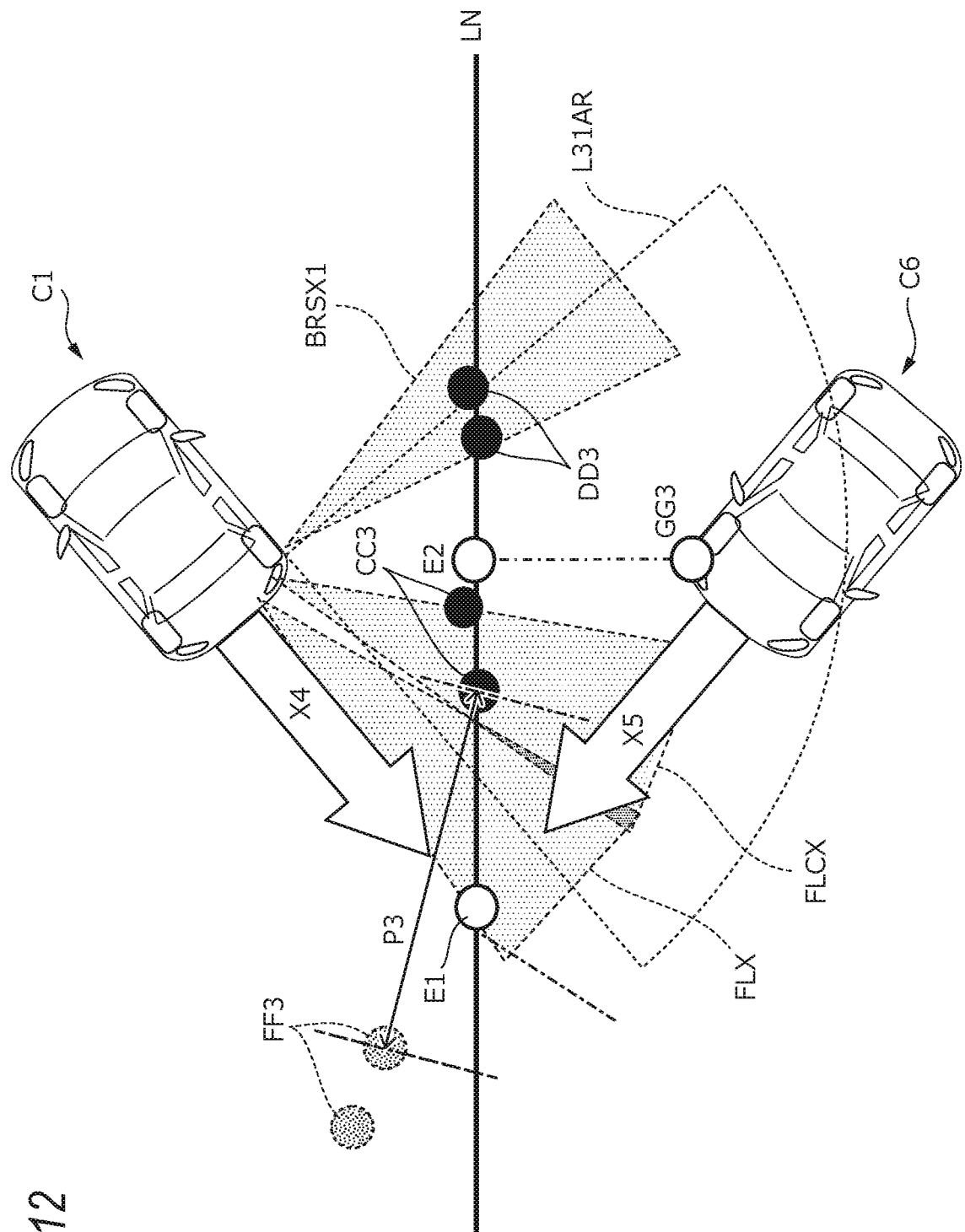
FIG. 12 is a diagram illustrating a method of evaluating a safety level of a shielding object in a traveling direction of the own vehicle.

Next, a method of evaluating the shielding effect in a traveling direction of the own vehicle C1 will be described with reference to FIG. 12. FIG. 12 is a diagram illustrating the traveling direction of the own vehicle C1, a traveling direction of an approaching object, and a position of a shielding object.

In the example illustrated in FIG. 12, the own vehicle C1 travels (reverses) in a traveling direction X4, and the sonar detects a plurality of detection point groups CC3 and DD3. Evaluation will be performed for a case where a detection point group FF3 is not detected at this time and a case where the detection point group FF3 is detected at this time. A vehicle C6 detected as an approaching object GG3 travels (advances) in a traveling direction X5. In FIG. 12, it is assumed that the shielding object LN estimated by the sensor control unit 16 of the own vehicle C1 does not have a gap wider than the vehicle width W0 (see FIG. 11) in a direction in which the approaching object is detected at this time.

The sensor control unit 16 estimates the shielding object LN based on the plurality of detection point groups CC3 and DD3. The shielding object LN is an "estimated shielding object", and is simply referred to as the shielding object LN here. The sensor control unit 16 evaluates, as points for evaluating the shielding effect, the shielding effect of a gap between the detection point group CC3 and the detection point group DD3 sandwiching an evaluation position E2, which is on the direction toward the approaching object and is on the shielding object LN, and the shielding effect of a gap sandwiching an intersection point (an evaluation position E1) between the traveling direction X5 of the approaching object GG3 (a vehicle C6) detected by the radar 13 and the shielding object LN. Since the evaluation of the gap sandwiching the evaluation position E2 has been described earlier, the evaluation of the gap sandwiching the evaluation position E1 will be described here. Although the shielding effect is evaluated using the intersection point of the traveling direction of the approaching object GG3 and the shielding object LN as the evaluation position E1 here, the evaluation position E1 may be an intersection point of the traveling direction X4 of the own vehicle and the shielding object LN, or an intersection point of the traveling direction X5 of the approaching object GG3 and the traveling direction X4 of the own vehicle, and the shielding effect may be evaluated at a plurality of intersection points and the lowest evaluation value may be selected.

Here, first, it is assumed that the detection point group FF3 is detected. A gap evaluation section as an evaluation target is a gap between a detection point closest to the evaluation position E1 in the detection point group FF3 and a detection point closest to the evaluation position E1 in the detection point group CC3. First, the sensor control unit 16 obtains a linear distance (a width of a gap evaluation section P3) between a pair of detection points sandwiching the evaluation position E1. In a case where the gap evaluation section is regarded as a gap of the shielding object LN and a width thereof is evaluated, when an azimuth difference between a direction toward the gap evaluation section and a direction in which the shield LN extends is set as θ, P3×COS(θ) is an evaluation value of the gap of the shielding object LN. However, since the approaching object GG3 intersects with the shielding object LN at a shallow angle, a width of the gap required when the approaching object GG3 is assumed to pass through the shielding object LN is wider than the vehicle width. When an azimuth difference between the traveling direction X5 of the approaching object GG3 and the direction in which the shielding object LN extends is set as η and the width of the gap in the shielding object LN is set as W, if W×SIN (η) is smaller than the vehicle width, the detected vehicle C6 does not pass through the gap of P3. The width of the gap may be evaluated on the assumption that the own vehicle C1 passes through. That is, the width of the gap may be evaluated with the traveling direction X4 of the own vehicle C1 as a reference. Since the gap of P3 has a large angle with respect to the traveling direction X4 of the own vehicle C1, it can be said that the own vehicle C1 passes through the gap of P3 more easily than the vehicle C6. Which direction is used as a reference to evaluate a shielding degree may be selected according to the situation. For example, when the own vehicle is scheduled to be parked near the shielding object LN, it is not necessary to evaluate the possibility that the own vehicle C1 passes through the gap, and only the possibility that the approaching object passes needs to be evaluated. In other words, a traveling direction of a vehicle as a reference may be selected, and a component perpendicular to the traveling direction may be used as an evaluation. The sensor control unit 16 compares a component of the width of the gap evaluation section P3, which is perpendicular to the reference direction, with a gap threshold (for example, 1.8m) having the vehicle width as a reference, evaluates the shielding effect to be high when the component is less than the gap threshold, and evaluates the shielding effect to be low when the component is equal to or greater than the gap threshold. When the detection point group FF3 is not detected, since two detection points sandwiching the evaluation position E1 are not aligned, for example, 10 m may be applied to the width of the gap evaluation section P3 to evaluate the shielding effect to be zero, or when two detection points are not aligned, the shielding effect may be evaluated to be zero. When there are other gaps such as a gap between which the evaluation position E2 in the direction in which the approaching object is detected is interposed, the shielding effect may be evaluated based on a width of the widest gap among these gaps. However, since there is a high possibility that the approaching object passes through the shielding object LN from a traveling direction thereof, the shielding effect may be evaluated by attaching importance to a gap in the traveling direction of the approaching object, or only the gap in the traveling direction of the approaching object may be evaluated from the beginning. When the shielding effect is evaluated by attaching importance to a gap in the traveling direction, the shielding effect of a plurality of gaps may be individually evaluated, each evaluation value of the shielding effect may be weighted according to an azimuth difference from the traveling direction of the own vehicle or the approaching object, and the shielding effect of the entire shielding object LN may be evaluated using a value obtained by weighted averaging the shielding effect of the plurality of gaps. At this time, in order to reduce the calculation amount, gaps between detection points in the same detection point group may be excluded from the evaluation target of the shielding effect, or may be all given an upper limit value (for example, 100) of the evaluation value and processed. If a gap between different detection point groups is smaller than a predetermined threshold (for example, 0.5 m corresponding to a vehicle width of a two-wheeled vehicle), the same processing may be performed.

Figure 13:
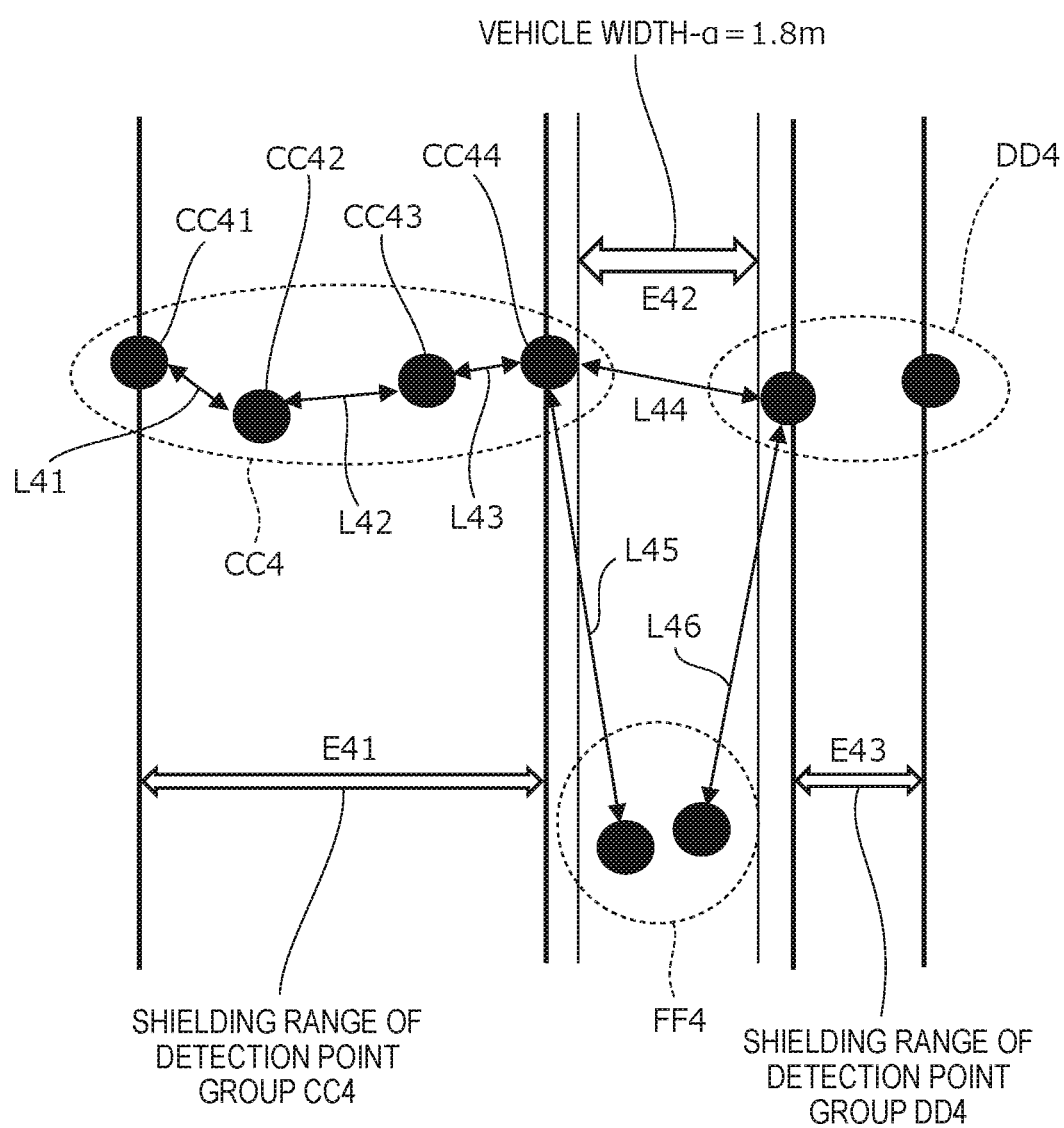
FIG. 13 is a diagram illustrating a method of determining a detection point group.

Next, a method of determining a detection point group will be described with reference to FIG. 13. FIG. 13 is a diagram illustrating a relationship between a detection point and a detection point group. In FIG. 13, ranges of detection point groups CC4, DD4, and FF4 and detection points (black circles) belonging to the respective detection point groups are illustrated.

When a plurality of detection points are detected by the sonar 12, the sensor control unit 16 determines that two or more detection points whose distances between each other are equal to or less than a predetermined detection point group threshold belong to the same detection point group, and assigns the same group number (an example of information for identifying the detection point group) to the detection points. When distances between detection points exceed the predetermined detection point group threshold, a unique group number that is not assigned to another detection point group is given. The processing is advanced according to this rule, and when a distance between a detection point to which a group number is assigned and a detection point to which a group number is not assigned is equal to or less than the detection point group threshold, the group number of the former detection point is also given to the latter detection point, and when the distance exceeds the detection point group threshold, another unique group number is given to the latter detection point. In a case where a distance between two detection points having different group numbers is equal to or less than the detection point group threshold when the determination processing of the detection point group proceeds or when the number of detection points increases due to repetition of detection, it is determined that the two detection point groups are integrated, and the detection point groups are merged by overwriting the larger group number with the smaller group number. Here, the detection point group threshold may be a value smaller than 1.8 m corresponding to the vehicle width of a standard four-wheeled vehicle, for example, 0.5 m corresponding to the vehicle width of a two-wheeled vehicle, 0.9 m corresponding to half the vehicle width of a four-wheeled vehicle, or the like.

For example, in the example illustrated in FIG. 13, the sensor control unit 16 calculates distances between four detection points CC41, CC42, CC43, and CC44 detected by the sonar 12. In FIG. 13, a distance between the detection points CC41 and CC42 is a distance L41, a distance between the detection points CC42 and CC43 is a distance L42, and a distance between the detection points CC43 and CC44 is a distance L43. When the calculated distances L41 to L43 are equal to or less than a predetermined distance E42, the sensor control unit 16 determines that the four detection points CC41 to CC44 are of the same detection point group CC4. Similarly, the sensor control unit 16 performs group determination processing for the detection points included in the two detection point groups DD4 and FF4.

The sensor control unit 16 calculates a distance L44 that is the shortest distance between the detection points included in the detection point group CC4 and the detection points included in the detection point group DD4, and determines that the detection point groups CC4 and DD4 are not of the same detection point group based on a fact that the calculated distance L44 is larger than the detection point group threshold. A shortest distance L45 between the detection points included in the detection point group CC4 and the detection points included in the detection point group FF4 and a shortest distance L46 between the detection points included in the detection point group DD4 and the detection points included in the detection point group FF4 are also calculated in the same manner as the distance L44, and it is determined that the detection point groups CC4, DD4, and FF4 are different detection point groups from each other based on facts that the calculated distances L45 and L46 are greater than the detection point group threshold.

In the example illustrated in FIG. 13, a shielding object is estimated to be on a line passing through the detection point group CC4 and the detection point group DD4. Since a gap between the detection point group CC4 and the detection point group DD4 is wider than the vehicle width (1.8m) illustrated as the predetermined distance E42, the shielding effect is evaluated to be low (for example, an evaluation value thereof is 60 with respect to a maximum value of 100). The detection point group FF4 is between the detection point group CC4 and the detection point group DD4, but the contribution to the shielding effect may be evaluated as zero based on the fact that the shortest distances (L45, L46) between the detection point group FF4 and the detection point group CC4 and the detection point group DD4 are larger than a length (for example, 4 m) corresponding to a vehicle length. On the other hand, when both the shortest distance L45 and the shortest distance L46 are shorter than the vehicle width (1.8 m), the shielding effect may be evaluated as the maximum value (for example, 100). When the shortest distance L45 and the shortest distance L46 are equal to or more than the vehicle width and less than the vehicle length, for example, a value between 60 and 100 may be set as the evaluation value of the shielding effect according to a larger value of the shortest distance L45 and the shortest distance L46 or a value of a gap closer to the approaching object.

Figure 14:
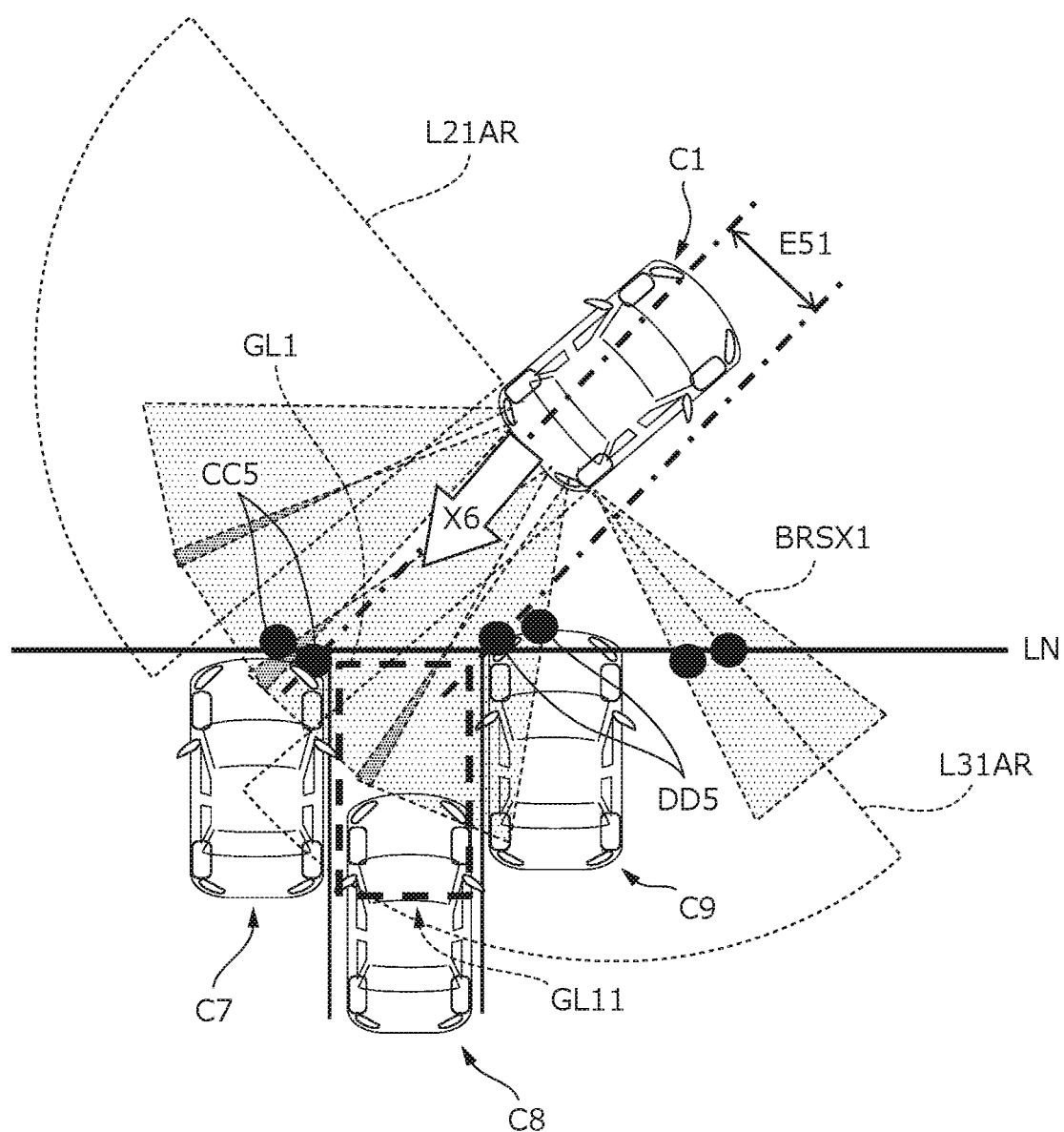
FIG. 14 is a diagram illustrating a method of evaluating a safety level in a case where a target parking position is set.

Next, a method of evaluating the safety level in a case where a target parking position GL1 of the own vehicle C1 is set will be described with reference to FIG. 14. FIG. 14 is a diagram illustrating the method of evaluating the safety level in the case where the target parking position GL1 is set.

(Setting Processing of Target Parking Position)

Here, the target parking position GL1 is a target parking position at which the own vehicle C1 is to be parked. The target parking position GL1 is a rectangular region set based on a white line indicating a parking position drawn in a parking lot. In the case of parking, the driver checks a parking frame drawn by a white line on a road surface when the own vehicle C1 is located in front of an entrance of a target parking position. At this time, the white line drawn in the parking lot is imaged at the same time by the camera 11 provided in a right side mirror portion of the own vehicle C1. The camera 11 outputs a captured image to the sensor control unit 16. The sensor control unit 16 performs image processing on the captured image output from the camera 11, detects a pair of white lines drawn in the parking lot, and determines that the display of the parking frame is performed based on a length and an interval of the pair of white lines. When the driver moves the own vehicle C1 to the position of the own vehicle C1 in FIG. 14 from the front of the frontage of the target parking position and changes a traveling direction thereof from advancing to reversing, the sensor control unit 16 determines that a parking operation to the previously detected parking frame is started, and sets the target parking position GL1 of the own vehicle C1 based on a position of the parking frame indicated by the pair of white lines.

(Method of Evaluating Safety Level in Case where Target Parking Position is Set)

In the example illustrated in FIG. 14, the own vehicle C1 is reversed in a traveling direction X6 and is attempted to park at the target parking position GL1. When the vehicle is to be parked between two parked vehicles C7 and C9, the sensor control unit 16 specifies a gap E51 between detection points in a direction toward the target parking position GL1 (a direction of the traveling direction X6) as an evaluation target of the shielding effect based on detection information of the detection points detected by the sonar 12. The gap E51 is a gap obtained by evaluating distances from an axis to left and right detection points with the traveling direction X6 of the vehicle as the axis. Since the detection points are arranged along the shielding object LN, when the gap is evaluated from an oblique direction with respect to the detection points, the gap is evaluated to be shorter than a distance on the shielding object LN. Therefore, the gap E51 evaluated with the traveling direction X6 of the vehicle as an axis is narrower than a width of the vehicle. As described above, when the vehicle is to be parked, the vehicle approaches the target parking position from an oblique direction, and thus, when a gap at the target parking position (a gap for one vehicle between the parked vehicles C7 and C9) is evaluated with the traveling direction of the own vehicle as a reference, the gap may be evaluated as a gap not allowing passage. However, since the own vehicle is scheduled to be parked by passing through the gap at the target parking position, the evaluation that the gap in the traveling direction does not allow passage is not proper in reality. Therefore, when a far end of the target parking position (a short side on the far side of the target parking frame) is farther than the shielding object LN, it is determined that there is a gap, through which the vehicle can pass, at a position of the shielding object LN corresponding to the frontage of the target parking position, regardless of the evaluation of the gap of the detection point. Since an approaching object can also pass through this gap, when the approaching object is in a direction based on the target parking position (indicating a range from the frontage of the target parking position GL1 to the far end of the target parking position GL1, that is, GL11), it is necessary to evaluate the shielding effect to be low.

The sensor control unit 16 specifies a position of the target parking position GL1, in particular, a position of the short side GL11 (the far end of the target parking position GL1) on the side far from the own vehicle C1. This is because these positions (positions with reference to the target parking position) are positions where a leading end of the vehicle advances, and in the collision determination, determination is performed with a condition that the leading end of the vehicle is not subjected to collision at these positions. Therefore, the sensor control unit 16 evaluates the shielding effect by comparing the far end of the target parking position GL1 with the positions of the detection point groups CC5 and DD5 (or the position of the shielding object LN). Since the short side GL11 (the far end of the target parking position GL1), which is the arrival position of the rear end of the own vehicle, is also determined at the time when the target parking position GL1 is determined, the short side GL11 needs to be compared with the positions of the detection point groups CC5 and DD5.

When the position of the short side GL11 is far away from the positions of the plurality of detection point groups CC5 and DD5 and rather closer to a short side on the near side of the target parking position GL1, the sensor control unit 16 determines that the own vehicle C1 can pass through the gap between the plurality of detection point groups CC5 and DD5 regardless of the evaluation of the gap E51 and evaluates the shielding effect of the shielding object LN to be low. That is, if the target parking position is located at a position beyond the shielding object LN, there is a gap in the shielding object LN through which the own vehicle can pass, and when the own vehicle advances to the target parking position GL1 beyond the shielding object LN, the shielding object LN does not shield the own vehicle from an approaching object, and thus it is not possible to evaluate the shielding effect to be high. In this case, an evaluation value of the shielding effect in a case where there is a gap exceeding the vehicle width may be given before the own vehicle C1 exceeds the shielding object LN, and the evaluation value of the shielding effect may be set to zero after the own vehicle C1 exceeds the shielding object LN, or the evaluation value may be set to zero from the beginning. On the other hand, in a case where the position of the short side GL11 (the far end of the target parking position GL1) is not far from (that is, close to) the positions of the plurality of detection point groups CC5 and DD5 (the line of the shielding object LN), the plurality of detection point groups CC5 and DD5 on the parking path act as the shielding object until the vehicle is parked at the target parking position GL1, and thus the sensor control unit 16 does not need to decrease the evaluation value of the shielding effect. The shielding effect at this time needs to be evaluated by evaluating the gap between the detection point groups CC5 and DD5 with a traveling direction of the approaching object as a reference, as in the example described above with reference to FIG. 12.

When the radar 13 detects an approaching object C8, the sensor control unit 16 determines whether the traveling direction X6 of the own vehicle C1 roughly coincides with a position (direction) of the approaching object C8 with respect to the own vehicle C1 (specifically, whether the own vehicle C1 and the approaching object C8 collide with each other). Also in the ghost determination, it may be determined that the ghost likelihood is low on condition that the approaching object is in a direction with the target parking position GL1 as a reference. Specifically, the direction with the target parking position GL1 as a reference refers to a direction toward the short side of the rectangular target parking position GL1 on the side close to the own vehicle, that is, a direction toward a frontage portion of the parking frame. This is because there is no reflecting object in the frontage portion of the target parking position GL1, and thus a mirror ghost is not generated. Since there is no large difference between a direction toward the target parking position and the direction toward the frontage of the target parking position, hereinafter, the direction with the target parking position as a reference may be simply referred to as the direction toward the target parking position. In the arrangement of FIG. 14, a radar wave is reflected on a side surface of the vehicle C7 stopped in an adjacent parking frame, and it may be detected that the radar wave is multiply reflected by the approaching object C8, but a direction in which the approaching object is detected is absolutely the direction toward the target parking position GL1. That is, when the approaching object is in the direction toward the target parking position GL1, it is determined that the ghost likelihood is low. Accordingly, the safety level is not evaluated to be high in the ghost determination, and the approaching object is not excluded from the collision determination. When the target parking position GL1 is on the other side of the shielding object LN and the traveling direction X6 of the own vehicle C1 and the position (direction) of the approaching object C8 with respect to the own vehicle C1 roughly coincide with each other, the sensor control unit 16 evaluates the safety level of the approaching object C8 to be low. This is because, since the target parking position GL1 is located on the other side of the shielding object LN, it is ensured that there is a gap through which the vehicle can pass in the shielding object LN, and when the own vehicle advances to the target parking position GL1, the shielding effect becomes zero because the shielding object LN is not the shielding object located between the own vehicle and the approaching object. Further, the sensor control unit 16 calculates a time allowance to the collision based on a distance and an approach speed of the approaching object C8 detected by the radar 13, and determines whether emergency braking is necessary based on the time allowance. Unlike the above, if the direction toward the detected approaching object is, for example, a direction toward the vehicle C9 that is a parked vehicle on the right side of the target parking position GL1, it can be expected that the approach is blocked by the shielding object LN (the shielding effect is high), and an estimated ghost position overlaps with the vehicle C9 (the ghost likelihood is low), so that the safety level may be evaluated to be high.

As described above, the sensor control unit 16 evaluates the position of the detection point group detected by the sonar 12 and a position of an obstacle estimated based on the detection point group with reference to the target parking position GL1, so that the shielding effect on the assumption that the vehicle moves to the target parking position GL1 can be evaluated. In addition, the sensor control unit 16 evaluates the direction in which the approaching object is detected with the direction toward the target parking position GL1 as a reference, so that it is possible to appropriately evaluate the safety level with respect to the approaching object detected at the time of parking.

Figure 15:
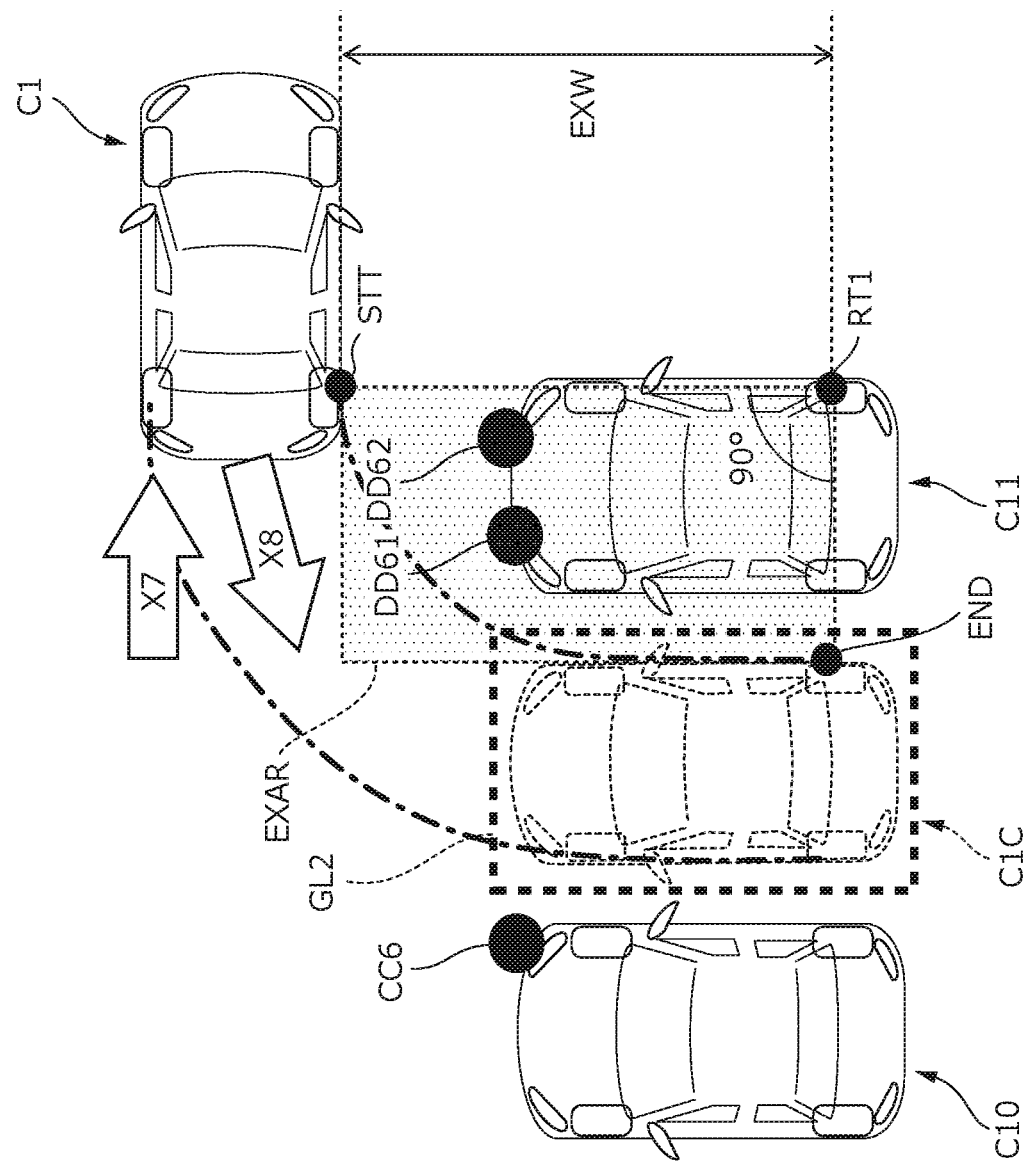
FIG. 15 is a diagram illustrating automatic setting processing of a target parking position.

Next, automatic estimation processing of a target parking position GL2 of the own vehicle C1 will be described with reference to FIG. 15. FIG. 15 is a diagram illustrating a positional relationship between the target parking position GL2 and the own vehicle. In FIG. 15, the own vehicle advances in front of the target parking position GL2 in a traveling direction X7 to reach the position of C1, temporarily stops here, then reverses in a traveling direction X8, and is parked between two parked vehicles C10 and C11.

When it is determined, based on various kinds of information (for example, a steering angle and a gear position of the own vehicle C1) output from the mechanical sensor 10, that the traveling direction of the own vehicle C1 changes from advancing (traveling direction X7) to the reversing (traveling direction X8) at the parking lot and the steering angle is equal to or greater than a predetermined angle, the sensor control unit 16 estimates that the own vehicle C1 is to be parked at the target parking position GL2.

(Automatic Estimation Processing of Target Parking Position)

Specifically, when the traveling direction of the own vehicle C1 is changed from advancing (traveling direction X7) to reversing (traveling direction X8), the sensor control unit 16 determines that the own vehicle C1 is in a parking lot and is reversing for the purpose of parking if the own vehicle C1 is in a region other than a road (for example, in a site of a building, a store, or the like, or in a site of a parking lot provider) based on position information of the own vehicle C1 output from the navigation 18. The sensor control unit 16 may determine that the own vehicle C1 is in the parking lot when a white line corresponding to the parking frame is detected from an image captured by the camera 11. When the side sonars (sonars FRS, FLS, BRS, BLS) provided on the sides detect that the vehicles are arranged at roughly regular intervals, it may be determined that the own vehicle C1 is in the parking lot, or a plurality of methods may be used to determine that the own vehicle C1 is in the parking lot. The above detection may be performed when the vehicle starts to reverse, or may be performed using information detected when the vehicle passes in front of the parking frame. If the parking frame is detected when the own vehicle C1 advances in the parking lot, the information of the detected parking frame can be used when the own vehicle C1 starts reversing. When it is determined that the own vehicle C1 is in the parking lot, the sensor control unit 16 acquires information such as orientation of the vehicle body of the own vehicle C1 or a traveling direction of the own vehicle C1 before stop (in the example illustrated in FIG. 15, the traveling direction X8) based on various kinds of information output from the mechanical sensor 10, and estimates a position of the target parking position GL2 based on the acquired information.

The sensor control unit 16 estimates that the position of the own vehicle C1 at the time when the own vehicle C1 travels until the orientation of the vehicle body of the own vehicle C1 turns by 90° at the current steering angle is the target parking position GL2, with an orientation of the vehicle body of the own vehicle C1 at the time when the own vehicle stops or the traveling direction of the own vehicle C1 before the own vehicle C1 stops as a reference. For example, when the steering angle becomes equal to or greater than a predetermined angle, the sensor control unit 16 estimates that the parking operation of the own vehicle C1 is ended at a position C1C at which the orientation of the vehicle body of the own vehicle C1 is turned by 90° in a steering angle direction as illustrated in FIG. 15.

The sensor control unit 16 calculates a start point STT and an end point END of a movement trajectory of the own vehicle C1 formed at the time when the own vehicle C1 travels in the traveling direction X8 until the orientation of the vehicle body of the own vehicle C1 turns by 90° about a turning center RT1 at a steering angle at the position of C1 of the own vehicle, and calculates a rectangular region EXAR having the start point STT and the end point END as two diagonal points thereof. Detection points and a shielding object in the region EXAR have a shielding effect when the own vehicle is located at the position C1, but do not have a shielding effect when the own vehicle advances to the position of the target parking position GL2. Although an example in which the own vehicle C1 performs reverse parking has been described in the example illustrated in FIG. 15, the same applies to a case of advancing parking. In the example illustrated in FIG. 15, the start point STT and the end point END of the movement trajectory are positions of a right rear wheel of the own vehicle C1. The method of estimating the position of the target parking position GL2 is not limited to the above, and the position of the target parking position GL2 may be estimated based on a line passing through detection points (CC6, DD61, DD62) of the sonar and the vehicle length of the own vehicle When the detection points of the sonar have a gap between the CC6 and the DD61 and the own vehicle starts to reverse toward the gap, it may be estimated that the own vehicle moves to a position advanced by the vehicle length of the own vehicle in a direction perpendicular to a line connecting the CC6 and the DD61. Further, when a white line corresponding to the frontage of the parking frame is detected from an image captured by the camera 11, it may be estimated that the own vehicle moves to a position advanced by the vehicle length of the own vehicle in a direction perpendicular to the white line corresponding to the frontage of the parking frame. The angle at which the orientation of the vehicle body of the own vehicle C1 is turned at the time of parking is not limited to 90°, and an angle of a detected parking frame line with respect to a passage direction or an angle between a short side and a long side of the parking frame line may be applied. In addition, a reference of the angle may be a traveling direction (traveling direction X8) at the time of traveling in the passage, instead of the orientation of the vehicle body at the time of starting to reverse. The above describes a method of estimating the target parking position in a case of manual parking, and when parking is performed using an automatic parking function, a position of a target parking frame set in the process of automatic parking may be directly used as a target parking position. The frontage of the parking frame may be detected by the sonar instead of the camera. In a case where the detection is performed by the sonar, it may be estimated, at the time when reversing toward a section where no detection point is present is started, that the section where no detection point is present is the frontage of the parking frame and the parking frame continues behind the frontage.

(Method of Evaluating Safety Level in Case where Target Parking Position is Automatically Set)

In a case where the target parking position GL2 is estimated, the sensor control unit 16 may execute the evaluation of the safety level after excluding detection points (the detection points DD61 and DD62 in the region EXAR in the example illustrated in FIG. 15) located in a section extending to a far end of the target parking position GL2 on the assumption that the own vehicle C1 moves to the target parking position GL2. The exclusion of the detection point CC6 may be determined according to a direction toward an approaching object. For example, when the vehicle is at C1, if a direction in which the approaching object comes is a direction of 90 degrees to the right (a direction toward a vehicle C11), the detection point CC6 may be excluded at the same time as the DD61, or if the approaching object is at the right rear side (a direction toward a vehicle C10), the detection point CC6 is considered to have a shielding effect even after the own vehicle is advanced to the target parking position GL2 and thus should not be excluded from the evaluation of the safety level.

Figure 16:
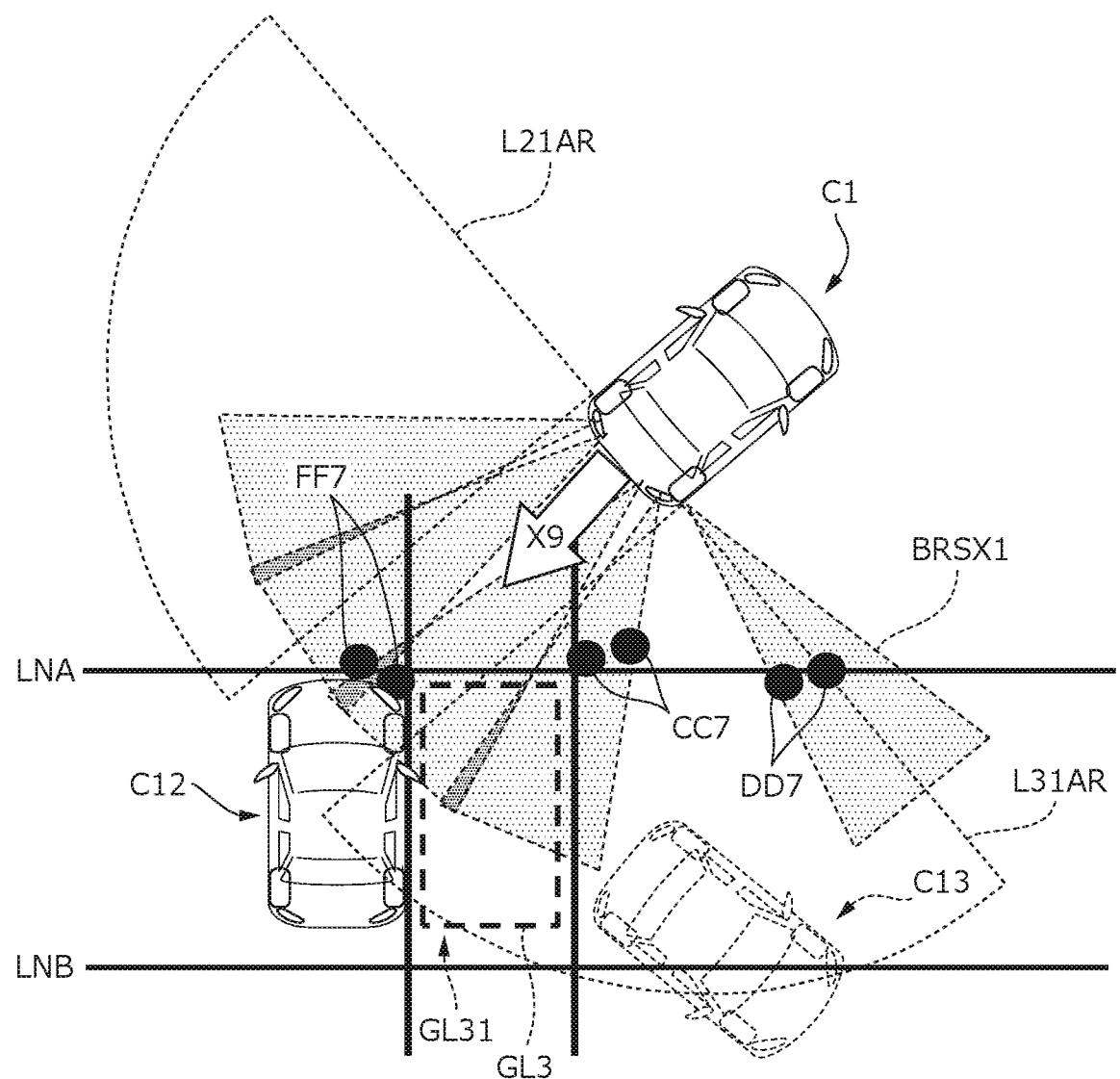
FIG. 16 is a diagram illustrating a method of evaluating ghost likelihood and a safety level in a case where a target parking position is set.
Figure 17:
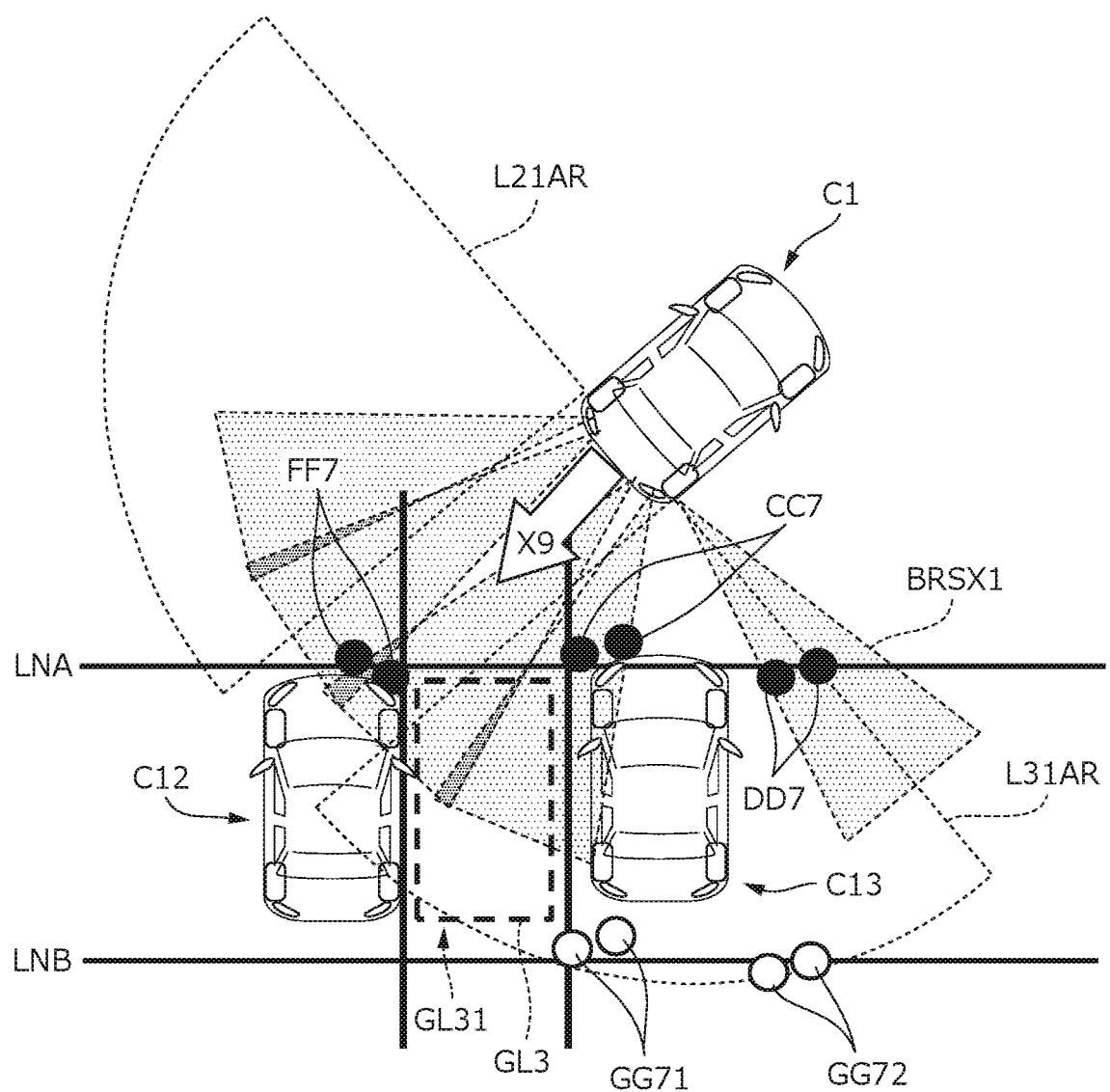
FIG. 17 is a diagram illustrating a method of evaluating ghost likelihood and a safety level in a case where a target parking position is set.

Next, a method of evaluating the ghost likelihood and the safety level in a case where a target parking position GL3 of the own vehicle C1 is estimated will be described with reference to FIGS. 16 and 17. FIGS. 16 and 17 are diagrams illustrating vehicles, the target parking position GL3, positions of detection points, and an estimated position of a shielding object. The own vehicle C1 illustrated in FIGS. 16 and 17 is reversed in a traveling direction X9 to be parked at the target parking position GL3.

(Method of Evaluating Ghost Likelihood and Safety Level in Case where Target Parking Position is Set)

Hereinafter, description will be made with reference to FIG. 16. The sensor control unit 16 estimates a shielding object on a line LNA connecting a plurality of detection points detected by the sonar 12. The sensor control unit 16 assumes generation of a ghost due to the estimated shielding object, and estimates an estimated ghost position at a position symmetrical to the own vehicle C1 with a position of the shielding object (line LNA) as a reference axis. It is assumed that the radar detects an approaching object C13 at the same position as the estimated ghost position. That is, it is assumed that the approaching object C13 may be a ghost or an actual approaching vehicle since the approaching object C13 is detected at the same position as the estimated ghost position.

The sensor control unit 16 calculates a position of a short side GL31 of the target parking position GL3 and the position of the approaching object C13. The sensor control unit 16 compares distances starting from the own vehicle C1 to the position of the short side GL31 and the position of the approaching object C13, and determines whether the approaching object C13 is farther than the position of the short side GL31.

When it is determined that the approaching object C13 is closer than the position of the short side GL31 or the distances are equal, the sensor control unit 16 evaluates a ghost likelihood of the approaching object to be high. However, the rule for determining that the ghost likelihood is low is given priority on the condition that the approaching object is in the direction toward the target parking position, which has been described with reference to FIG. 14. In the case of FIG. 16, since the approaching object is not in the direction toward the target parking position, the approaching object is not the target of the rule described above. Since there is a low possibility that the vehicle is movable at a position closer than the short side GL31, which is the far end of the target parking position, the ghost likelihood may be estimated to be high.

In the case of FIG. 16, there is a vehicle is parked on the right of the target parking position GL3, a detection point CC7 and a detection point DD7 are detected from the parked vehicle, and as a result of a radar wave being reflected by the parked vehicle, there is a possibility that a ghost is generated at the position of the approaching object C13 (a possibility that the approaching object C13 is a ghost). If there is a parked vehicle corresponding to the detection point CC7 and the detection point DD7, the approaching object C13 overlaps the parked vehicle, and thus it can be said that there is a low possibility that the approaching object C13 is a substance (ghost likelihood is high). Alternatively, it is also considered that a guardrail is present to the right of the target parking position GL3, and a ghost is generated at the position of the approaching object C13 as a result of the radar wave being reflected by the guardrail. Also in this case, it is considered that there is a linear structure such as a guardrail corresponding to the detection point CC7 and the detection point DD7, and there is a low possibility that a vehicle actually exists at the position of the approaching object C13 behind the linear structure (that is, there is a high possibility that the approaching object C13 is a ghost). This is because there is no reasonable ground for providing a guardrail or the like that hinders the passage of the vehicle at the positions of the detection point CC7 and the detection point DD7 even though the own vehicle can be parked at the target parking position GL3 and there is a space, in which the vehicle can move, to the right of the target parking position GL3. Therefore, the sensor control unit 16 may evaluate a ghost likelihood of estimating that the approaching object is a ghost in the case where the approaching object is determined to be closer than the position of the short side GL31 of the target parking position GL3 to be higher than a ghost likelihood in the case where the position of the approaching object is determined to be farther than the position of the short side GL31. For example, when an approaching object is present at a position farther than a line LNB, there is a possibility that a vehicle is traveling on a passage provided on the other side of a queue of parked vehicles, and thus it is appropriate to evaluate the ghost likelihood to be lower than that in a case where the approaching object is located between the line LNA and the line LNB. When the approaching object is in the direction toward the target parking position, the ghost likelihood is evaluated to be low even between the line LNA and the line LNB because the approaching object is present at a position where a vehicle may actually exist. That is, compared with the rule of estimating the ghost likelihood to be higher when the approaching object is closer than the far end of the target parking position than when the approaching object is farther than the far end, the rule of evaluating the ghost likelihood to be low is prioritized when the approaching object is in the direction toward the target parking position. In the case of FIG. 16, since the estimated ghost position is at C13, the case does not correspond to the case where the approaching object is in the direction toward the target parking position, and the ghost likelihood is evaluated to be low since the approaching object is closer than the position of the short side GL31.

FIG. 17 is a diagram illustrating a relationship between the target parking position GL3, a position of a detection point group, the shielding effect, and the ghost likelihood. It is assumed that an approaching object (not illustrated) is located farther than the line LNA as viewed from the own vehicle C1. In the example illustrated in FIG. 17, since the detection points CC7 and FF7 detected by the sonar 12 are located closer to the own vehicle C1 than the approaching object is, there is a possibility that the detection points CC7 and FF7 function as a shielding object that prevents the approaching object from advancing to the position of the own vehicle C1. However, when the target parking position GL3 is estimated, the sensor control unit 16 estimates that a shielding object on the line LNA indicated by the detection points CC7 and FF7 is a shielding object having a gap for parking the own vehicle C1 at the target parking position GL3, and determines a lowered shielding effect. At the same time, since there is a high possibility that the shielding object on the line LNA is another vehicle or a wall surface, the ghost likelihood is evaluated to be high when the approaching object is at the position C13, but the ghost likelihood is estimated to be low when the approaching object is at the position of the target parking position GL3. Therefore, if an evaluation value of the shielding effect is low and the ghost likelihood is also low, the evaluation value of the safety level is low. That is, when there is an approaching object in the vicinity of the target parking position GL3, an automatic brake is likely to be operated.

On the other hand, in FIG. 17, when there are no detection points CC7 and DD7, detection points GG71 and GG72 (that is, on the line LNB illustrated in FIG. 17) are detected by the sonar 12, and an approaching object is located farther than the line LNB, the sensor control unit 16 estimates that the detection points GG71 and GG72 are detection information of an obstacle present behind the target parking position GL3 (that is, on the other side of the target parking position GL3 when viewed from the own vehicle C1). In such a case, the sensor control unit 16 may evaluate the safety level to be high because the obstacle is located at a position farther than the short side GL31 of the target parking position GL3 and has a shielding effect of blocking an approaching object coming from a farther position.

When there are detection point groups arranged in a line behind the target parking position GL3, the probability of being a structure such as a wall surface is high. Accordingly, the ghost likelihood may be evaluated to be higher in a case where an approaching object is located farther than the detection point groups arranged in a line than in a case where an approaching object is located near the target parking position GL3.

Figure 18:
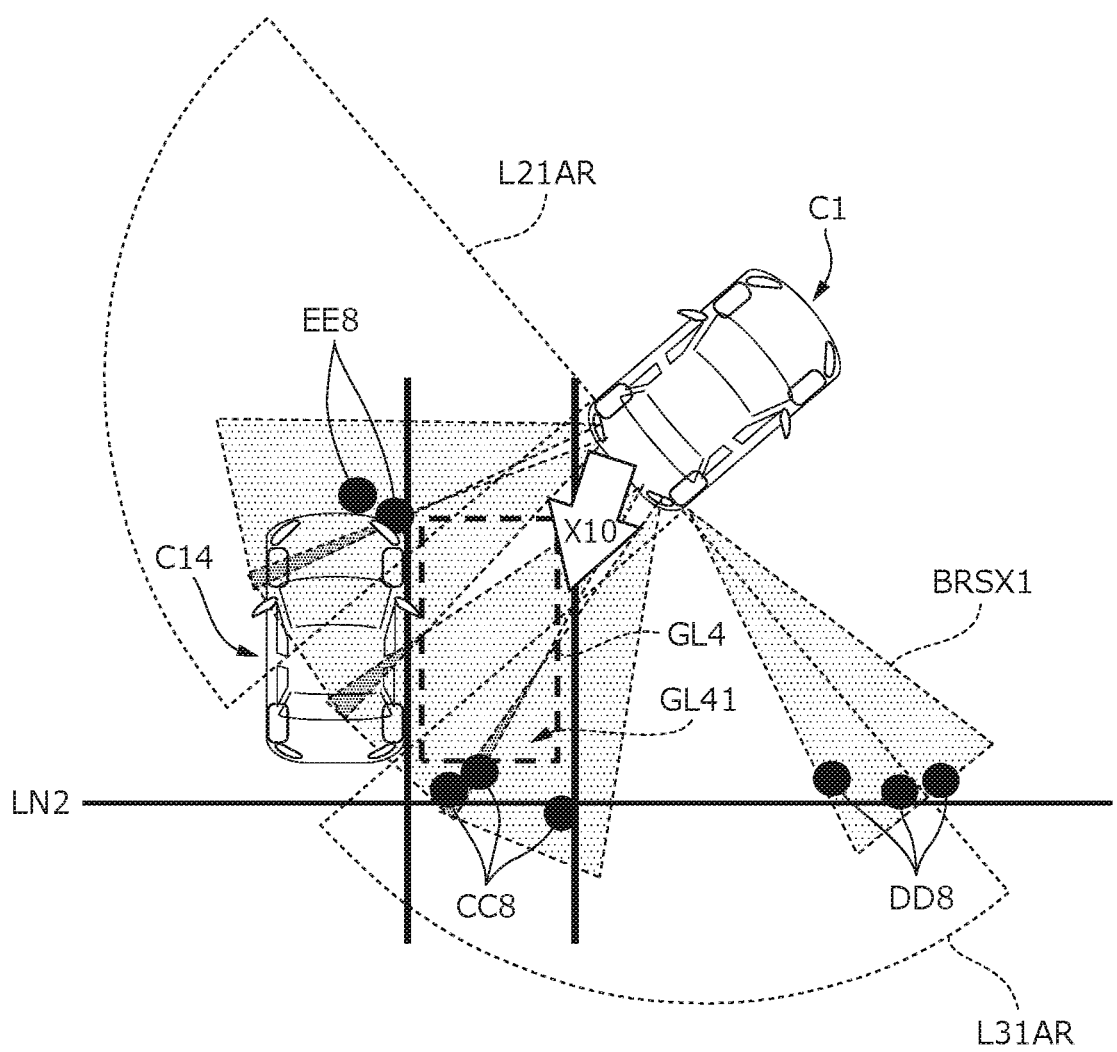
FIG. 18 is a diagram illustrating a method of evaluating ghost likelihood and a safety level in a case where a target parking position is set.

Next, a method of evaluating the ghost likelihood and the safety level in a case where the target parking position GL4 of the own vehicle C1 is estimated will be described with reference to FIG. 18. FIG. 18 is a diagram illustrating the target parking position GL4 and positions of detection point groups. The own vehicle C1 illustrated in FIG. 18 is reversed in a traveling direction X10 to be parked at the target parking position GL4.

The sensor control unit 16 determines a detection point group for a plurality of detection points detected by the sonar 12. In the example illustrated in FIG. 18, the plurality of detection points detected by the sonar 12 are classified into three detection point groups CC8, DD8, and EE8 based on the distance between the detection points.

In the evaluation of the safety level, the sensor control unit 16 determines that the detection point group CC8 located in a direction directing from a current position toward the target parking position GL4 (that is, the traveling direction X10) has a large contribution to the safety of the own vehicle C1, and the detection point group DD8 not located in the traveling direction X10 has a relatively small contribution to the safety of the own vehicle C1. In such a case, the sensor control unit 16 increases the weighting of each detection point included in the detection point group CC8 and decreases the weighting of each detection point included in the detection point group DD8 in safety level evaluation processing. For the safety level evaluation processing, the sensor control unit 16 may perform the safety level evaluation processing using only detection points included in the detection point group CC8 close to the target parking position GL4. In addition, since the safety level described here is derived from the shielding effect of an obstacle, the safety level may be replaced with the shielding effect. In addition, the evaluation of the safety level may be based on not only the traveling direction of the own vehicle but also a direction in which the approaching object is detected. For example, when the radar of the own vehicle C1 detects an approaching object to the left rear side, the detection point group EE8 may be added to the evaluation of the safety level. With the detection point group EE8, the presence of an adjacent vehicle C14 is detected. If the own vehicle is parked at the target parking position GL4, the adjacent vehicle C14 serves as a shielding object against an approaching object from the left, and thus, it may be determined that it is safe to continue the parking.

The sensor control unit 16 estimates that the detection point groups CC8 and DD8 indicate an obstacle on a line LN2 located behind the target parking position GL4 (that is, on the other side of the target parking position GL4 when viewed from the own vehicle C1). In such a case, the sensor control unit 16 may calculate an estimated ghost position assuming that the line LN2 is a reflecting surface, and evaluate the ghost likelihood for an approaching object farther than the line LN2. When the approaching object is closer than the LN2, the approaching object is unlikely to be a ghost, and thus the ghost likelihood evaluation may be omitted. Since the own vehicle C1 is not moved to a position farther than a short side GL41 of the target parking position GL4 and is protected by the detection points (obstacle), the safety level may be evaluated to be high without evaluating the ghost likelihood. Also in the collision determination, when a course of the own vehicle C1 intersects a course of the approaching object at a position farther than the line LN2, it may be determined that the own vehicle C1 does not collide with the approaching object on the assumption that the own vehicle C1 stops at the target parking position GL4.

Figure 19:
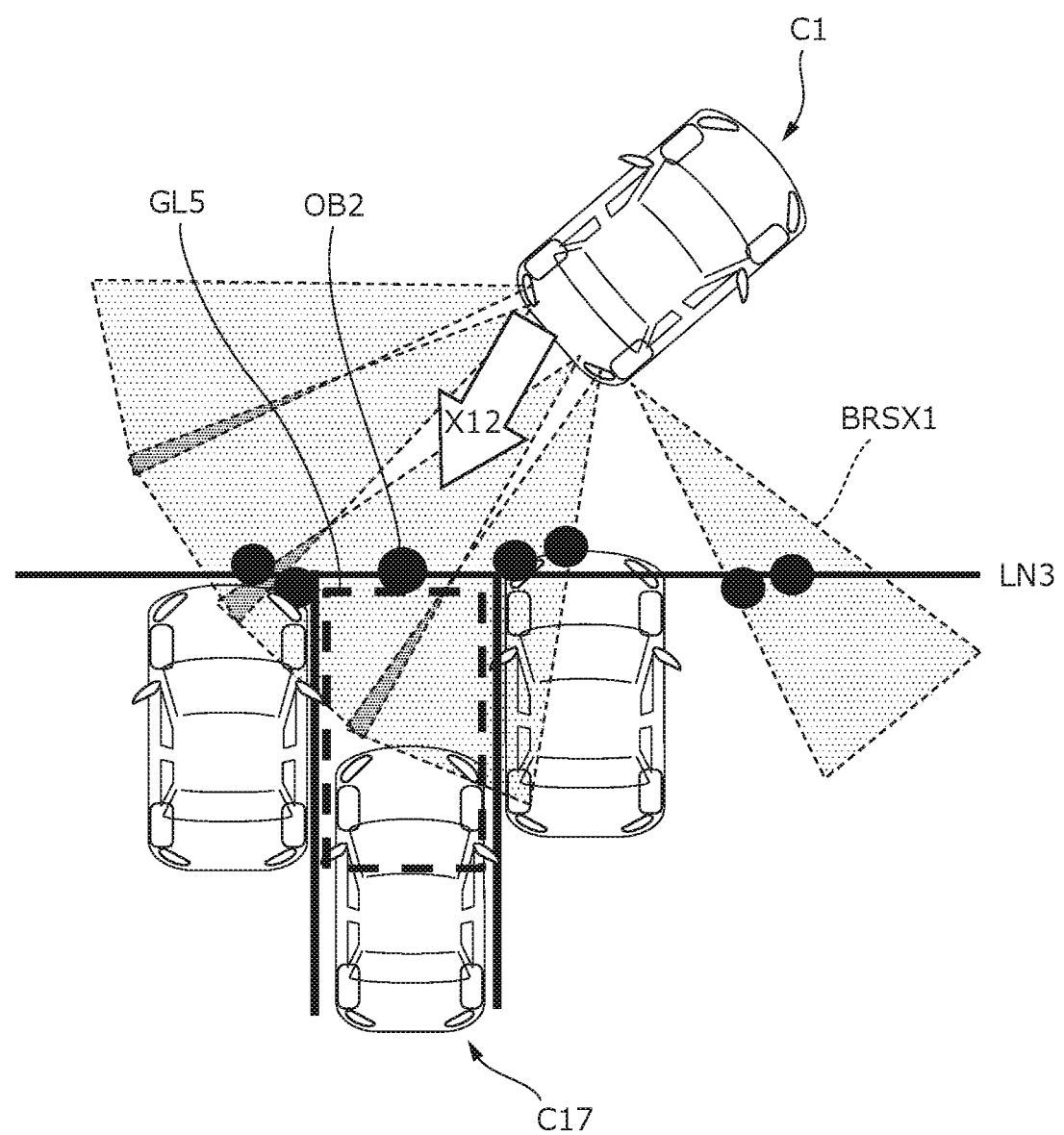
FIG. 19 is a diagram illustrating a relationship between detection of a detected object and an approaching object and evaluation of ghost likelihood and a safety level.

A relationship between detection of a detected object by the sonar 12 and detection of an approaching object by the radar 13 and evaluation of the ghost likelihood and evaluation of the safety level will be described with reference to FIG. 19. FIG. 19 is a diagram illustrating an arrangement of detected objects and an approaching object. FIG. 19 illustrates an example in which the own vehicle C1 is reversed in a traveling direction X12 to be parked at a target parking position GL5.

The ghost likelihood is used in evaluation of the safety level. When the ghost likelihood is evaluated to be high, there is a high possibility that the approaching object is a ghost, and there is a low possibility that the approaching object collides with the own vehicle, so that the safety level is evaluated to be high. When the ghost likelihood is evaluated to be low, there is a high possibility that the approaching object is not a ghost, and there is a possibility that the approaching object collides with the own vehicle, so that the safety level is evaluated to be low. In addition, when it is determined that there is a shielding object capable of shielding the own vehicle from the approach of the approaching object, the sensor control unit 16 estimates that the possibility that the approaching object approaches and collides with the own vehicle is low due to the shielding object, and the safety level is evaluated to be high. When it is determined that there is no shielding object capable of shielding the own vehicle from the approach of the approaching object, the sensor control unit 16 estimates that there is a possibility that the approaching object approaches and collides with the own vehicle due to absence of a shielding object, and the safety level is evaluated to be low. That is, the safety level is evaluated to be high when the sensor control unit 16 determines that the ghost likelihood of an approaching object detected by the radar 13 is high or that there is a shielding object that can shield the own vehicle from the approach of the approaching object.

When the safety level is high, the approaching object detected by the radar 13 is excluded from targets of emergency braking necessity determination (that is, the collision determination). On the other hand, a detected object (obstacle) detected by the sonar 12 is a target of the emergency braking necessity determination (collision determination) regardless of the ghost likelihood.

For example, in the example illustrated in FIG. 19, when the radar 13 of the own vehicle C1 detects an approaching object C17, since an obstacle (detection point) OB2 detected by the sonar 12 is located on the traveling direction X12 of the own vehicle C1, the sensor control unit 16 may determine that there is a shielding object that can shield the own vehicle C1 from the approach of the approaching object C17 by the obstacle OB2. Based on evaluation of a shielding degree thereof, the sensor control unit 16 may evaluate the safety level with respect to the approaching object C17 detected by the radar 13 to be high.

However, an object evaluated as having a high safety level by the sensor control unit 16 is only the approaching object C17 detected by the radar 13, and is not the detected object (obstacle OB2) detected by the sonar 12. Therefore, even when the sensor control unit 16 evaluates the approaching object C17 to be having a high safety level, the sensor control unit 16 does not exclude the obstacle OB2 detected by the sonar 12 from evaluation targets of safety level (that is, targets of collision determination), and similarly executes the safety level evaluation processing for the obstacle OB2.

Since the obstacle OB2 is located near the target parking position GL5 (that is, in a direction in which the own vehicle C1 approaches the obstacle OB2), the sensor control unit 16 executes collision determination as to whether the obstacle OB2 and the own vehicle C1 collide with each other. When it is determined in the collision determination that there is a risk (possibility) that the obstacle OB2 and the own vehicle C1 will collide with each other if the own vehicle C1 continues to reverse, the sensor control unit 16 causes the vehicle control unit 17 to execute emergency braking. At this time, a risk of collision with the approaching object C17 may be added to the calculation in consideration of a possibility that the obstacle OB2 is not a fixed object but an object such as a cone placed on the ground that cannot prevent the approaching object C17 from approaching. Since this consideration of the possibility increases the risk evaluation value, a conclusion of executing emergency braking does not change even when the consideration is added. Alternatively, since the own vehicle is about to park to the other side of the obstacle OB2, it may be estimated that the obstacle OB2 is not present or that the obstacle OB2 is an object (for example, a step) not shielding the own vehicle from the approaching object C17, and a shielding degree of detection points on a LN3 may be evaluated to be low, and the safety level of the approaching object C17 may be evaluated to be low. That is, also in this case, if the processing is appropriate, the conclusion of executing the emergency braking does not change.

Figure 20:
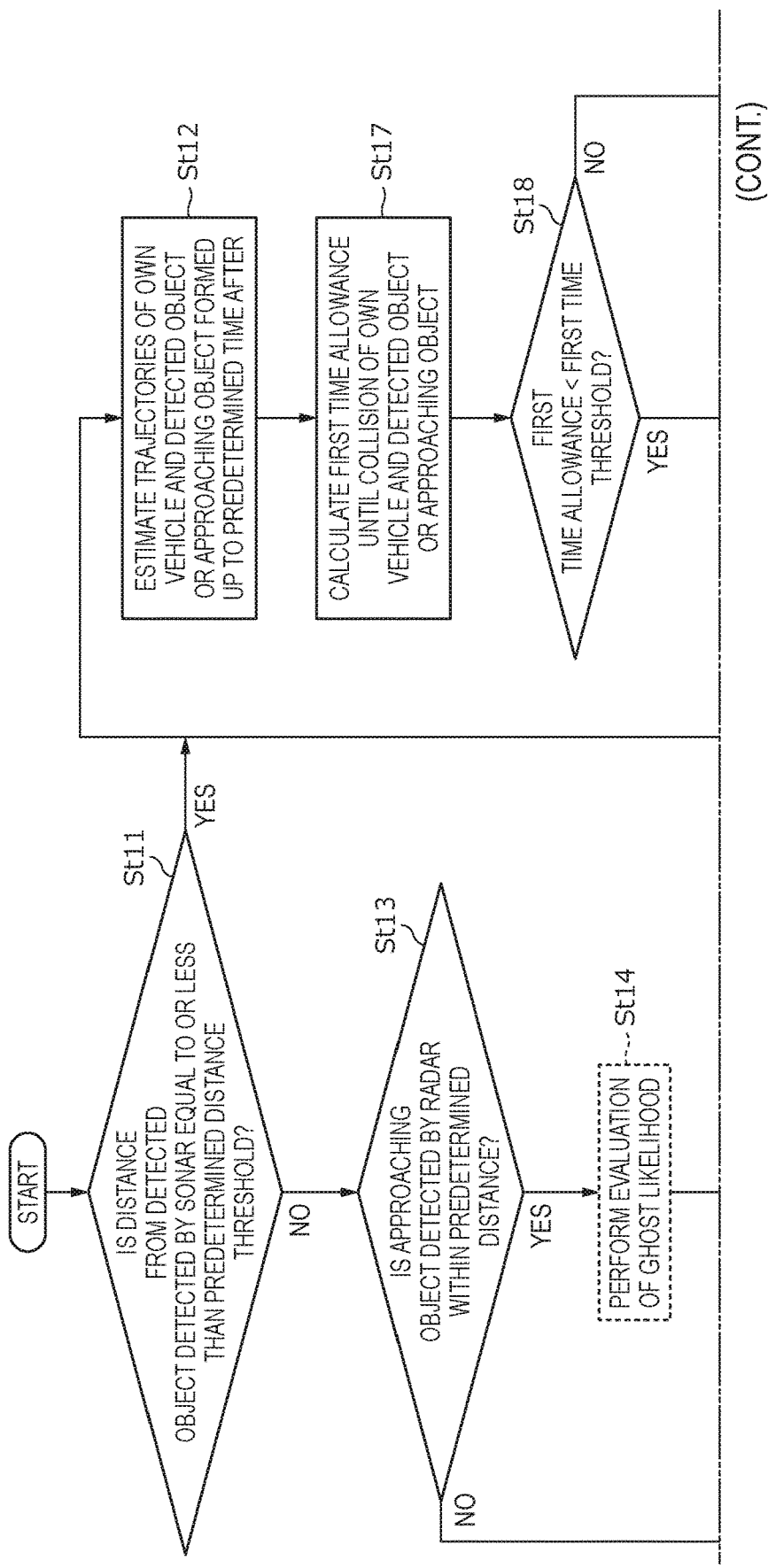
FIG. 20 is a flowchart illustrating an example of an operation procedure of the own vehicle according to the first embodiment.

Here, an example of an operation procedure of the own vehicle C1 according to the first embodiment will be described with reference to FIG. 20. FIG. 20 is a flowchart illustrating the example of the operation procedure of the own vehicle C1 according to the first embodiment.

First, the sensor control unit 16 of the own vehicle C1 causes the twelve sonars 12 to detect an object (such as an obstacle) in respective detection ranges, and causes the three radars 13 to detect a reflecting body (such as an approaching object) in respective scanning ranges.

The twelve sonars output detection information on a detected object to the sensor control unit 16. In addition, the three radars 13 output detection information on a detected reflecting body to the sensor control unit 16. The above processing has already been performed before START, and is not shown in the flowchart.

The sensor control unit 16 determines whether there is a detected object detected by the sonar 12 and whether a distance between a position of the detected object and the own vehicle C1 is equal to or less than a predetermined distance threshold (for example, 3 m) (St11).

When it is determined in the processing of step St11 that the distance between the position of the detected object and the own vehicle C1 is equal to or less than the predetermined distance threshold (St11, YES), the sensor control unit 16 proceeds to the collision determination processing following St11. The collision determination processing following St12 will be described later.

On the other hand, when it is determined in the processing of step St11 that there is no detected object detected by the sonar 12 or the distance between the position of the detected object and the own vehicle C1 exceeds the predetermined distance threshold (SUL NO), the sensor control unit 16 determines whether an approaching object within a predetermined distance is detected by the radar 13. When an approaching object is detected by the radar 13, the sensor control unit 16 determines whether a distance between a position of the approaching object and the own vehicle C1 is equal to or less than a predetermined distance (for example, 5 m) (St13).

When it is determined in the processing of step St13 that no approaching object is detected or the distance between the position of the approaching object and the own vehicle C1 is not equal to or less than the predetermined distance (St13, NO), the sensor control unit 16 ends the operation procedure illustrated in FIG. 20.

On the other hand, when it is determined in the processing of step St13 that an approaching object is detected and the distance between the approaching object and the own vehicle C1 is equal to or less than the predetermined distance (St13, YES), the sensor control unit 16 executes the evaluation of the ghost likelihood (St14). The processing of step St14 is not essential, and the process may proceed to step St15 without evaluating the ghost likelihood. For example, in a case where detection points of the sonar are arranged side by side at an interval of a predetermined distance (for example, 1.8 m) or less, indicating the presence of a shielding object through which the vehicle cannot pass, and the shielding object shields the own vehicle C1 from a direction toward the approaching object or a traveling direction of the own vehicle C1, since the approaching object poses no risk at all even if the approaching object is not a ghost, the evaluation of the ghost likelihood may be omitted, or a control procedure in which the evaluation of the ghost likelihood is not performed at all from the beginning may be implemented. In step St15, the safety level is evaluated based on the ghost likelihood (if any) and the shielding degree of the detection points.

The sensor control unit 16 determines whether the safety level evaluated in the processing of step St15 is less than a predetermined safety level threshold (St16). The predetermined safety level threshold referred to here is a value for determining whether emergency braking is necessary, and is set to a value with the maximum value of the safety level as a reference. For example, when the maximum value of the safety level is "100", the predetermined safety level threshold is set to a value such as "80" or "75".

When it is determined in the processing of step St16 that the safety level is equal to or greater than the predetermined safety level threshold (predetermined value) (St16, NO), the sensor control unit 16 ends the operation procedure illustrated in FIG. 20.

On the other hand, when it is determined in the processing of step St16 that the safety level is less than the predetermined value (St16, YES), the sensor control unit 16 proceeds to the collision determination processing of St12. It is similar to the case where it is determined in step St11 that the detected object of the sonar 12 is at a short distance (St11, YES). In step St12, a movement trajectory of the own vehicle C1 formed over a predetermined period (for example, 6 seconds) starting from a current time point and a movement trajectory of an approaching object formed over a predetermined period (for example, 6 seconds) starting from the current time point are estimated.

In the next step St17, the sensor control unit 16 calculates a first time allowance until collision of the own vehicle C1 with the detected object or the approaching object, based on the estimated movement trajectory of the own vehicle C1 and the movement trajectory of the detected object or the approaching object over the predetermined period (for example, 6 seconds) starting from the current time point.

The sensor control unit 16 determines whether the calculated first time allowance is less than a first time threshold (for example, 5 seconds) (St18).

When it is determined in the processing of step St18 that the calculated first time allowance is equal to or greater than the first time threshold (St18, NO), the sensor control unit 16 suspends emergency braking and ends the operation procedure illustrated in FIG. 20.

On the other hand, when it is determined in the processing of step St18 that the calculated first time allowance is less than the first time threshold (St18, YES), the sensor control unit 16 calculates a second time allowance until collision of the own vehicle C1 with the detected object or the approaching object in a case where deceleration control is executed by the vehicle control unit 17 (that is, a traveling speed of the own vehicle C1 is reduced) (St19).

Subsequently, the sensor control unit 16 determines whether the second time allowance calculated in the processing of step St19 is less than a second time threshold (for example, 4 seconds) (St20).

When it is determined that the second time allowance calculated in the processing of step St19 is less than the second time threshold (for example, 4 seconds) (St20, YES), the sensor control unit 16 generates a control command for requesting emergency braking and outputs the control command to the vehicle control unit 17. The vehicle control unit 17 executes the emergency braking based on the control command output from the sensor control unit 16 (St21).

On the other hand, when it is determined that the second time allowance calculated in the processing of step St19 is equal to or greater than the second time threshold (for example, 4 seconds) (St20, NO), the sensor control unit 16 generates a control command for requesting deceleration control and outputs the control command to the vehicle control unit 17. The vehicle control unit 17 executes the deceleration control based on the control command output from the sensor control unit 16 (St22).

As described above, the vehicle control device 20 mounted on the own vehicles C1, C1A, and C1B (examples of a vehicle) according to the first embodiment includes the sonar 12 or the radar 13 (an example of an acquisition unit) that acquires detection information obtained by detecting an obstacle around the own vehicle, and the sensor control unit 16 that performs collision determination of evaluating a possibility of collision with the obstacle. The sensor control unit 16 generates, based on the detection information, information on an approaching object that is an obstacle approaching the own vehicle and information on a detection point indicating an obstacle that does not move, estimates a position of a shielding object based on the information on the detection point, evaluates a ghost likelihood indicating a possibility of the approaching object being a ghost based on the position of the obstacle and the information on the approaching object, and excludes the approaching object from the collision determination based on the ghost likelihood.

Accordingly, the vehicle control device 20 mounted on the own vehicles C1, C1A, and C1B according to the first embodiment is the vehicle control device 20 mounted on the own vehicle, and includes the sonar 12 or the radar 13 that acquires detection information obtained by detecting an obstacle around the own vehicle, and the sensor control unit 16 that performs collision determination of evaluating a possibility of collision with the obstacle. Based on the detection information, the sensor control unit 16 generates information on an approaching object that is an obstacle approaching the own vehicle, and information on a detection point indicating an obstacle that does not move. The sensor control unit 16 estimates a position of a shielding object based on the information on the detection point, evaluates a ghost likelihood indicating a possibility of the approaching object being a ghost based on the position of the shielding object and the information on the approaching object, and excludes the approaching object from collision determination based on the ghost likelihood. Accordingly, an approaching object having a high ghost likelihood and determined as a ghost posing no risk can be excluded from targets of collision determination, and thus unnecessary emergency braking can be avoided.

As described above, the sensor control unit 16 of the vehicle control device 20 according to the first embodiment specifies an estimated ghost position, at which a ghost may be generated, based on the position of the shielding object, and evaluates the ghost likelihood to be large when any one of the following is small: a distance between the estimated ghost position and the position of the approaching object, a larger value among an azimuth difference degree obtained by evaluating an azimuth difference between an azimuth of the estimated ghost position and an azimuth of the approaching object, and a distance difference degree obtained by evaluating a distance difference between a distance of the estimated ghost position and a distance of the approaching object, a total value of the azimuth difference degree and the distance difference degree, and a weighted average of the azimuth difference degree and the distance difference degree. Accordingly, the sensor control unit 16 of the vehicle control device 20 according to the first embodiment specifies an estimated ghost position, at which a ghost may be generated, based on the position of the shielding object, and evaluates the ghost likelihood to be large when any one of the following is small: a distance between the estimated ghost position and the position of the approaching object, a larger value among an azimuth difference degree obtained by evaluating an azimuth difference between an azimuth of the estimated ghost position and an azimuth of the approaching object, and a distance difference degree obtained by evaluating a distance difference between a distance of the estimated ghost position and a distance of the approaching object, a total value of the azimuth difference degree and the distance difference degree, and a weighted average of the azimuth difference degree and the distance difference degree. Thus, the ghost likelihood can be accurately evaluated.

As described above, the sensor control unit 16 of the vehicle control device 20 according to the first embodiment generates information on an approaching object based on detection information detected by the radar 13. The azimuth difference degree, the distance difference degree, or a weight of the weighted average is based on a standard error in azimuth direction of the radar 13 and an allowable error in distance direction of the radar 13. Accordingly, the sensor control unit 16 of the vehicle control device 20 according to the first embodiment generates information on an approaching object based on detection information detected by the radar 13, and the azimuth difference degree, the distance difference degree, or a weight of the weighted average is based on a standard error in azimuth direction of the radar 13 and an allowable error in distance direction of the radar 13, so that it is possible to accurately evaluate a ghost likelihood in accordance with error performance of the radar 13.

As described above, the sensor control unit 16 of the vehicle control device 20 according to the first embodiment repeatedly evaluates a ghost likelihood in a time-series manner, and excludes an approaching object from the collision determination when a total value, an average value, or a weighted average of ghost likelihoods evaluated in a time-series manner is equal to or greater than a predetermined value. Accordingly, the sensor control unit 16 of the vehicle control device 20 according to the first embodiment repeatedly evaluates a ghost likelihood in a time-series manner, and excludes an approaching object from the collision determination when a total value, an average value, or a weighted average of ghost likelihoods evaluated in a time-series manner is equal to or greater than a predetermined value, so that it is possible to accurately evaluate the ghost likelihood by using the accumulatively detected detection information.

As described above, the weight of the weighted average calculated by the vehicle control device 20 according to the first embodiment is based on the number of detection points involved in the evaluation of the ghost likelihood or is based on a sequence of the evaluation performed in a time-series manner. A ghost likelihood evaluated later is given more weight than a ghost likelihood evaluated earlier. Accordingly, the weight of the weighted average calculated by the vehicle control device 20 according to the first embodiment is based on the number of detection points involved in the evaluation of the ghost likelihood or is based on a sequence of the evaluation performed in time series, and a ghost likelihood evaluated later is given more weight than a ghost likelihood evaluated earlier, so that an evaluation performed at the time when accumulation of detection information is little is given more weight than an evaluation performed at the time when the accumulation of the detection information is increased and the ghost likelihood can be accurately evaluated.

As described above, the sensor control unit 16 of the vehicle control device 20 according to the first embodiment evaluates a ghost likelihood to be lower when there is no detection point in a direction toward an approaching object than when there is a detection point in the direction toward the approaching object. Accordingly, the vehicle control device 20 according to the first embodiment evaluates a ghost likelihood to be lower when there is no detection point in a direction toward an approaching object than when there is a detection point in the direction toward the approaching object, so that an approaching object is not determined as a ghost when there is no reflecting object in the direction toward the approaching object and it is possible to avoid excluding an approaching object, which is not a ghost, from collision determination.

As described above, the sensor control unit 16 of the vehicle control device 20 according to the first embodiment evaluates a ghost likelihood to be lower when the number of detection points in a direction toward an approaching object is small than when the number of detection points in the direction toward the approaching object is large. Accordingly, the sensor control unit 16 of the vehicle control device 20 according to the first embodiment evaluates a ghost likelihood to be lower when the number of detection points in a direction toward an approaching object is small than when the number of detection points in the direction toward the approaching object is large, so that an approaching object is not determined as a ghost when presence of a reflecting object in the direction toward the approaching object is doubtful and it is possible to avoid excluding an approaching object, which is not a ghost, from collision determination.

As described above, the sensor control unit 16 of the vehicle control device 20 according to the first embodiment generates the approximate straight line LS based on a plurality of detection points, calculates an average distance from the generated approximate straight line LS to the plurality of detection points or a variance of the plurality of detection points with respect to the approximate straight line LS, and evaluates a ghost likelihood to be high when the calculated average distance or variance is small. Accordingly, the sensor control unit 16 of the vehicle control device 20 according to the first embodiment generates an approximate straight line based on a plurality of detection points, calculates an average distance from the generated approximate straight line to the plurality of detection points or a variance of the plurality of detection points with respect to the approximate straight line, and evaluates a ghost likelihood to be high when the calculated average distance or variance is small, so that an approaching object is not determined as a ghost when presence of a reflecting object in a direction toward the approaching object is doubtful and it is possible to avoid excluding an approaching object, which is not a ghost, from collision determination.

As described above, the sensor control unit 16 of the vehicle control device 20 according to the first embodiment evaluates the ghost likelihood to be zero when the calculated average distance or variance is equal to or greater than a predetermined threshold. Accordingly, the sensor control unit 16 of the vehicle control device 20 according to the first embodiment evaluates the ghost likelihood to be zero when the calculated average distance or a variance is equal to or greater than a predetermined threshold, so that an approaching object is not determined as a ghost when presence of a reflecting object in a direction toward the approaching object is doubtful and it is possible to avoid excluding an approaching object, which is not a ghost, from collision determination.

As described above, the sensor control unit 16 of the vehicle control device 20 according to the first embodiment evaluates a ghost likelihood to be higher when the number of detection points used to generate the approximate straight line LS is large than when the number of detection points is small. Accordingly, the sensor control unit 16 of the vehicle control device 20 according to the first embodiment evaluates a ghost likelihood to be higher when the number of detection points used to generate the approximate straight line LS is large than when the number of detection points is small, so that the ghost likelihood is evaluated to be high when a probability of presence of a reflecting surface is high and the ghost likelihood can be accurately evaluated.

As described above, the sensor control unit 16 of the vehicle control device 20 according to the first embodiment evaluates a ghost likelihood based on an interval between detection points, and evaluates the ghost likelihood to be higher when the interval between the detection points is narrow than when the interval between the detection points is wide. Accordingly, the sensor control unit 16 of the vehicle control device 20 according to the first embodiment evaluates a ghost likelihood based on an interval between detection points, and evaluates the ghost likelihood to be higher when the interval between the detection points is narrow than when the interval between the detection points is wide, so that the ghost likelihood is evaluated to be high when a probability of presence of a reflecting surface is high and the ghost likelihood can be accurately evaluated.

As described above, when there is a target parking position at which the own vehicle is to be parked, the sensor control unit 16 of the vehicle control device 20 according to the first embodiment evaluates a ghost likelihood to be low if there is an approaching object in a direction with the target parking position of the own vehicle as a reference. Accordingly, when there is a target parking position at which the vehicle is to be parked, the sensor control unit 16 of the vehicle control device 20 according to the first embodiment evaluates a ghost likelihood to be low if there is an approaching object in a direction with the target parking position of the vehicle as a reference, so that the ghost likelihood is evaluated on the assumption that there is no reflecting surface in the direction toward the parking position and the ghost likelihood can be accurately evaluated.

As described above, in a case where there is a target parking position at which the vehicle is to be parked, the sensor control unit 16 of the vehicle control device 20 according to the first embodiment evaluates a ghost likelihood to be lower when an approaching object is located closer than a position with the target parking position of the own vehicle as a reference than when the approaching object is located farther than the position with the target parking position as a reference. Accordingly, in a case where there is a target parking position at which the vehicle is to be parked, the vehicle control device 20 according to the first embodiment evaluates a ghost likelihood to be lower when an approaching object is located closer than a position with the target parking position of the own vehicle as a reference than when the approaching object is located farther than the position with the target parking position as a reference, so that the ghost likelihood can be accurately evaluated by reflecting, in the ghost likelihood, a condition that there is no substantial approaching object based on a relationship between the approaching object and the parking position.

As described above, the vehicle control device 20 mounted on the own vehicles C1, C1A, and C1B according to the first embodiment includes the sonar 12 or the radar 13 (an example of an acquisition unit) that acquires detection information obtained by detecting an obstacle around the own vehicle (an example of a vehicle), and the sensor control unit 16 that performs collision determination of evaluating a possibility of collision with the obstacle. The sensor control unit 16 generates, based on the detection information, information on an approaching object that is an obstacle approaching the own vehicle and information on a detection point group that is a set of detection points indicating an obstacle that does not move, and excludes the approaching object from collision determination when the detection point group has a shielding effect of shielding the own vehicle from the approaching object. The shielding effect is evaluated by using a gap threshold set based on a vehicle width.

Accordingly, the vehicle control device 20 according to the first embodiment evaluates a shielding effect by using a gap threshold set based on a vehicle width, so that the shielding effect of protecting the own vehicle by an obstacle can be effectively evaluated, and an approaching object that does not pose a risk can be excluded from targets of collision determination, thereby avoiding unnecessary emergency braking.

As described above, in the vehicle control device 20 according to the first embodiment, the gap threshold set based on a vehicle width is set to a value equal to or smaller than a vehicle width of a passenger vehicle. The sensor control unit 16 compares a gap between detection points with the gap threshold, and evaluates the shielding effect to be lower when the gap between the detection points is larger than the gap threshold than when the gap between the detection points is smaller than the gap threshold. Accordingly, the gap threshold set based on a vehicle width is set to a value equal to or smaller than a vehicle width of a passenger vehicle, and the sensor control unit 16 of the vehicle control device 20 according to the first embodiment compares a gap between detection points with the gap threshold, and evaluates the shielding effect to be lower when the gap between the detection points is larger than the gap threshold than when the gap between the detection points is smaller than the gap threshold, so that emergency braking can be performed when a passenger vehicle can pass through the gap.

As described above, the vehicle control device 20 according to the first embodiment sets any one of a direction toward an approaching object, a traveling direction of the own vehicle, and a traveling direction of the approaching object as a reference direction. The shielding effect is obtained by evaluating a gap between detection points with reference to the reference direction. Accordingly, the vehicle control device 20 according to the first embodiment evaluates a gap between detection points with reference to a reference direction, thereby evaluating an interval between obstacles with respect to a direction in which the own vehicle moves, and thus can accurately evaluate a possibility that a vehicle passes through a gap.

As described above, the vehicle control device 20 according to the first embodiment evaluates a gap between detection points in a detection point group located in a reference direction, and in the evaluation of the shielding effect, evaluates a gap having a small deflection angle with respect to the reference direction to be given more weight than a gap having a large deflection angle with respect to the reference direction. Accordingly, the vehicle control device 20 according to the first embodiment evaluates a gap having a small deflection angle with respect to a reference direction to be given more weight than a gap having a large deflection angle with respect to the reference direction, so that importance is attached to a gap in a direction in which a vehicle moves and importance is not attached to a gap that is not in the direction in which the vehicle moves, and thus a possibility that the own vehicle passes through a gap can be accurately evaluated.

As described above, the vehicle control device 20 according to the first embodiment evaluates the number of detection points in a detection point group located in a reference direction, and evaluates the shielding effect to be higher when the number of detection points is large than when the number of detection points is small. Accordingly, the vehicle control device 20 according to the first embodiment evaluates a gap between detection points in a detection point group located in a reference direction, and in the evaluation of the shielding effect, evaluates a gap having a small deflection angle with respect to the reference direction to be given more weight than a gap having a large deflection angle with respect to the reference direction, so that importance is attached to a gap in a direction in which the own vehicle moves and importance is not attached to a gap that is not in the direction in which the own vehicle moves, and thus a possibility that a vehicle passes through a gap can be accurately evaluated.

As described above, in a case where there is a target parking position at which the own vehicle is to be parked, the vehicle control device 20 according to the first embodiment evaluates of the shielding effect to be low when an approaching object is in a direction with the target parking position as a reference. Accordingly, when there is a target parking position at which the own vehicle is to be parked and an approaching object is in a direction with the target parking position as a reference, the vehicle control device 20 according to the first embodiment evaluates the shielding effect to be low, so that a possibility that the own vehicle is shielded by an obstacle can be accurately evaluated on the assumption that there is a gap in the direction toward the target parking position through which a vehicle can pass.

As described above, in a case where there is a target parking position at which the own vehicle is to be parked, the vehicle control device 20 according to the first embodiment evaluates the shielding effect to be lower when a detection point group is closer than a position with the target parking position as a reference than when the detection point group is farther than the position with the target parking position as a reference. Accordingly, in a case where there is a target parking position at which the own vehicle is to be parked, the vehicle control device 20 according to the first embodiment evaluates the shielding to be lower when a detection point group is closer than a position with the target parking position as a reference than when the detection point group is farther than the position with the target parking position as a reference, so that the shielding effect can be evaluated on the assumption that the own vehicle moves to the target parking position and a detection point group having a low shielding effect when the own vehicle is moved to the target parking position can be effectively evaluated.

As described above, detection information detected by the vehicle control device 20 according to the first embodiment includes detection information detected by the radar 13. Information on an approaching object is based on the detection information detected by the radar 13. Accordingly, detection information includes detection information detected by the radar 13, and information on an approaching object is based on the detection information detected by the radar 13, so that the vehicle control device 20 according to the first embodiment can utilize the characteristics of the radar 13 capable of detecting an approach speed.

As described above, an evaluation target of the shielding effect of the vehicle control device 20 according to the first embodiment includes an obstacle detected by the radar 13. Accordingly, an evaluation target of the shielding effect includes an obstacle detected by the radar 13, so that the vehicle control device 20 according to the first embodiment can accurately evaluate the shielding effect by adding, to the evaluation of the shielding effect, a detection point in a direction in which an approaching object is detected.

As described above, detection information detected by the vehicle control device 20 according to the first embodiment includes detection information detected by the sonar 12. The sensor control unit 16 does not exclude a detection point detected by the sonar 12 from the collision determination. Accordingly, detection information includes detection information detected by the sonar 12, and the sensor control unit 16 of the vehicle control device 20 according to the first embodiment does not exclude a detection point detected by the sonar 12 from the collision determination, so that emergency braking can be absolutely performed for an object detected by the sonar 12.

As described above, the sensor control unit 16 of the vehicle control device 20 according to the first embodiment selects a detection point as an evaluation target of the shielding effect from detection points detected by the sonar 12, based on a reception intensity of the sonar 12. Accordingly, the sensor control unit 16 of the vehicle control device 20 according to the first embodiment selects a detection point as an evaluation target of the shielding effect from detection points detected by the sonar 12, based on a reception intensity of the sonar 12, so that an obstacle such a step, which does not shield the own vehicle from an approaching object, can be excluded from the evaluation target of the shielding effect, and it is possible to set the emergency braking inactivated only when the shielding effect is actually presented.

As described above, the sensor control unit 16 of the vehicle control device 20 according to the first embodiment generates the approximate straight line LS based on positions of a plurality of detection points included in a detection point group, calculates an average distance from the generated approximate straight line LS to the positions of the plurality of detection points or a variance of the positions of the plurality of detection points with respect to the approximate straight line LS, and evaluates the shielding effect to be high when the calculated average distance or variance is small. Accordingly, the vehicle control device 20 according to the first embodiment generates an approximate straight line based on positions of a plurality of detection points included in a detection point group, calculates an average distance from the generated approximate straight line to the positions of the plurality of detection points or a variance of the positions of the plurality of detection points with respect to the approximate straight line, and evaluates the shielding effect to be high when the calculated average distance or variance is small, so that it is possible to reliably set the emergency braking inactivated when there is a high probability that a shielding object is present.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the various embodiments described above may be combined freely within a range not departing from the scope of the invention.

The present disclosure is useful as a vehicle control device, a vehicle, a vehicle control method, and a vehicle control program capable of more accurately determining whether to exclude a detected approaching object from collision determination.

This application is based on and claims priority under 35 USC 119 from Japanese Patent Application No. 2021-174184 filed on Oct. 25, 2021, the contents of which are incorporated herein by reference.

What is claimed is:

1. A vehicle control device mountable on a vehicle, the vehicle control device comprising:
a processor; and
a memory storing instructions that, when executed by the processor, cause the vehicle control device to perform operations, the operations comprising:
acquiring detection information obtained by detecting an obstacle around the vehicle;
performing collision determination of evaluating a possibility of collision with the obstacle;
generating, based on the detection information, information on an approaching object that is an obstacle approaching the vehicle and information on a detection point group that is a set of detection points indicating an obstacle that does not move; and
excluding the approaching object from collision determination in a case in which the detection point group has a shielding effect of shielding the vehicle from the approaching object, and
wherein the shielding effect is evaluated by using a gap threshold that is set based on a vehicle width,
wherein the detection information includes detection information detected by a sonar, and wherein a detection point detected by the sonar is not excluded from the collision determination, and
wherein the operations further comprise:
selecting, based on a reception intensity of the sonar, a detection point as an evaluation target of the shielding effect from detection points detected by the sonar.

2. The vehicle control device according to claim 1,
wherein the gap threshold set based on the vehicle width is set to a value equal to or less than a vehicle width of a passenger vehicle, and
wherein the operations further comprise comparing a gap between the detection points with the gap threshold, and evaluating the shielding effect to be lower in a case in which the gap between the detection points is larger than the gap threshold than in a case in which the gap between the detection points is smaller than the gap threshold.

3. The vehicle control device according to claim 2,
wherein any one of a direction toward the approaching object, a traveling direction of the vehicle, and a traveling direction of the approaching object is set as a reference direction, and
wherein the evaluating the shielding effect comprises evaluating a gap between the detection points with the reference direction as a reference.

4. The vehicle control device according to claim 3,
wherein the evaluating the shielding effect comprises:
evaluating a gap between detection points in a detection point group located in the reference direction; and
evaluating the shielding effect such that a gap having a small deflection angle with respect to the reference direction is given more weight than a gap having a large deflection angle with respect to the reference direction.

5. The vehicle control device according to claim 3,
wherein the evaluating the shielding effect comprises:
evaluating a number of detection points in a detection point group located in the reference direction; and
evaluating the shielding effect to be higher in a case in which the number of the detection points is large than in a case in which the number of the detection points is small.

6. The vehicle control device according to claim 3,
wherein the gap between the detection points is a gap between two detection points sandwiching the reference direction and closest to the reference direction.

7. The vehicle control device according to claim 1,
wherein the operations further comprise:
evaluating, in a case in which there is a target parking position at which the vehicle is to be parked, the shielding effect to be low in a case in which there is the approaching object in a direction with the target parking position as a reference.

8. The vehicle control device according to claim 7,
wherein a direction with the target parking position as a reference is a direction toward a near end of the target parking position.

9. The vehicle control device according to claim 1,
wherein the operations further comprise:
evaluating, in a case in which there is a target parking position at which the vehicle is to be parked, the shielding effect to be lower in a case in which the detection point group is located closer than a position with the target parking position as a reference than in a case in which the detection point group is located farther than the position with the target parking position as a reference.

10. The vehicle control device according to claim 9,
wherein the position with the target parking position as a reference is a far end of the target parking position.

11. The vehicle control device according to claim 1,
wherein the detection information includes detection information detected by a radar, and
wherein the information on the approaching object is based on the detection information detected by the radar.

12. The vehicle control device according to claim 11,
wherein an evaluation target of the shielding effect includes an obstacle detected by the radar.

13. The vehicle control device according to claim 1,
wherein the operations further comprise:
selecting, as the detection point as the evaluation target, a detection point where the reception intensity is greater than a threshold.

14. The vehicle control device according to claim 13,
wherein the threshold is set to be smaller as a distance between the sonar and the detection point larger.

15. The vehicle control device according to claim 1,
wherein the operations further comprise:
generating an approximate straight line based on positions of a plurality of detection points included in the detection point group;
calculating an average distance from the approximate straight line to the positions of the plurality of detection points or a variance of the positions of the plurality of detection points with respect to the approximate straight line; and
evaluating the shielding effect to be high in a case in which the average distance or variance is small.

16. A vehicle comprising:
the vehicle control device according to claim 1.

17. A vehicle control method to be executed by one or more computers mountable on a vehicle, the vehicle control method comprising:
acquiring detection information obtained by detecting an obstacle around the vehicle;
generating, based on the detection information, information on an approaching object that is an obstacle approaching the vehicle and information on a detection point group that is a set of detection points indicating an obstacle that does not move;
evaluating, based on the information on the approaching object and the information on the detection point group, a shielding effect of shielding the vehicle from the approaching object by the detection point group; and
excluding, in accordance with the shielding effect, the approaching object from a target of collision determination in which a possibility of collision with the vehicle is evaluated,
wherein the shielding effect is evaluated by using a gap threshold that is set based on a vehicle width,
wherein the detection information includes detection information detected by a sonar, and wherein a detection point detected by the sonar is not excluded from the collision determination, and
wherein the vehicle control method further comprise:
selecting, based on a reception intensity of the sonar, a detection point as an evaluation target of the shielding effect from detection points detected by the sonar.

* * * * *